United States Patent
White et al.

(10) Patent No.: US 12,501,901 B2
(45) Date of Patent: Dec. 23, 2025

(54) ENDOPHYTIC MICROBES FOR GROWTH PROMOTION OF CROP PLANTS AND SUPPRESSION OF AGGRESSIVE INVASIVE PLANT SPECIES

(71) Applicants: Rutgers, The State University of New Jersey, New Brunswick, NJ (US); U.S. Geological Survey, Ann Arbor, MI (US)

(72) Inventors: James F. White, New Brunswick, NJ (US); Kurt P. Kowalski, Ann Arbor, MI (US); Kathryn L. Kingsley, Robbinsville, NJ (US); Matthew T. Elmore, East Brunswick, NJ (US)

(73) Assignees: Rutgers, The State University of New Jersey, New Brunswick, NJ (US); U.S. Geological Survey, Ann Arbor, MI (US)

( * ) Notice: Subject to any disclaimer, the term of this patent is extended or adjusted under 35 U.S.C. 154(b) by 31 days.

(21) Appl. No.: 17/266,489

(22) PCT Filed: Aug. 9, 2019

(86) PCT No.: PCT/US2019/045932
§ 371 (c)(1),
(2) Date: Feb. 5, 2021

(87) PCT Pub. No.: WO2020/033844
PCT Pub. Date: Feb. 13, 2020

(65) Prior Publication Data
US 2021/0321623 A1    Oct. 21, 2021

Related U.S. Application Data

(60) Provisional application No. 62/716,742, filed on Aug. 9, 2018.

(51) Int. Cl.
*A01N 63/27* (2020.01)
*A01N 63/32* (2020.01)

(52) U.S. Cl.
CPC ............. *A01N 63/27* (2020.01); *A01N 63/32* (2020.01)

(58) Field of Classification Search
CPC .............................. A01N 63/27; A01N 63/32
(Continued)

(56) References Cited

U.S. PATENT DOCUMENTS

| 8,906,668 | B2 * | 12/2014 | Henn | A61K 45/06 435/252.4 |
|---|---|---|---|---|
| 2014/0004090 | A1 * | 1/2014 | Vasquez | A23L 33/135 435/252.9 |
| 2018/0020672 | A1 * | 1/2018 | White, Jr. | A01N 63/20 504/117 |

FOREIGN PATENT DOCUMENTS

| CN | 105950502 A | 9/2016 |
|---|---|---|
| WO | 2015035099 A1 | 3/2015 |

OTHER PUBLICATIONS

Rauch et al., Characterization of microbial contamination in United States Air Force aviation fuel tanks, J Ind Microbiol Biotechnol, vol. 33, (2006), pp. 29-36.*

(Continued)

*Primary Examiner* — Jennifer M.H. Tichy
(74) *Attorney, Agent, or Firm* — Howson & Howson, LLP; Kathleen D. Rigaut; Richard F. Kane

(57) ABSTRACT

Endophytic bacteria, compositions comprising the same, and methods of use thereof are disclosed which suppress growth of aggressive, invasive weed species which grow in the same habitat of target plants of interest.

14 Claims, 8 Drawing Sheets
Specification includes a Sequence Listing.

(58) Field of Classification Search
USPC ..................................................... 424/93.47
See application file for complete search history.

(56) References Cited

OTHER PUBLICATIONS

Comparison of instant SEQ ID No. 10 to cited SEQ ID No. 647, Jan. 23, 2024.*
Comparison of instant SEQ ID No. 11 to cited SEQ ID No. 464, Jan. 23, 2024.*
Comparison of instant SEQ ID No. 13 to cited SEQ ID No. 966, Jan. 23, 2024.*
Comparison of instant SEQ ID No. 15 to cited SEQ ID No. 688, Jan. 23, 2024.*
Comparison of instant SEQ ID No. 16 to Henn et al. cited SEQ ID No. 1480, Feb. 8, 2025.*
Comparison of instant SEQ ID No. 18 to Henn et al. cited SEQ ID No. 1482, Feb. 8, 2025.*
Comparison of instant SEQ ID No. 36 to Henn et al. cited SEQ ID No. 1153, Feb. 8, 2025.*
Soares MA, Li H-Y, Kowalski KP, Bergen M, Torres MS, White JF. (2016) Functional roles of bacteria from invasive Phragmites australis in promotion of host growth. Microb Ecol 72: 407-17.
Steiner U, Leibner S, Schardl CL, Leuchtmann A, Leistner E. (2011) Periglandula, a new fungal genus within the Clavicipitaceae and its association with Convolvulaceae. Mycologia 103: 1133-1145.
Stone JK, Bacon CW, White JF. (2000) An overview of endophytic microbes: endophytism defined. In: Bacon CW, White JF (eds) Microbial Endophytes, Marcel-Dekker, New York, USA, pp. 3-30.
Sun Y, O'Riordan M. (2013) Regulation of bacterial pathogenesis by intestinal short-chain fatty acids. pp. 93-113 in Advances in Applied Microbiology. Elsevier, NY.
Tramontano WA, Scanlon C. (1996) Cell cycle inhibition by butyrate in legume root meristems. Phytochemistry 41: 85-88.
Thomas P, Soly TA. (2009) Endophytic bacteria associated with growing shoot tips of banana (*Musa* sp.) cv. Grand Naine and the affinity of endophytes to the host. Microbial Ecology 58: 953-964.
Thomas P, Reddy KM. (2013) Microscopic elucidation of abundant endophytic bacteria colonizing the cell wall-plasma membrane peri-space in the shoot-tip tissue of banana. AOB Plants 5: plt011, https://doi.org/10.1093/aobpla/plt011.
Torres MS, White JF, Zhang X, Hinton DM, Bacon CW. (2012) Endophyte-mediated adjustments in host morphology and physiology and effects on host fitness traits in grasses. Fungal Ecology 5: 322-330.
Verma SK, Kingsley K, Irizarry I, Bergen M, Kharwar RN, White JF. (2017a) Seed vectored endophytic bacteria modulate development of rice seedlings. J. Applied Microbiology 122: 1680-1691.
Verma SK, Kingsley K, Bergen M, English C, Elmore M, Kharwar RN, White JF. (2017b) Bacterial endophytes from ice cut grass (*Leersia oryzoides* L.) increase growth, promote root gravitropic response, stimulate root hair formation, and protect rice seedlings from disease. Plant and Soil 422: 223-238. DOI: 10.1007/s11104-017-3339-1.
Verma SK, White JF. (2017) Indigenous endophytic seed bacteria promote seedling development and defend against fungal disease in browntop millet (*Urochloa ramosa* L.). Journal of Applied Microbiology 124: 764-778. DOI: 10.1111/am.13673.
Verma SK, Kingsley KL, Bergen MS, Kowalski KP, White JF. (2018) FFungal Disease Prevention in Seedlings of Rice (Oryza sativa) and Other Grasses by Growth-Promoting Seed-Associated Endophytic Bacteria from Invasive Phragmites australis. MDPI: Microorganisms. doi: 10.3390/microorganisms6010021.
Waller F, Achatz B, Baltruschat H, Fodor J, Becker K, Fisher M, Heier T, Huckelhoven R, Neumann C, Wettstein D, Franken P, Kogel KH. (2005) The endophytic fungus Piriformospora indica reprograms barley to salt-stress tolerance, disease resistance, and higher yield. PNAS 102: 13386-13391.
White JF, Cole GT. (1986). Endophyte-host associations in forage grasses. IV. The endophyte of Festuca versuta. Mycologia 78:102-107.
White JF, Chen Q, Torres MS, Mattera R, Irizarry I, Tadych M, Bergen M. (2015) Collaboration between grass seedlings and rhizobacteria to scavenge organic nitrogen in soils. AoB PLANTS 7: plu093. doi: 10.1093/aobpla/plu093.
White J F, Crawford H, Torres MS, Mattera R, Irizarry I, Bergen M. (2012). A proposed mechanism for nitrogen acquisition by grass seedlings through oxidation of symbiotic bacteria. Symbiosis 57: 161-171. http://doi.org/10.1007/s13199-012-0189-8.
White JF, Kingsley K, Harper CJ, Verma SK, Brindisi L, Chen Q, Chang X, Micci A, Bergen M. (2018) Reactive oxygen defense against cellular endoparasites and the origin of eukaryotes, in:Krings M, Harper CJ, Cuneo NR, Rothwell GW (eds.). Transformative Paleobotany: Papers to Commemorate the Life and Legacy of Thomas N. Taylor. Elsevier, Amsterdam, Netherlands.
White JF, Kingsley KL, Kowalski KP, Irizarry I, Micci A, Soares MA, Bergen MS. (2017). Disease protection and allelopathic interactions of seed-transmitted endophytic pseudomonads of invasive seed grass (Phragmites australis). Plant and Soil. 422: 195-208. doi:10.1007/s11104-016-3169-6.
White JF, Torres MS. (2010) Is plant endophyte-mediated defensive mutualism the result of oxidative stress protection? Physiologia Plantarum 138: 440-446.
White JF, Torres MS, Somu MP, Johnson H, Irizarry I, Chen Q, Zhang N, Walsh E, Tadych M, Bergen M. (2014). Hydrogen peroxide staining to visualize intracellular bacterial infections of seedling root cells. Microscopy Research and Technique 77: 566-573. DOI: 10.1002/jemt.22375.
White JF, Torres MS, Verma SK, Elmore MT, Kowalski KP, Kingsley KL. (2018). Evidence for widespread microbivory of endophytic bacteria in roots of vascular plants through oxidative degradation in root cell periplasmic spaces. In: PGPR Amelioration in Sustainable Agriculture: Food Security and Environmental Management (Eds. Kumar A, Singh A, Singh V), Elsevier.
Atsatt PR, Whiteside MD (2014) Novel Symbiotic Protoplasts Formed by Endophytic Fungi Explain Their Hidden Existence, Lifestyle Switching, and Diversity within the Plant Kingdom, PLoS ONE 9(4): e95266. https://doi.org/10.1371/journal.pone.0095266.
Bacon C, White JF. (2015) Functions, mechanisms and regulation of endophytic and epiphytic microbial communities of plants, Symbiosis 68(1-3): 87-98. Doi: 10.13140/RG.2.1.1956.9124.
Beltrán-Garcia, MJ, White JF, Prado FM, Prieto KR, Yamaguchi LF, Torres MS, Kato MJ, Medeiros MHG, Di Mascio P. (2014) Nitrogen acquisition in Agave tequilana from degradation of endophytic bacteria, Scientific reports 4:6938, pp. 1-11.
Beran V, Havelkova M, Kaustova J, Dvorska L, Pavlik I (2006) Cell wall deficient forms of mycobacteria: a review, Veterinarni Medicina 51(7): 365-389.
Buer CS, Sukumar P, Muday GK (2006) Ethylene Modulates Flavonoid Accumulation and Gravitropic Responses in Roots of Arabidopsis, Plant Physiology 140: 1384-1396. http://doi.org/10.1104/pp.105.075671.
Bowsher AW, Ali R, Harding SA, Tsai C-J, Donovan LA (2016) Evolutionary Divergences in Root Exudate Composition among Ecologically-Contrasting Helianthus Species, PLoS ONE, 11(1), e0148280. http://doi.org/10.1371/iournal.pone.0148280.
Broeckling CD, Broz AK, Bergelson J, Manter DK, Vivanco J. M (2008) Root Exudates Regulate Soil Fungal Community Composition and Diversity, Applied and Environmental Microbiology 74(3): 738-744.
Cabiscol E, Tamarit J, Ros J (2000) Oxidative stress in bacteria and protein damage by reactive oxygen species, International Microbiology 3: 3-8.
Rodriguez RJ, Woodward C, Kim YO, Redman RS. (2009) Habitat-adapted symbiosis as a defense against abiotic and biotic stresses. In: White JF Jr, Torres MS (eds) Defensive Mutualism in Microbial Symbiosis, CRC Press, Boca Raton, FL., USA. pp. 335-346.
Clay K. (1988) Fungal Endophytes of Grasses: A Defensive Mutualism between Plants and Fungi. Ecology 69(1): 10-16.

(56) References Cited

OTHER PUBLICATIONS

Clay K, Holah J, Rudgers JA. (2005) Herbivores cause a rapid increase in hereditary symbiosis and alter plant community composition. PNAS 102: 12465-12470.
Compant S, Clement C, Sessitsch A. (2010) Plant growth-promoting bacteria in the rhizo- and endosphere of plants: Their role, colonization, mechanisms involved and prospects for utilization. Soil Biol Biochem 42: 669-678.
Cox NA, McHan F, Bailey JB, Shotts EB. (1994) Effect of butyric or lactic acid on the In vivo colonization of *Salmonella yphimurium*. J. Appl. Poult. Res. 3: 315-318.
Cook D, Gardner DR, Pfister JA. (2014) Swainsonine-containing plants and their relationship to endophytic fungi J. Ag. and Food Chemistry 62: 7326-7334. DOI: 10.1021/jf501674r.
Cook D, Donzelli BGG, Creamer R, Baucom DL, Gardner DR, Pan J, Schardl CL. (2017). Swainsonine biosynthesis genes in diverse symbiotic and pathogenic fungi. G3: Genes|Genomes|Genetics 7: 1791-1797. http://doi.org/10.1534/ g3.117.041384.
Doty SL (2017) Functional importance of the plant microbiome: Implications for agriculture, forestry and bioenergy. pp. 1-5 in: Doty SL (Ed.), Functional Importance of the Plant Microbiome. Springer, Amsterdam, Netherlands.
Rudrappa T, Czymmek KJ, Paré PW, Bais HP. (2008) Root-secreted malic acid recruits beneficial soil bacteria. Plant Physiol. 148:1547-1556.
Errington J, Mickiewicz K, Kawai Y, Wu LJ. (2016) L-form bacteria, chronic diseases and the origins of life. Phil. Trans. R. Soc. B 2016 371 20150494; DOI: 10.1098/rstb.2015.0494.Funk.
Schardl CL, Young CA, Pan J, Florea S, Takach J, Panaccione DG, Farman ML, Webb JS, Jaromczyk J, Charlton ND, Nagabhyru P, Chen L, Shi C, Leuchtmann A. (2013) Currencies of mutualisms: Sources of alkaloid genes in vertically transmitted epichloae. Toxins 5: 1064-1088.
Gond SK, Bergen M, Torres MS, White JF. (2015) Effect of bacterial endophyte on expression of defense genes in Indian popcorn against Fusarium moniliforme. Symbiosis 66: 133-140. DOI: 10.1007/s13199-015-0348-9.
Hamilton CE, Gundel PE, Helander M, Saikkonen K. (2012) Endophytic mediation of reactive oxygen species and antioxidant activity in plants: a review. Fungal Diversity 54: 1-10.
Hardoim PR, van Overbeek LS, Berg G, Pirttila AM, Compant S, Campisano A, Doring M, Sessitsch A. (2015) The hidden world within plants: ecological and evolutionary considerations for defining functioning of microbial endophytes. Microbiol. Mol. Biol. Rev. 79: 293-320. doi:10.1128/MMBR.00050-14.
Hill PW, Quilliam RS, DeLuca TH, Farrar J, Farrell M, et al. (2011) Acquisition and assimilation of nitrogen as peptide-bound and D-enantiomers of amino acids by wheat. PLoS ONE 6(4): e19220. doi:10.1371/journal.pone.0019220.
Holland MA. 1997. Methylobacterium and plants. Recent Res Dev in Plant Physiol 1: 207-213.
Hurek T, Handley LL, Reinhold-Hurek B, Piche Y. (2002) Azoarcus grass endophytes contribute fixed nitrogen to the plant in an unculturable state. Molecular Plant-Microbe Interactions 15: 233-242.
Irizarry I, White JF. (2017) Application of bacteria from non-cultivated plants to promote growth, alter root architecture and alleviate salt stress of cotton. J. Appl. Microbiol. 122: 1110-1120; doi: 10.1111/jam.13414.
Irizarry I, White JF. (2018). Bacillus amyloliquefaciens alters gene expression, ROS production, and lignin synthesis in cotton seedling roots. J. Applied Microbiology 124: 1589-1603.
Johnstone TC, Nolan EM (2015) Beyond iron: Non-classical biological functions of bacterial siderophores. Daltan Trans. 44: 6320-6339. http://dxdoi.org/10.1039/c4dt03559c.
Johnston-Monje D, Raizada MN. (2011) Conservation and diversity of seed associated endophytes in Zea across boundaries of evolution, ethnography and ecology. PLoS ONE 6(6): e20396. doi: 10.1371/journal.pone.0020396.

Kandel SL, Joubert PM, Doty LS. (2017) Bacterial endophyte colonization and distribution within plants. Microorganisms 5: 77; doi: 10.3390/microorganisms5040077.
Soares MA, Li H, Bergen M, White JF. (2015) Functional role of an endophytic Bacillus amyloliquefaciens in enhancing growth and disease protection of invasive English ivy (*Hedera helix* L.). Plant and Soil 405: 107-123. DOI: 10.1007/s11104-015-2638-7.
Kowalski KP, Bacon C, Bickford W, Braun H, Clay K, Leduc-Lapierre M, Lillard E, McCormick M, Nelson E, Torres M, White JF, Wilcox DA. (2015) Advancing the science of microbial symbiosis to support invasive species management: A case study on Phragmites in the Great Lakes. Frontiers in Microbiology Jan. 2015; 6:95. DOI: 10.3389/fmicb.2015.00095.
Kocha T, Yamaguchi M, Ohtaki H, Fukuda T, Aoyagi T. (1997) Hydrogen peroxide-mediated degradation of protein: different oxidation modes of copper- and iron-dependent hydroxyl radicals on the degradation of albumin. Biochimica et Biophysica Acta 1337: 319-326.
Koga R, Nikoh N, Matsuura Y, Meng X-Y, Fukatsu T. (2013) Mealybugs with distinct endosymbiotic systems living on the same host plant. FEMS Microbiol Ecol 83: 93-100.
Kuldau G, Bacon CW. (2008) Clavicipitaceous endophytes: Their ability to enhance grass resistance to multiple stresses. Biological Control 46: 57-71.
Lamb C, Dixon RA. (1997) The oxidative burst in plant disease resistance. Annu. Rev. Plant Physiol. Mol. Biol. 48: 251-275.
Anzagorta JMA, de la Torre C, Aller P. (1988) The effect of butyrate on cell cycle progression in Allium cepa root meristems. Physiologia Plantarum 72: 775-781.
Machova E, Bystricky S. (2013) Antioxidant capacities of mannans and glucans are related to their susceptibility to free radical degradation. Int. J. Biol. Macromol. 61: 308-311.
Mohanna DC, Thippeswamy S, Abhishek RU. (2013) Antioxidant, antibacterial, and ultraviolet protective properties of carotenoids isolated from *Micrococcus* spp. Radiat. Prot. Environ. 36: 168-174.
Paungfoo-Lonhienne C, Rentsch D, Robatzrk S, Webb RI, Sagulenko E, Nasholm T, Schmidt S, Lonhienne TGA. (2010) Turning the table: plants consume microbes as a source of nutrients. PLOS ONE 5(7): e11915. doi: 10:1371/journal.pone.0011915.
Paungfoo-Lonhienne, C., Schmidt, S., Webb, R. and Lonhienne, T. (2013) Rhizophagy—A new dimension of plant-microbe interactions, in de Briujn, F.J. (Ed.) Molecular Microbial Ecology of the Rhizosphere. Wiley-Blackwell. Pub John Wiley & Sons, Inc.
Prieto KR, Echaide-Aquino F, Huerta-Robles A, Valerio HP, Macedo-Raygoza G, Prado FM, Medeiros M, Brito HF, da Silva I, Felinto MCF, White JF, Di Masci, P, Beltran-Garcia M. (2017) Endophytic bacteria and rare earth elements; Promising candidates for nutrient use efficiency in plants. pp. 285-302, in Hossain M, Kamiya T, Burritt D, Tram L-SP, Fujiwara T. (Eds). Plant Macronutrient Use Efficiency. Academic Press, Cambridge, MA, USA.
Puente ME, Lib CY, Bashan Y (2009) Endophytic bacteria in cacti seeds can improve the development of cactus seedlings. Environ. Exp. Bot. 66: 402-408.
Redman RS, Sheehan KB, Stout RG, Rodriguez RJ, Henson JM. (2002) Thermotolerance generated by plant/fungal symbiosis. Science 298: 1581.
Reinhold-Hurek B, Hurek T. (2011) Living inside plants: bacterial endophytes. Current Opinion in Plant Biology 14: 435-443.
Rodriguez CE, Mitter B, Barret M, Sessitsch A, Compant S. (2017) Commentary: Seed bacterial inhabitants and their routes of colonization. Plant & Soil 422: 129-134.
International Search Report, dated Dec. 13, 2019, issued in corresponding International Application No. PCT/US2019/045932, filed Aug. 9, 2019.
Prashanthi et al., Aureobasidium pullulans, a potential mycoherbicide for biocontrol of eupatorium [Chromolaena odorata (I.) King and Robinson] weed, Current Science, Jan. 10, 2005, vol. 88, No. 1, pp. 18-21.
Khan et al., Bacterial and Yeast Endophytes from Poplar and Willow Promote Growth in Crop Plants and Grasses, ISRN Agronomy, Jul. 22, 2012, vol. 2012, ID No. 890280, pp. 1-11.

(56) References Cited

OTHER PUBLICATIONS

Mishra et al., Unravelling the beneficial role of microbial contributors in reducing the allelopathic effects of weeds, Applied Microbiology and Biotechnology, May 30, 2013, vol. 97, No. 13, pp. 5659-5668.

* cited by examiner

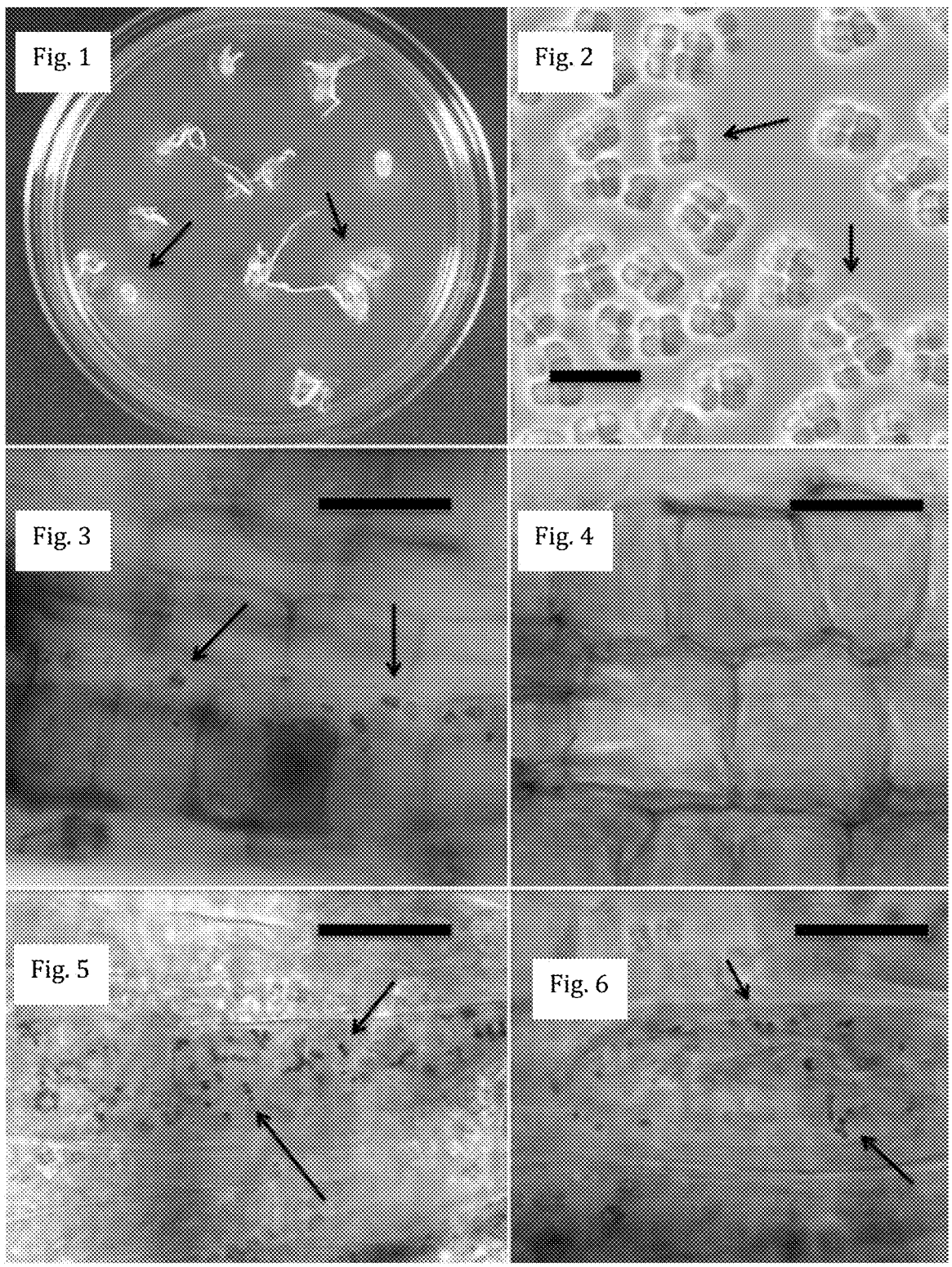

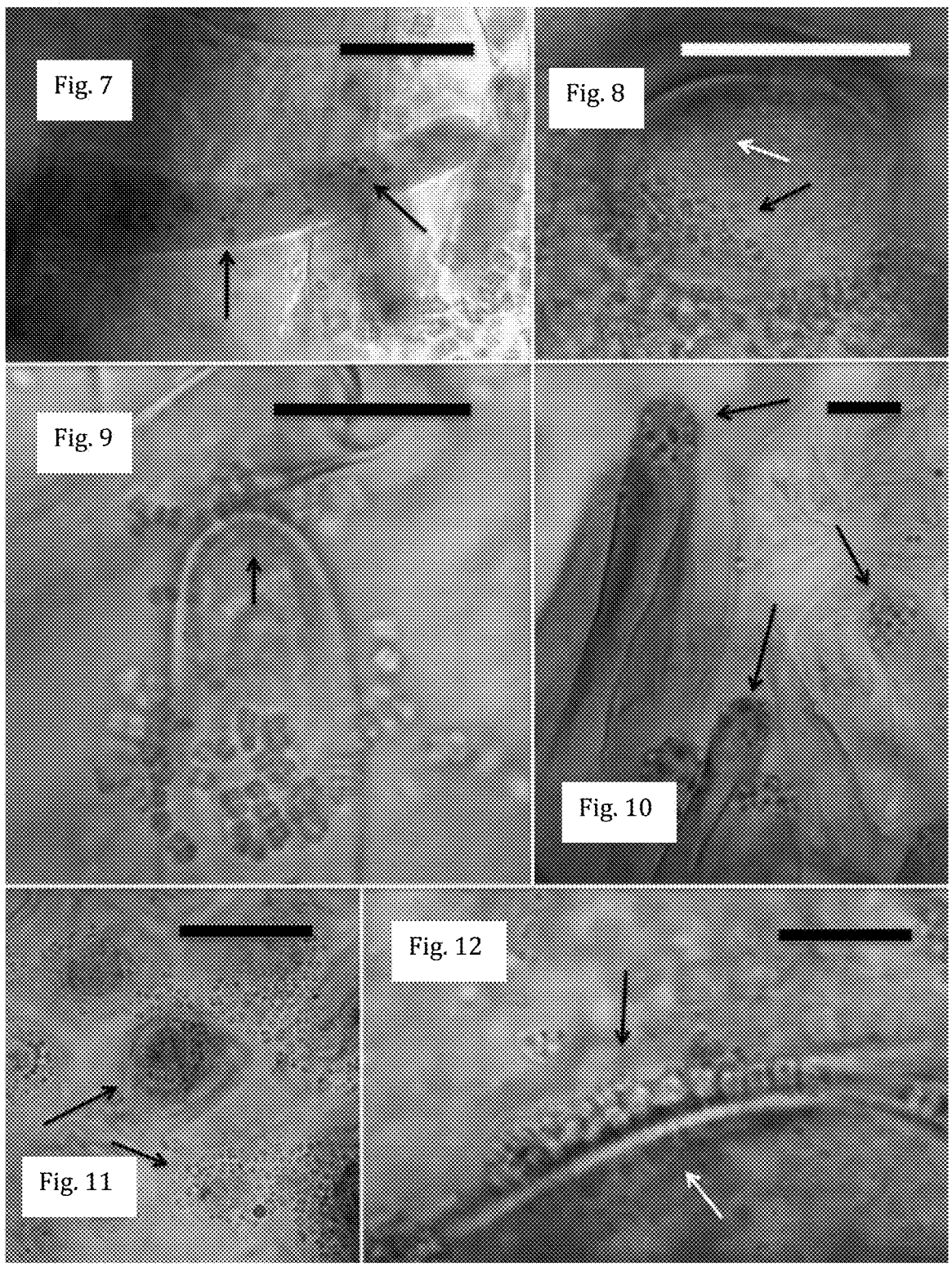

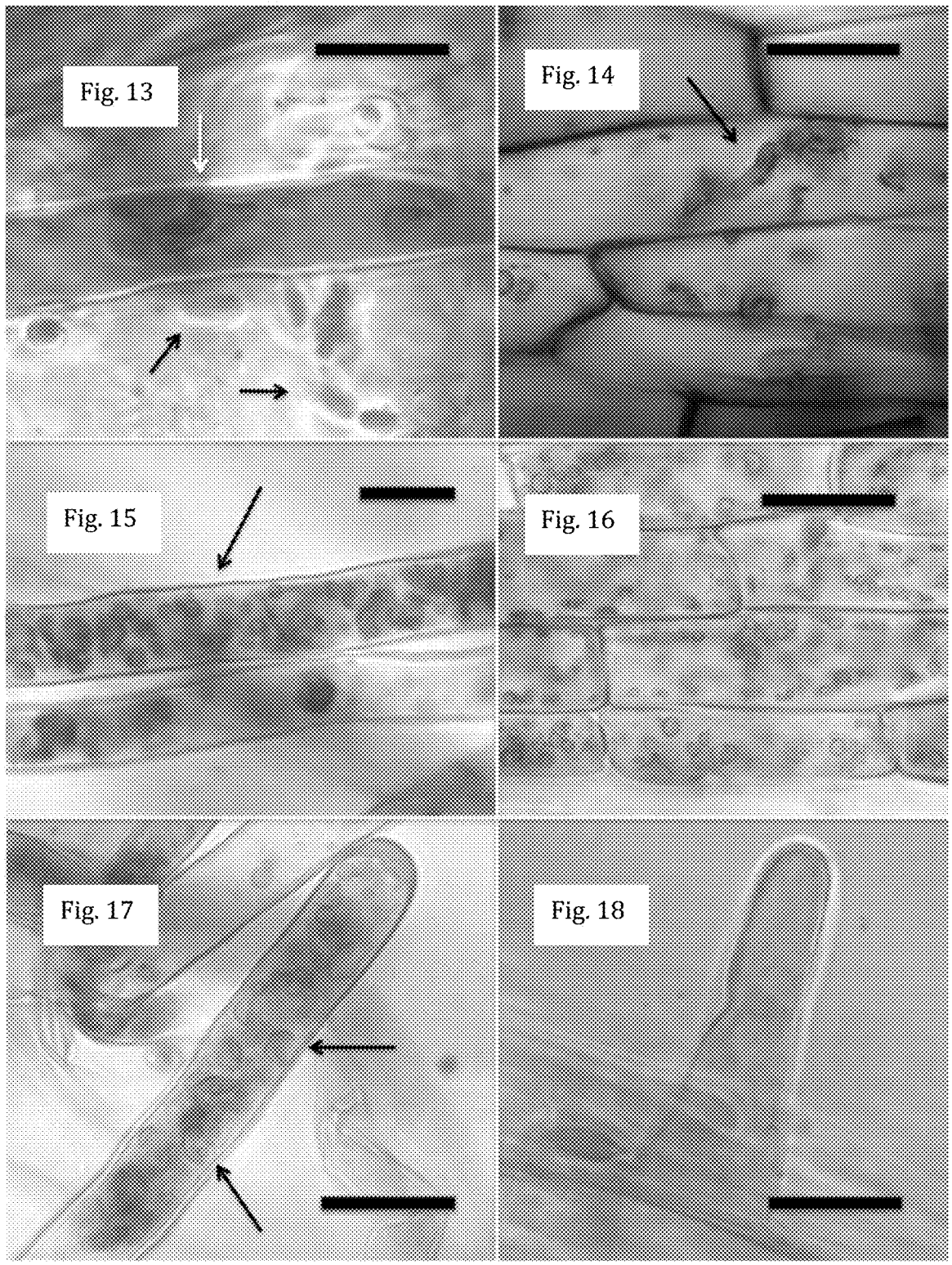

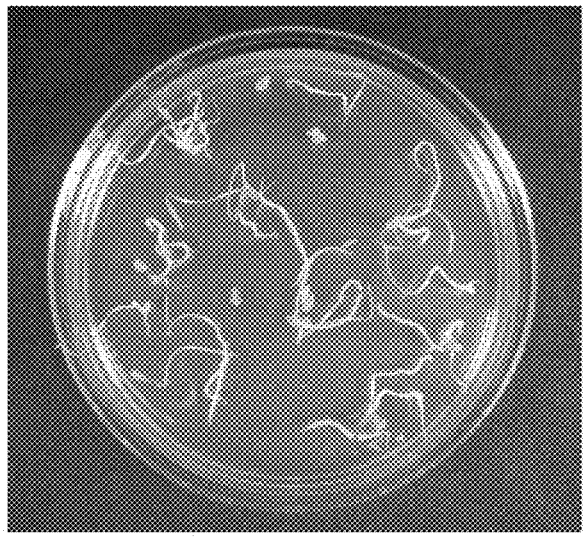
Seedlings not treated with bacteria
Seedlings treated with *Micrococcus*
Fig. 19C
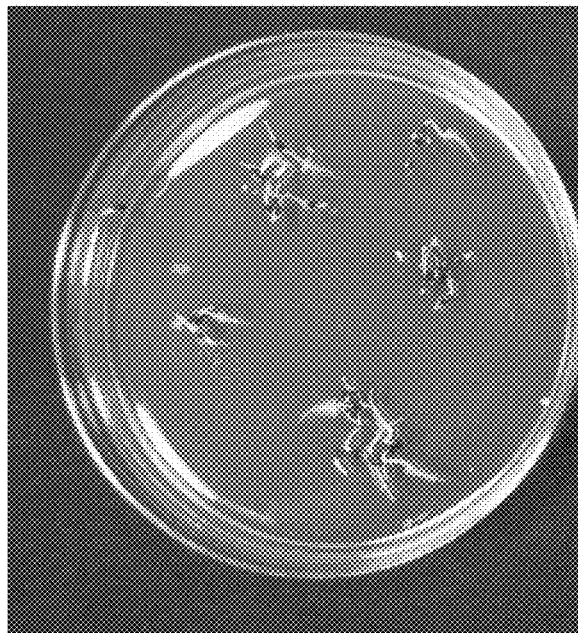
Seedlings without bacteria
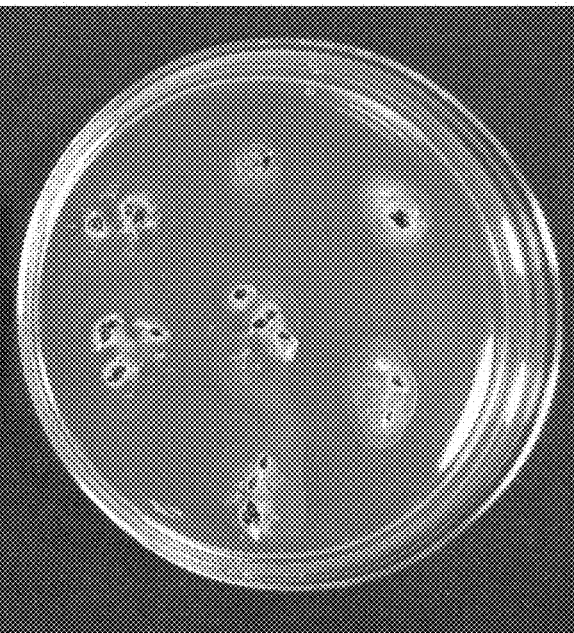
Seedlings with *Micrococcus*
Fig. 19D

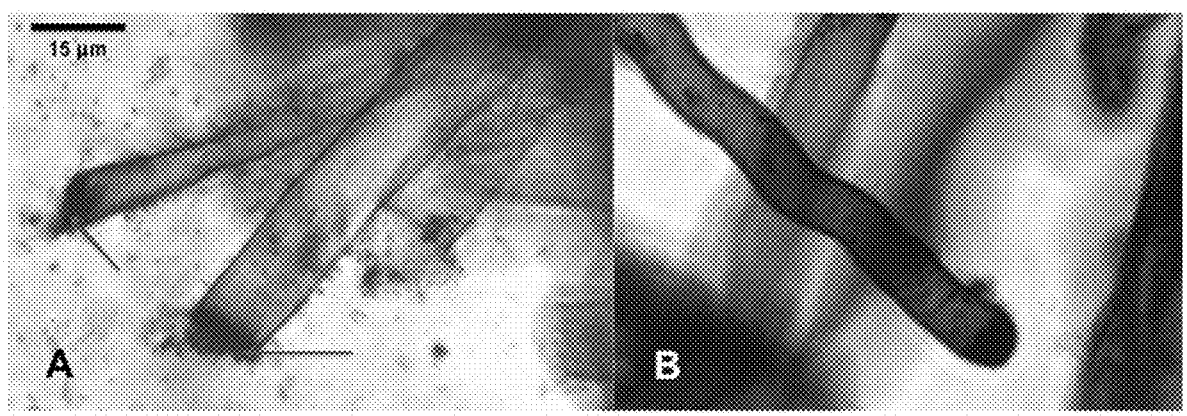
Fig. 21A                              Fig. 21B
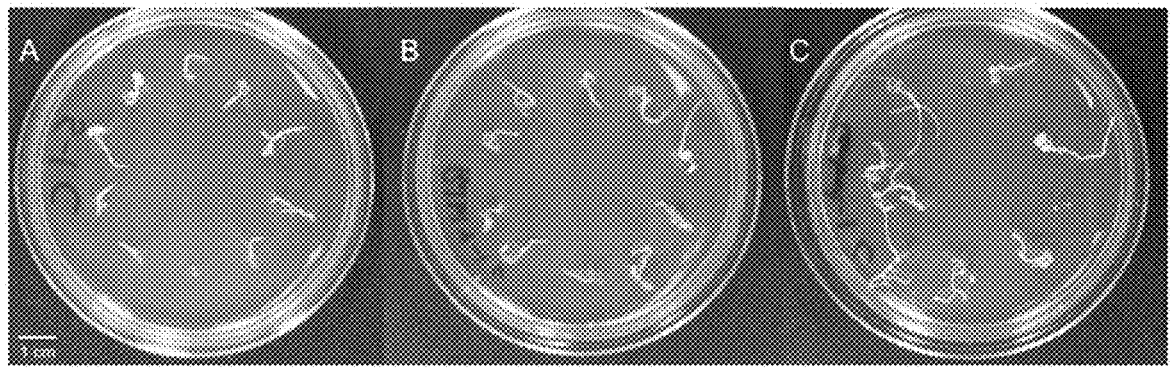
Fig. 22A                Fig. 22B                Fig. 22C

ENDOPHYTIC MICROBES FOR GROWTH PROMOTION OF CROP PLANTS AND SUPPRESSION OF AGGRESSIVE INVASIVE PLANT SPECIES This application is a § 371 of International Application No. PCT/US2019/045932, filed Aug. 9, 2019, which claims priority to U.S. Provisional Application No. 62/716,742 filed Aug. 9, 2018, the entire contents of each being incorporated by reference herein as though set forth in full.

STATEMENT OF GRANT SUPPORT

This invention was made with government support under G16AC00433 awarded by the U.S. Geological Survey, and NI18HMFPXXXXG007 awarded by the National Institute of Food and Agriculture. The government has certain rights in the invention.

INCORPORATION-BY-REFERENCE OF MATERIAL SUBMITTED IN ELECTRONIC FORM

Applicant hereby incorporates by reference the Sequence Listing material filed in electronic form herewith. This file is labelled "SeqListing.txt", dated Aug. 9, 2019 and is 45,303 bytes in size.

FIELD OF THE INVENTION

This invention relates to compositions comprising endophytic bacteria and methods of use thereof to promote plant growth and suppress aggressiveness in invasive plant species.

BACKGROUND OF THE INVENTION

Several publications and patent documents are cited throughout the specification in order to describe the state of the art to which this invention pertains. Each of these citations is incorporated by reference herein as though set forth in full.

Plant seeds carry embryonic plants and nutrients for early stages of seedling growth; seeds also carry small communities of symbiotic microbes (primarily bacteria and fungi) that are needed for defense from pathogens, modulation of plant development, and nutrient acquisition in seedlings. Seed-vectored symbiotic microbes are adapted to their host plant and may enable seedlings to survive and thrive (Compant, Clement and Sessitsch, 2010; Kandel et al., 2017). Without symbiotic microbes, seedlings do not develop properly—often lacking normal root gravitropic response where roots do not grow downward into the soil or other substrate—sometimes growing upward—where roots may not produce root hairs—or hairs may be sparse or short (Holland, 1997; Verma et al., 2017a, 2017b; White et al., 2012). Seedlings without their microbes are more susceptible to diseases and oxidative stresses (abiotic and biotic in nature), drought, heat, heavy metals, herbivory, etc. (Rodriguez et al., 2009; Tones et al., 2012; Waller et al., 2005; White and Tones, 2010).

Some seed-associated tissues appear to harbor adaptations to vector microbes on seeds. Dried paleas and lemmas that adhere closely to grass seed coats (or caryopsis testa) vector bacteria and sometimes fungi that colonize roots and shoots of the germinating seedlings as they emerge from the seeds (White et al., 2012). The characteristically winged seeds of species in the plant family Polygonaceae vector bacteria that colonize germinating seedlings. In cotton (*Gossypium* spp.; Malvaceae) elongated trichomes (cotton fibers) carry bacteria that may stimulate seedling growth and protect cotton plants from diseases. Removal of the cotton fibers by acid delinting as is commonly done makes seeds easier to process in mechanical planters but also removes symbiotic bacteria from cotton seeds, leaving the seedlings defenseless from pathogens, insect pests, and compromised developmentally (Irizarry and White, 2017, 2018). As a consequence, cotton is often considered to be "the world's dirtiest crop" due to the amount of agrochemicals frequently used in its cultivation (Environmental Justice Foundation, 2007). In many grasses of subfamily Pooidae fungal Epichloë endophytes colonize the ovules of the maternal plant and grow into the embryo inside caryopsis—thus germinating seedlings already contain the fungal endophyte (White and Cole, 1986).

SUMMARY OF THE INVENTION

In accordance with the present invention a method of improving a competitive advantage in a target plant of interest over aggressive invasive weed species which grow in the same habitat is provided. An exemplary method comprises inoculating a plant element with a formulation comprising one or more biologically pure endophytic microbes selected from those set forth in Table 1, Table 3B or Table 4. In certain embodiments, the microbes are 1) yeasts *Rhodotorula* sp. (strain *Abrus* #1) and *Aureobasidium pullulans* (strain *Froelichia* #2), and, or, ii) bacteria *Sphingomonas* sp. (strain *Abrus* #3), *Rhodococcus* sp. (strain *Abrus*R), *Micrococcus luteus* (strain *Lycopersicon* #1), *Curtobacterium* sp. (strain *Froelichia* #4) and *Paenibacillus* sp. (strain PA-NA-2B1) and, or iii) Strain 5, *Pantoea* sp. from crabgrass, strain PP4F, *Pseudomonas* sp. from Poa pratenses and strain *Froelichia* #2, *Aureobasidium pullulans*; and, or iv) Strain 4, *Pantoea* sp. from crabgrass and strain PA-NA-2B1, *Paenibacillus* sp. from *Poa annua* and strain PP4-F, *Pseudomonas* sp. from *Poa pratensis*; and, or v): Strain PP4F, *Pseudomonas* sp. from Poa pratenses and Strain PA-NA-2B1, *Paenibacillus* sp. from *Poa annua* and Strain *Froelichia* #2, *Aureobasidium pullulans*) which are heterologously disposed to said plant element, wherein said endophyte strains are present in the formulation in an amount capable of modulating growth of undesirable competitor weed species growing in the same habitat as said target plant, as compared to a reference, untreated plant grown under the same conditions.

In certain embodiments, the plant is a plant is a monocot or dicot. In other embodiments, the plant is selected from the group of plants consisting of cotton, okra, soybean, cacao, kenaf and kola nut, coffee, tobacco, potato, tomato, sweet potato, sunflower, rapeseed, wheat, corn, rice, barley, sorghum, grass, sugarcane, bamboo, buckwheat, snap bean, dry bean, canola, peas, peanuts, safflower, sunflower, alfalfa hay, clover, vetch, and trefoil, blackberry, blueberry, currant, elderberry, gooseberry, huckleberry, loganberry, raspberry, strawberry, grape, garlic, leek, onion, shallot, citrus hybrid, grapefruit, kumquat, lime, orange, pummelo, cucumber, melon, gourd, pumpkin, squash, eggplant, sweet pepper, hot pepper, tomatillo, herb, spice, mint, arugula, celery, chervil, endive, fennel, lettuce, parsley, radicchio, rhubarb, spinach, swiss chard, broccoli, brussels sprout, cabbage, cauliflower, collard, kale, kohlrabi, mustard green, asparagus, pear, quince, beet, sugarbeet, red beet, carrot, celeriac, chicory, horseradish, parsnip, radish rutabaga, salsify, and turnips, maple, pine, rye, wheat, sorghum, millet, apricot, cherry, nectarine, peach, plum, prune, almond, beech nut, Brazil nut, butternut, cashew, chestnut, filbert, hickory nut, macadamia nut, pecan, pistachio, walnut, artichoke, cassava, and ginger plants.

In certain aspects the one or more endophyte strains in the formulation are present in a synthetic seed ball. In other aspects, the one or more endophyte strains in the formulation are present in a seed treatment. The one or more endophyte strains in the formulation can also be present in a liquid formulation which is sprayed on seeds or the target plant. In other embodiments, the liquid formulation is applied to the plant as a root dunk. The formulation can also optionally comprise a controlled release fertilizer formulation.

The present invention also encompasses a synthetic combination comprising one or more microbes selected from *Rhodotorula* sp. (strain *Abrus* #1) and *Aureobasidium pullulans* (strain *Froelichia* #2), *Sphingomonas* sp. (strain *Abrus* #3), *Rhodococcus* sp. (strain AbrusR), *Micrococcus luteus* (strain *Lycopersicon* #1), *Curtobacterium* sp. (strain *Froelichia* #4), *Paenibacillus* sp. (strain PA-NA-2B1), PP16 (*Pseudomonas* sp.), PP21 (*Exiguobacterium* sp.), PP4-F (*Pseudomonas* sp.), AA3A (*Bacillus* sp.), Aa2 (*Bacillus* sp.), AA15 (*Bacillus* sp.), OVLBP2R (*Methylobacter* sp.), OVYP4AD19 (*Sphingomonas* sp.), OMPDAP5BK (*Bacillus* sp.), OMYESP3B (*Terribacillus* sp.), isolates 4, 5, 8, 12, 18, 22 from Table 4 and, or a combination of isolates 4 and 5 from Table 4, in a formulation suitable for application to a plant element or soil. The synthetic combination can be present in a seed ball. The synthetic combination can be present in a liquid suitable for application to seeds.

In certain embodiments of the method described above, the one or more microbes are the yeast *Aureobasidium pullulans* (*Froelichia* #2) and bacterium *Micrococcus luteus* (*Lycopersicum* #1) where strains complement one another, and the combination shows maximum seedling mortality. In other embodiments, the one or more microbes are selected from the yeast *Rhodotorula* sp. (strain *Abrus* #1), *Sphingomonas* sp. (strain *Abrus* #3) and *Micrococcus luteus* (*Lycopersicum* #1) which are each effective to inhibit root growth. In other embodiments, all of said microbes are present. Finally, the synthetic combinations of the invention may further comprise an insecticide or fungicide and/or the strains identified as having plant growth promoting activity.

BRIEF DESCRIPTION OF THE DRAWINGS

FIG. 1. *Micrococcus luteus*. *Micrococcus luteus* in seedling of carrots (arrows show white accumulations of bacteria around seedlings on agarose after two weeks.

FIG. 2. Tetrads of *Micrococcus luteus* (arrows) from colonies on yeast extract-sucrose agar (bar=10 μm).

FIG. 3. Cells around root-tip meristem of seedling of *Rumex crispus* showing tetrads of *Micrococcus luteus* (arrows) in the periplasmic space of cells (bar=25 μm).

FIG. 4. Cells around the root-tip meristem of a seedling of *Rumex crispus* that had not been inoculated with *Micrococcus luteus*, showing that bacteria are not visible in cells (bar=25 μm).

FIG. 5 Parenchyma cells of *Rumex crispus* showing spherical bacterial L-forms of *Micrococcus luteus* (arrows) in periplasmic spece of cells (bar=25 μm).

FIG. 6. Parenchyma cells of *Rumex crispus* showing spherical bacterial L-forms of *Micrococcus luteus* (arrows) in periplasmic spece of cells (bar=25 μm).

FIG. 7. *Micrococcus luteus* in host tissues (stained with 3,3-diaminobenzidine for 15 hours followed by aniline blue). L-forms of *Micrococcus luteus* (arrows) in root hair of *Rumex crispus* (bar=25 μm).

FIG. 8. Root hair initial of *Rumex crispus* seedling showing spherical L-forms in periplasmic space (white arrow) and blue tetrads of *Micrococcus luteus* reporming as bacteria (black arrow) exit through the cell wall and spill off the side of the root hair initial (bar=25 μm).

FIG. 9. Root hair of *Rumex crispus* seedling showing *Micrococcus luteus* exiting the root hair at the hair tip, and reforming tetrads (arrows; bar=25 μm).

FIG. 10. Root hairs of carrot (*Daucus carota*) seedling showing exiting of *Micrococcus luteus* from the tips of hairs (arrows; bar=20 μm).

FIG. 11. Root hair initial of carrot seedling showing *Micrococcus luteus* emerging from the hair initial (arrows; bar=20 μm). FIG. 12. Root hair tip of *Rumex crispus* seedling showing spherical L-forms (white arrow) in periplasmic space and tetrads (black arrow) of *Micrococcus luteus* just outside the cell wall; exit channels are visible passing through the cell wall (bar=5 μm).

FIG. 13. *Aureobasidium pullulans* in seedling cells (stained with 3,3-diaminobenzidine for 15 hours, followed by aniline blue). Root hair of *Amaranthus hypochondriacus* seedling inoculated with *Aureobasidium pullulans*, showing intracellular, brown-staining and collapsed walled yeast cells (white arrow) and extracellular, blue-staining yeast cells (black arrows; bar=20 μm).

FIG. 14. *Amaranthus viridis* seedling root parenchyma cell showing intracellular walled hypha (arrow) of *Aureobasidium pullulans* (bar=25 μm).

FIG. 15. *Froelichia gracilis* seedling root hair showing intracellular yeast mycosomes (arrows; bar=20 μm).

FIG. 16. *Amaranthus viridis* root parenchyma cells showing abundance of intracellular brown-staining yeast mycosomes (bar=25 μm).

FIG. 17. *Froelichia gracilis* seedling root hair with intracellular yeast mycosomes (arrows; bar=20 μm).

FIG. 18. *Amaranthus viridis* root hair without intracellular yeasts (bar=20 μm).

FIG. 19C. Carrot (*Daucus carota*; Apiaceae) Seedlings are Inhibited by *Micrococcus*. FIG. 19D. Japanese knotweed (*Fallopia japonica* Polygonaceae) seedling growth is also inhibited by *M. luteus*.

FIGS. 21A-21B. *Taraxacum officinale* seedling root hairs stained with aniline blue as well as DAB for $H_2O_2$ 14 days after seeds were inoculated with a *Pantoea* sp. (Isolate 4). Root hairs of a non-inoculated seedling (FIG. 21A) are intact while roots hairs from an inoculated seed (FIG. 21B) have ruptured (indicated with arrows).

FIG. 22. *Trifolium repens* seedlings 14 days after inoculation with *Pantoea* sp. Isolate 5 (FIG. 22A), *Pantoea* sp. Isolate RiLB4 (positive control) (FIG. 22B), and bacteria free control (FIG. 22C).

Figure 19A:
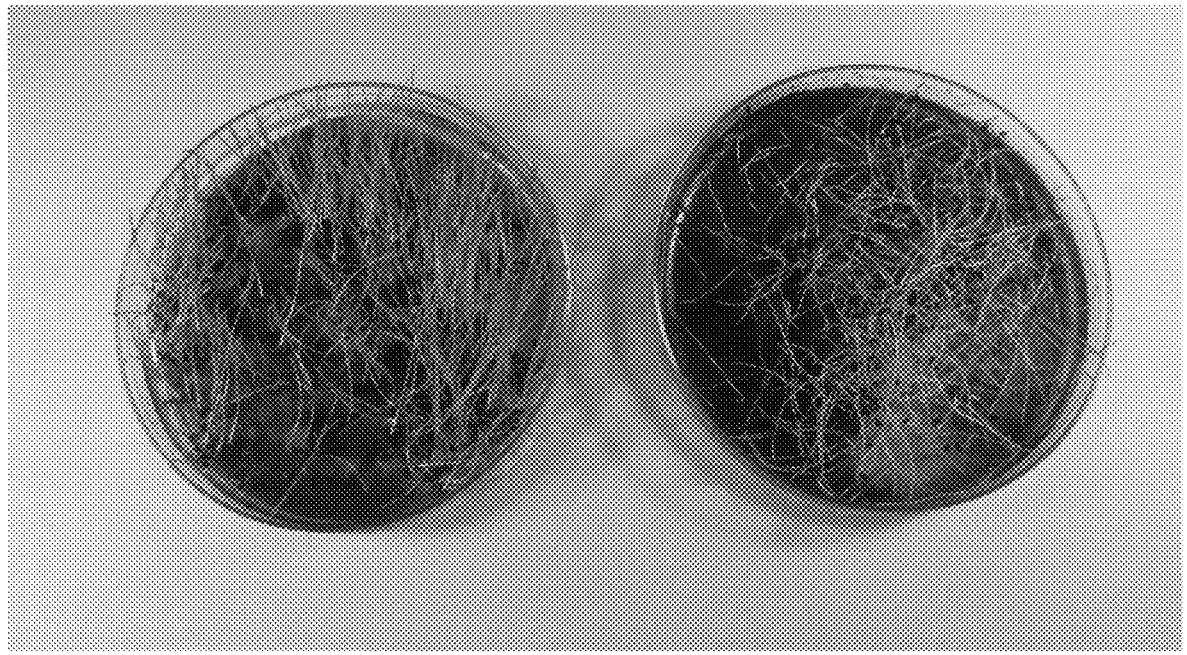
FIG. 19A. *Micrococcus*-treated *Poa annua* seedlings do not grow properly in the agarose assays. Seedling roots are undeveloped and seedlings lodge rather than stand upright.

The following species were deposited with the ARS Culture Collection (NRRL), 1815 N. University Street, Peoria, IL 61604 on Dec. 1, 2022:

*Rhodotorula* sp. strain *Abrus* #1-NRRL Accession No: Y-68245,
*Pseudomonas* sp. strain PP16-NRRL Accession No: B-68242,
*Sphignomonas* sp. strain OVYP4AD19-NRRL Accession No: B-68243, and
*Exiguobacterium* sp. PP21-NRRL Accession No: B-68244.

The following species were deposited with the ARS Culture Collection (NRRL), 1815 N. University Street, Peoria, IL 61604 on Jul. 15, 2022:

*Aureobasidium pullulans* strain Froelichia #2-NRRL Accession No: B-68181,
*Rhodococcus* sp. strain AbrusR-NRRL Accession No: B-68175,
*Micrococcus luteus* strain Lycopersicon #1-NRRL Accession No: B-68176,
*Curtobacterium* sp. strain Froelichia #4-NRRL Accession No: B-68177,
*Paenibacillus* sp. strain PA-NA-2B1-NRRL Accession No: B68174,
*Bacillus* sp. strain AA2-NRRL Accession No: B-68178,
*Bacillus* sp. strain OMPDAP5BK-NRRL Accession No: B-68180, and
*Bacillus* sp. strain AA3A-NRRL Accession No: B-68173.

DETAILED DESCRIPTION OF THE INVENTION

Considerable experimental evidence has been accumulated that supports the disease suppressive role of seed-vectored microbes (Verma et al., 2018). These microbes control disease in two ways: 1) by direct colonization of potentially pathogenic soil borne fungi and suppression of their growth and virulence, and/or 2) colonization of seedlings resulting in up-regulation of defense-related genes that makes plants more resistant to disease (Gond et al., 2015; Irizarry and White, 2018).

This invention pertains to the use of endophytic microbes, including, but not limited to *Micrococcus luteus* (strain Lycospersicon #1), *Rhodococcus* sp. (strain AbrusR), *Paenibacillus* sp. (strain PA-NA-2B1), *Rhodotorula* sp. (strain *Abrus* #1), *Sphingomonas* sp. (strain *Abrus* #3), *Pantoea* sp. (strains crabgrass #4 and #5), and *Aureobasidium pullulans* (strain *Froelichia* #2) as bioherbicides to suppress growth and development of weed plants. The endophytes were obtained from plant species *Abrus precatorius, Froelichia gracilis, Lycopersicum esculentum, Digitaria ischaemum,* and *Poa annua*. Several of these endophytes were shown to suppress development of seedlings of dandelion (*Taraxacum officionale*), curly dock (*Rumex crispus*), clover (*Trifolium repens*), Japanese knotweed (*Fallopia japonica*) and annual bluegrass (*Poa annua*), *Amaranthus hypochondriacus* and *Amaranthus viridis*. Inhibitory microbes were found to enter into root cells at the root tip meristem, becoming located within the periplasmic spaces, between the cell wall and plasma membrane. Normally microbes in root symbiosis play roles in modulation of plant development, including stimulation of root gravitropic response (trigger roots to grow downward) and increasing root and shoot growth. Maladaptive endophytic microbes from other hosts displaced native endophytes and disrupted functions of the symbiosis, and led to reduced seedling growth and increased seedling mortality. The term 'endobiome interference' is used herein to describe this maladaptive symbiosis. None of these microbes appeared to be pathogenic or inhibitory of growth in their original hosts based on growth of seedlings containing microbes on agarose media. *Micrococcus luteus* was found to be growth promotional in tomato seedlings, resulting in intracellular colonization and increased root hair length. Accordingly, these microbes have utility in agricultural products to promote growth of crop species and suppress growth of undesirable weed species.

*Digitaria ischaemum* (Schreb) Schreb ex Muhl Schreb. and *Poa annua* L. are competitive early successional species usually considered weeds in agricultural and turfgrass systems. Bacteria and fungi associated with these weeds may contribute to their competitiveness. *D. ischaemum* and *P. annua* are annuals that reproduce exclusively through seed. These seeds may be a mechanism to vector important microbes. We tested whether bacteria associated with *D. ischaemum* and *P. annua* seeds would affect seedling growth and antagonize competitor forbs such as *Taraxacum officinale, Trifolium repens*. Bacteria and fungi associated with seeds of *D. ischaemum* and *P. annua* were isolated for study in axenic culture. Twenty-four bacterial strains and two fungal species were isolated. Twenty-four bacterial strains were inoculated onto *T. officinale* seeds. Ten strains were antagonistic to *T. officinale* seedling growth and four of those were antagonistic enough to cause significant seedling mortality. All four bacterial strains that increased *T. officinale* mortality were isolated from *D. ischaemum* seed while none of the 14 isolates from *P. annua* seed increased mortality. Two of the four bacterial isolates (characterized as *Pantoea* spp.) were evaluated further on *D. ischaemum, T. repens* (a competitor forb) and *P. annua* (a competitor grass) alone and in combination with a *Curvularia* sp. fungus also isolated from *D. ischaemum* seed. These bacteria caused >65% *T. repens* seedling mortality but did not affect *P. annua* seedling mortality. Effects on *D. ischaemum* seedling mortality were inconsistent. Whether alone or in combination with bacteria, *Curvularia* was highly pathogenic to *D. ischaemum* and *T. repens* but not *P. annua*. This *Curvularia* sp. was growth promotional in *P. annua*, increasing the gravitropic response of *P. annua* roots. These data demonstrate that bacteria associated with *D. ischaemum* seeds may be antagonistic to competitor forbs. The weedy character of *D. ischaemum* could at least in part stem from possession of bacteria that are antagonistic to competitor species.

Definitions

An "endophyte" or "endophytic microbe" is an organism that lives within a plant or is otherwise associated therewith. Endophytes can occupy the intracellular or intercellular spaces of plant tissue, including the leaves, stems, flowers, fruits, seeds, or roots. An endophyte can be either a bacterial or a fungal organism that can confer a beneficial property to a plant such as an increase in yield, biomass, resistance, or fitness in its host plant. As used herein, the term "microbe" or "bacteria" is sometimes used to describe an endophyte.

Several strains of the bacteria described herein can be identified by their distinct ribosomal 16S sequences. 16S ribosomal RNA (or 16S rRNA) is the component of the 30S small subunit of a prokaryotic ribosome that binds to the Shine-Dalgarno sequence. The genes coding for it are referred to as 16S rRNA gene (ITS regions) and are used in reconstructing phylogenies, due to the slow rates of evolution of this region of the gene.

*Rhodotorula* sp. (strain Abrus#1) (ITS rDNA)

(SEQ ID NO: 1)

CTAAAGTTGACTAATAGAATTAGAAGCTTCTACTTTACAAAACTCGGCCACTCCCGAAAGAGCGTCCT

CAGCGAATAGTCTATTACACTGAGTCAATCCGATTTTCGAATATGAGATGCTAATCATTTACGAACGA

GCTTCGCCAATAAAGGCCAGCAGGCGTTCAGAATCCAAACACTAATCCGATTTACTAGAAACCGGTAG

GTTGAAGAGTTCATGACACTCAAACAGACATGCTCTCCGGAATACCAGAGAGCGCAAGGTGCGTTCAA

AGATTCGATGATTCACTGAATTCTGCAATTCACATTACTTATCACATTTCGCTGCGTTCTTCATCGATGC

GAGAGCCAAGAGATCCGTTGTTGAAAGTTTTTTTTTGTTTTGTTTTTATTTACATACTTTAACTAATGTT

TAATAGTGAGCCGCAGACTGAATAGCAATTGCTTACTCTCAGTCCGCCAATAGTGCACAGAGTTGGAA

AATGAAGGTTGAGCTAACCGAAGTTACGCTCTAAATTCACTAATGATCCTTC

*Sphingomonas* sp. (strain Abrus#3) (16S rDNA)

(SEQ ID NO: 2)

AGTCGACGATGCTCTCTCGGCATAGGGTTGCGTGGGTGCTGCGCCTTGGGGGCGTACCGCGTCCCTCT

GGGATAACAGGTGTGGGCGAACGGTCTGAGAACGTGGTATCTCGAGGTTGATATCTTGCCATCAAAGG

ATGATCCCCCGTCGTATTCCCCGCTTGGAGAGAACTATCTGGTGGGGGGAAGGCCTACGAAGGCGGCT

TGCTGGGACGGTCCTGCGCGGCGGATCTGACACCCTGGGACTGCTCCTCGGGCCGGCCTCCTAGGGGA

AGAATCAGTGGGGAATAATGCCCTATGCGCGAAAGCCTGTGCCAGCGGTGCCCTGTTTATGGTGGAGC

ACTTCGGGTTGTAAAGCTCTTTTTTGCCGGGATGCGAATGACAGTACCCGCCAAATTCCCCGCGGCCAA

CCCCGTGCCTGCAGCCGGGGCAATAGGGGCGGGGATAGCGTGGTTCGGAAGTACTGGGCGTAAAGTT

TGCGGACCTGGCAAGAGCTGGTGAAGGTCTGCTCGTTAATTCCAATTAAACAAGTGCCTTTGCCGCTG

GGTCACTTGACCGGCAGTTCCTTAGGGGTTTATCCAATTGTACAAGAGACACTCGAGGATAATCTGAA

GAGCCAGCTGGGCGAACCGAGGATGATGTTGCGGGGCTGCTACTGATCATCGAAAGAGGCGTGGATT

ACCTGGGAATCCACTCCGGTATGCTTGGCCCGCTTTTGCGCCTCGTCGCGGATCGGGGGTGTGGAAGTT

GGGTGGTCCACTGAAGCTCCTGGGAATATCTACTAGGTAGTCCTGTACCCTCGAATAAACGGGGCCCT

CTCCAGCGGGGCATCGTGGGGCTGTGGAACGAGCGGCTCACATCAAAGTACCGCCGTTAACCTTGGCC

GGACTATTTCTGTACCGGGCGCTTCACCACTCGGGGCTCCTACCTCAGGTACTTGCTGGCGGACGGCTG

CTTGGGTGTCGACGGGTTGAGCAAGGGCTGATTGGACCGGGACCCCCATCCATAAGTTCCTATCCTTT

AATTACCGTAATTTAAAAGGGAAC

*Rhodococcus* sp. (strain AbrusR) (16S rDNA)

(SEQ ID NO: 3)

TTCGCCGCCGGCTTCGGGTGTTACCGACTTTCATGAGGGGACGGGCGGTGTGTACAAGGCCCGGGAAC

GTATTCACCGCAGCGTTGCTGATCTGCGATTACTAGCGACTCCGACTTCACGGGGTCGAGTTGCAGAC

CCCGATCCGAACTGAGACCGGCTTTAAGGGATTCGCTCCACCTCACGGTATCGCAGCCCTCTGTACCG

GCCATTGTAGCATGTGTGAAGCCCTGGACATAAGGGGCATGATGACTTGACGTCGTCCCCACCTTCCT

CCGAGTTGACCCCGGCAGTCTCCTGCGAGTCCCCCGACTCCGCGGGTGGCAACACAGGACAAGGGTTG

CGCTCGTTGCGGGACTTAACCCAACATCTCACGACACGAGCTGACGACAGCCATGCACCACCTGTACA

CCGACCACAAGGGGGGCCGTGTCTCCACGGCTTTCCGGTGTATGTCAAACCCAGGTAAGGTTCTTCGC

GTTGCATCGAATTAATCCACATGCTCCGCCGCTTGTGCGGGCCCCCGTCAATTCCTTTGAGTTTTAGCC

TTGCGGCCGTACTCCCCAGGCGGGGCGCTTAATGCGTTAGCTACGGCACGGATCCCGTGGAAGGAAAC

CCACACCTAGCGCCCACCGTTTACGGCGTGAACTACCAGGGTATCTAATCCTGTTCGCTACCCACGCAT

TCGCTCCTCAGCGTCAGTTATTTCCCAGAGACCCGCCTTCGCCACCGGTGTTCCTCCTGATATCTGCGC

ATTTCACCGCTACATCAGGAATTCCAGTCTCCCCTGAAGTACTCAAGTCTGCCCGTATCGCCTGCAAGC

CAACAGTTGAGCTGCTGGGATCCTCAGACGATGCGACAAACCGCCTACAAGCTCTTTACCCCCAGTAA

TTCCGGACGAAGCTTGGAGCCTACGTGGTACCCCGGCTGCTGGCACGTAGTTGGCCGG

-continued

*Curtobacterium* sp. (strain Froelichia#4) (16S rDNA)
(SEQ ID NO: 4)
TGGGGTCGTCCGACGAGGGGGAGCTTGCCCGGGTGCGGGGTGGAGAAAGGTTGATGACTTCGTGAGT

AACCTGCCCATGGCTCTGGGATGTATTTAGCACACGACGTCTAATACTGGATAAGATCAGACGCCGCA

TGGACTGGTGGTGGAAGCAGATTTCAGTTGGGGCTGGACTCGCGGCCTATCAGCTTGTTGGTGAGGTA

ATGGCTCACCAAGGCGGCGCCGGGTAGCCGGCCTGGCGGGGTGCCCGGCCACACTGGGGCTGAATGA

CGGCCCAGCCTCCTACGGGTCGCAGCAGTGGGGAATATTGCACAATGGGCGAAAGCCTGCTGCAGCA

ACGCCGCGTGTAGGACGAGGGCCTTCGGGTTGTAAACCTCTTTTAGTAGGGAAGAAGCCACGAGGTGG

GTACCTGCAGAAAAAGCACCGGCTAACTACGTGCGAGCAGCCGCGGTAATACGTAGGGTGCAAGCGT

TGTCCGGAATTATTGGGCGTAAAGAGCTCGTACGCGGTTTGTCGCGTCCTCCGCCGCTTGCCGAGGCTC

CCCCTCGGGCTTGCGGTGGGTACGGGCAGACTAGAGTGCGGCAGGGGAGGCTGTAAATGCTGGAGCT

GCGGCGCAAAGCGCAGAGAACAGGCCGAACATCTATGGCCAAACGTTAACTCTGGGGCGTAACTGGG

GCTGTAGTCCTGATCCGTGGGGACCCATTCGGTCTACAGCGTCTGGTACTGCCCGCAGTAATCGTTTCG

CCCTCGGTGTACCGCCCGTTACCCGGGTTCTGCGCCGCAACTCCCGGATTTCCGCCCCCCCTAGGGAA

TTCTGCCGCGCCGGTAAACCTTGAAGGCCTTAGGGGGGGCCTCGGCAATCCGCGGCACATGCGACTAA

ACTCCTAGCAGCGCTTTACACCTTACCATTCCTGGACATCCCCCGGACCATAGGTATGACATGGGCTGC

CCCTACGGAGCGGGGCAGGGGCTTTTTATTGCAGGTATCGGCACTTTCCCTGCGATCT

*Paenibacillus* sp. (strain PA-NA-2B1) (16S rDNA)
(SEQ ID NO: 5)
CAATTCCGACTTCATGCAGGCGAGTTGCAGCCTGCAATCCGAACTGAGACCGGCTTTTAAGGATTGGC

TCCATCTTGCGATATTGCTTCCCGTTGTACCGGCCATTGTAGTACGTGTGTAGCCCAAGTCATAAGGGG

CATGATGATTTGACGTCATCCCCACCTTCCTCCGGTTTGTCACCGGCAGTCTGCTTAGAGTGCCCACCA

TGATGTGCTGGCAACTAAGCATAAGGGTTGCGCTCGTTGCGGGACTTAACCCAACATCTCACGACACG

AGCTGACGACAACCATGCACCACCTGTCTCCTTTGTCCCGAAGGAAAAGACTATCTCTAGTCCGGTCA

AAGGGATGTCAAGACTTGGTAAGGTTCTTCGCGTTGCTTCGAATTAAACCACATACTCCACTGCTTGTG

CGGGTCCCCGTCAATTCCTTTGAGTTTCAGTCTTGCGACCGTACTCCCCAGGCGGAATGCTTAATGTGT

TAACTTCGGCACCAAGGGTATCGAAACCCCTAACACCTAGCATTCATCGTTTACGGCGTGGACTACCA

GGGTATCTAATCCTGTTTGCTCCCCACGCTTTCGCGCCTCAGCGTCAGTTACAGCCCAGAAAGTCGCCT

TCGCCACTGGTGTTCCTCCACATCTCTACGCATTTCACCGCTACACGTGGAATTCCACTTTCCTCTTCT

GTACTCAAGCTCTCCAGTTTCCAGTGCGACCCAAGGTTGAGCCTTGGGCTGTGACACCGGACTTAAAA

AGCCGCCTGCGCGCGCTTTACGCCCAATAATTCCGGACAACGCTTGCCCCCTACGTATTACCGCGGCTG

CTGGCACGTAGTTAGCCGGGGCTTT

*Pantoea* sp. (strain #4) (16S rDNA)
(SEQ ID NO: 6)
GGTATGCACTCCCCGGGTGGCTAGCCACCCTACTTCTTTTGCACCCCCCTCCCTTGTTGTGACGGGGGG

TGTGTACAAGGCCCGGGAAGGTATTACCCGGGGAATTCTGTTCACCGATAACTGGCGATTCCGACTTC

AGGGAGCCGAGTTGCAGATTCCGATCCGGACAACGCCGCATTTTATGAGGTCCGTTGGCTCTCGCGGG

GTCGCTTCTCTTTGTTGGCGCCATGGAAGCACGTGTGTAGCCCTACTCGTAAGGGCCATGTTGCCTTGC

CGTCATCCCCACCTTCCTCCGGTTTATCACCGGCAGTCTCTTTTGAGTTCCCGACCGAATCGCTGGCAA

CAAAGGTTAAGGGTTGCGCTCGTTGCGGGATTTAACCCAACATTTCACAACACGAGCTGCCGACAGCC

ATGCAGCACCTGTCTCAAATTTCCCGAAGGAAAAAAGGAATCTCTGCCTCTTCGTCGGGTTGTCAAGA

GTAGGTAAGGTTCTTCGCGTTGCATCGAATTAAACCACATGCTCCACCCTTGTGCGGGCCCCCCCGTCAA

TTCATTTGATTTTAAACCTTGCGGCCGAATTCCCAGGGCGGCCGCTTAACCGCGTAACCTCCGGAACCC

-continued

CCTCCCCAGGGAAAAACCCTCCAATCCAAATTCTTTAAGGGGGGGAATAACAGGGGAACCAATCCTG

GTTTCTTCCCACGCCTTCGGCACCGGACGGCAGTCCTCGGTCAAGGGGGCGCCCTTCCCCCCCGGAATT

CCTCCGAACTCCAATCCTTTTACCCCCTCTCCCGGAAATCTAACCCCCTTTAACAAATTTCAAGCCGGC

CGTTTTCAATGGAAGTTCCCGGTTAAAGCCGGGGGCTTTACATTCGAATTTAAAAAACCCCCGGGCGG

CGTTTTAGCCCCAGAATTTCCAATTAAGCTTGGAACCCTCTTAATAACCTCGATGGCTGGACCGATTTA

AACAGAGCCTTTTCCGGGGGGATCGGTCATCCAATG

Pantoea sp. (strain #5) (16S rDNA)

(SEQ ID NO: 7)
GGGGAGTATGCTGCGGGTTGTACCACATAGCTTCGGGAGGGAAAATACTTTCAGTGGGGGTGCTAACA

TTCTTTCAGTGGCCGAGTCGATGACGTTACCCACAGGAGTAGATTCGGGTAACCCCGTGCAAGCGCCC

GCGCTAATTCGGAGGCAGCAGGCCCGATTAGGAGTTAGTGGCCAGAAAGAGTAGGCAGGAGTTGGCG

TAAAGCGCATGCGGACGCCCGGGGCATTCAGATGGGAATGCCCTGGAATCTGGCAGGCAAGAGCATT

GTAAAGGGGGGGAGAATTCCATGTGAGGCGGGGAAAGGAGTAGAGGTGTAGCGGAAAACCGGGGGG

AGAGGCGGCCCCCTGCCGGAAGAGAGGCGGTCAGCTGCGAAAGCGAGGGGAGCAAACAGGATTAGG

TGCCCTGATCATCCACGCTTTGATCGATGTCGACTCCGAGCTTGTTCCGATGTCGACTGGGATCTGGAG

CTCACGCGTTAAGGCGTCCGCAGGGAGAGTACGACCGCAAGGTTAAAACTCAAACGAATGGAAGGGG

ACCCGCACAAGCGGTGGAGCATGTGGTTTAATTCGATGCAACGCGAAGAACCTTACCTACTCTTGACA

AAGAACCTTACCTACAGAGATCATCCAGTGCCTTCGGGAGAGATGAGACAGGTGCTGCATGGCTGTCG

TCAGCTCGTGTTGTGAAATGTTGGGTTAAGCCCGCAACGAGCGCAACCCTTATCCTTTGTTGCCAGCG

ATTCGGTCGGGAACTCAAAGGAGACTGCCGGGGATAAACCGGAGGAAGGTGGGGATGACGACAAGA

CACATGGCCCTTACGAGTAGGGCTACACACGTGCTACAATGGCGCCTACAAAGAGAAGCGACCGCGC

GAGAGCAAGCGGACCTCATAAACTGCGGCGTACGCCGGATCGGAATCTGCAACTCGACCGGGTGAAA

TCGGAATCGCCGGTAATCGGAGATCAGAATCCCACGGTAAATACGTTCCCAGGCCTTGTACACATACG

TTCCCGGACCATGGGAGCAGGTTGCAAAAGAAGATGGGAGTGGGTTGTAAAAGAAGTAGGTAGCTTA

ACCTTCGGGAGGGCGCTACC

Aureobasidium pullulans (strain Froelichia#2)

(SEQ ID NO: 8)
CCGTAGGGTGAACCTGCGGAAGGATCATTAAAGAGTAAGGGTGCTCAGCGCCCGACCTCCAACCCTTT

GTTGTTAAAACTACCTTGTTGCTTTGGCGGGACCGCTCGGTCTCGAGCCGCTGGGGATTCGTCCCAGGC

GAGCGCCCGCCAGAGTTAAACCAAACTCTTGTTATCAAACCGGTCGTCTGAGTTAAAATTTTGAATAA

ATCAAAACTTTCAACAACGGATCTCTTGGTTCTCGCATCGATGAAGAACGCAGCGAAATGCGATAAGT

AATGTGAATTGCAGAATTCAGTGAATCATCGAATCTTTGAACGCACATTGCGCCCCTTGGTATTCCGAG

GGGCATGCCTGTTCGAGCGTCATTACACCACTCAAGCTATGCTTGGTATTGGGTGCCGTCCTTAGTTGG

GCGCGCCTTAAAGACCTCGGCGAGGCCTCACCGGCTTTAGGCGTAGTAGAATTTATTCGAACGTCTGT

CAAAGGAGAGGACTTCTGCCGACTGAAACCTTTATTTTTCTAGTTGACCTCGGATCAGGTAGGGATAC

CCGCTGAACTTAAGCATATCAATAAGCGGAGGAA

OVLBP2R Methylobacter sp.

(SEQ ID NO: 9)
TCGAGTTGCAGAGTGCAATCTGAACTGAGACGGTTTTTGGGGATTTGCTCCAGATCGCTCCTTGCGTCC

CACTGTCACCGCCATTGTAGCACGTGTGTAGCCCATCCCGTAAGGGCCATGAGGACTTGACGTCATCC

ACACCTTCCTCGCGGCTTATCACCGGCAGTCTCCCTAGAGTGCCCAACTGAATGATGGCAACTAAGGA

CGTGGGTTGCGCTCGTTGCGGGACTTAACCCAACATCTCACGACACGAGCTGACGACAGCCATGCAGC

ACCTGTGTTCGCGTCCCCGAAGGGAACCCCGGATCTCTCCGGATGGCACGACATGTCAAGGGATGGTA

AGGTTCTGCGCGTTGCTTCGAATTAAACCACATGCTCCACCGCTTGTGCGGGCCCCCGTCAATTCCTTT

-continued

```
GAGTTTTAATCTTGCGACCGTACTCCCCAGGCGGAATGCTTAAAGCGTTAGCTGCGCTACTGCGGTGC

AAGCACCCCAACAGCTAGCATTCATCGTTTACGGCGTGGACTACCAGGGTATCTAATCCTGTTTGCTCC

CCACGCTTTCGCGCCTCAGCGTCAGTAATGGCCCAGTCAGCCGCCTTCGCCACTGGTGTTCTTGCGAAT

ATCTACGAATTTCACCTCTACACTCGCAGTTCCACTGACCTCTGCCATACTCAAGCCAAACAGTATCGA

AGGCAATTCTGTGGTTGAGCCACAGGCTTTCACCCCCGACTTGAATGGCCGCCTACGCGCCCTTTACGC

CCAGTGATTCCGAGCAACGCTAGCCCCCTTCGTATTACCGCGGCTGCTGGCACGAAGTTAGCCGGGGC

TTATTCTTCCGGTACCGTCATTATCGTCCCGGACAAAAGAGCTTTACAACCCTAAGGCCTTCATCACTC

ACGCGGCATGGCTGGATCAGGCTTGCGCCCATTGTCCAATATTCCCCACTGCTGCCTCCCGTAGGAGTC

TGGGCCGTGTCTCAGTCCCAGTGTGGCTGATCATCCTCTCAGACCAGCTACTGATCGTCGCCTTGGTAG

GCCATTACCCCACCAACTAGCTAATCAGACGCGGGCCGATCCTTCGGCAGTAAACCTTTCCCCAGGGC

CAGAGGCCATGGGCGTATCCGGTATTAGCGCTAGTTTCCCAGCGTTATTCCGAACCGAAGGGTACGTT

CCCACGTGTTACTCACCCGTCTGCCGCTGACACCGAAGTGCCCGCTCGACTTCC
```

OVYP4AD19 ID: *Sphingomonas* sp.
(SEQ ID NO: 10)
```
ACTAGCGATTCCGCCTTCATGCTCTCGAGTTGCAGAGAACAATCCGAACTGAGACGGCTTTTGGAGAT

TAGCGCACACTCGCGTGCTTGCTGCCCACTGTCACCGCCATTGTAGCACGTGTGTAGCCCAGCGCGTA

AGGGCCATGAGGACTTGACGTCATCCCCACCTTCCTCCGGCTTATCACCGGCGGTTCCTTTAGAGTCCC

CAACTGAATGATGGTAACTAAAGGCGAGGGTTGCGCTCGTTGCGGGACTTAACCCAACATCTCACGAC

ACGAGCTGACGACAGCCATGCAGCACCTGTGTTCCAGTCCCCGAAGGGAAGAGATCCATCTCTGGAAA

TCGTCCGGACATGTCAAACGCTGGTAAGGTTCTGCGCGTTGCTTCGAATTAAACCACATGCTCCACCGC

TTGTGCAGGCCCCCGTCAATTCATTTGAGTTTTAACCTTGCGGCCGTACTCCCCAGGCGGATAACTTAA

TGCGTTAGCTGCGCCACCCAAAGACCAAGTCCCCGGACAGCTAGTTATCATCGTTTACGGCGTGGACT

ACCAGGGTATCTAATCCTGTTTGCTCCCCACGCTTTCGCACCTCAGCGTCAATACCAGTCCAGTGAGCC

GCCTTCGCCACTGGTGTTCTTCCGAATATCTACGAATTTCACCTCTACACTCGGAATTCCACTCACCTCT

CCTGGATTCAAGCCATGCAGTATCAAAGGCAATTCTGGGGTTGAGCCCCAGGCTTTCACCTCTAACTTA

CAAAGCCGCCTACGTGCGCTTTACGCCCAGTAATTCCGAACAACGCTAGCTCCCTCCGTATTACCGCG

GCTGCTGGCACGGAGTTAGCCGGAGCTTAT
```

Aa15 ID: *Bacillus* sp.
(SEQ ID NO: 11)
```
GCTAATACCGGATAACATTTTGAACTGCATGGTTCGAAATTGAAAGGCGGCTTCGGCTGTCACTTATG

GATGGACCCGCGTCGCATTAGCTAGTTGGTGAGGTAACGGCTCACCAAGGCAACGATGCGTAGCCGAC

CTGAGAGGGTGATCGGCCACACTGGGACTGAGACACGGCCCAGACTCCTACGGGAGGCAGCAGTAGG

GAATCTTCCGCAATGGACGAAAGTCTGACGGAGCAACGCCGCGTGAGTGATGAAGGCTTTCGGGTCGT

AAAACTCTGTTGTTAGGGAAGAACAAGTGCTAGTTGAATAAGCTGGCACCTTGACGGTACCTAACCAG

AAAGCCACGGCTAACTACGTGCCAGCAGCCGCGGTAATACGTAGGTGGCAAGCGTTATCCGGAATTAT

TGGGCGTAAAGCGCGCGCAGGTGGTTTCTTAAGTCTGATGTGAAAGCCCACGGCTCAACCGTGGAGGG

TCATTGGAAACTGGGAGACTTGAGTGCAGAAGAGGAAAGTGGAATTCCATGTGTAGCGGTGAAATGC

GTAGAGATATGGAGGAACACCAGTGGCGAAGGCGACTTTCTGGTCTGTAACTGACACTGAGGCGCGA

AAGCGTGGGGAGCAAACAGGATTAGATACCCTGGTAGTCCACGCCGTAAACGATGAGTGCTAAGTGT

TAGAGGGTTTCCGCCCTTTAGTGCTGAAGTTAACGCATTAAGCACTCCGCCTGGGGAGTA
```

-continued

Aa2 ID: *Bacillus* sp.
(SEQ ID NO: 12)
GATGGTTCGAAATTGAAAGGCGGCTTCGGCTGTCTTTTATGGATGGACCCGCGTCGCATTAGCTAGTTG

GTGAGGTAACGGCTCACCAAGGCAACGATGCGTAGCCGACCTGAGAGGGTGATCGGCCACACTGGGA

CTGAGACACGGCCCAGACTCCTACGGGAGGCAGCAGTAGGGAATCTTCCGCAATGGACGAAAGTCTG

TCAAGGCTTGCGCTCGTTGCGGGTGTTAACCCAACATCCCACGACACGAGCTGTCGACAACCATGCAC

CACCTGTCACTCTGCTCCCGACCGTGAAGCCCTATCTCTAGGGTTTTCAGAGGAAGTCAAGGCCTGGTA

ACGCTCTAATACGTAGGTGGCAAGCGTTATCATGCTCTACCGCTCGTGCGGCGCCCGGTCGTTTCCTTT

GAATTTTGACCTGGCAGCCGACGTCCCAACGGGGGATGGTCATTGGAAAATGTGAAGCTTGAATGGAG

GAAAGGCCTCTGGAACTTAGTGTTTAGCGTTGAAGGGGGAGATACCTGGATGACTAACCCTGGTGAA

TCCGCACTCTTTGTCTGCACCTGGCCCTGTAGAGCGAAAACGTGCGGCTCCAACAGGGTTGGATCCCCT

GGTATCTACCGCCTTAAACGATGAGCGTGGAATGTTAGTTGCCTCTCCCCCTTTAAAGTTGACGTGTTC

GCATTGAGCACTCCGGCTGGGGACTAGGGCTTCAAGGTTGAAATTCAAAAGAATTGAGGGGGGCCT

CACGACCGGTGGAGCATGAG

Aa3a ID: *Bacillus* sp.
(SEQ ID NO: 13)
ATTACTAGCGATTCCAGCTTCATGTAGGCGAGTTGCAGCCTACAATCCGAACTGAGAACGGTTTTATG

AGATTAGCTCCACCTCGCGGTCTTGCAGCTCTTTGTACCGTCCATTGTAGCACGTGTGTAGCCCAGGTC

ATAAGGGGCATGATGATTTGACGTCATCCCCACCTTCCTCCGGTTTGTCACCGGCAGTCACCTTAGAGT

GCCCAACTTAATGATGGCAACTAAGATCAAGGGTTGCGCTCGTTGCGGGACTTAACCCAACATCTCAC

GACACGAGCTGACGACAACCATGCACCACCTGTCACTCTGCTCCCGAAGGAGAAGCCCTATCTCTAGG

GTTTTCAGAGGATGTCAAGACCTGGTAAGGTTCTTCGCGTTGCTTCGAATTAAACCACATGCTCCACCG

CTTGTGCGGGCCCCCGTCAATTCCTTTGAGTTTCAGCCTTGCGGCCGTACTCCCCAGGCGGAGTGCTTA

ATGCGTTAACTTCAGCACTAAAGGGCGGAAACCCTCTAACACTTAGCACTCATCGTTTACGGCGTGGA

CTACCAGGGTATCTAATCCTGTTTGCTCCCCACGCTTTCGCGCCTCAGTGTCAGTTACAGACCAGAAAG

TCGCCTTCGCCACTGGTGTTCCTCCATATCTCTACGCATTTCACCGCTACACATGGAATTCCACTTTCCT

CTTCTGCACTCAAGTCTCCCAGTTTCCAATGACCCTCCACGGGTTGAGCCGTGGGCTTTCACATCAGAC

TTAAGAAACCACCTGCGCGCGCTTTACGCCCAATAATTCCGGATAACGCTTGCCACCTACGTATTACCG

CGGCTGCTGGCACGTAGTTAGCCGTGGCTTTCTGGGTT

OMYESP3B ID: *Terribacillus* sp.
(SEQ ID NO: 14)
GATTCCGGCTTCATGCAGGCGAGTTGCAGCCTGCAATCCGAACTGAGAATGGTTTTATGGGATTTGCTT

AGCCTCGCGGCTTCGCTGCCCTTTGTACCATCCATTGTAGCACGTGTGTAGCCCAGGTCATAAGGGGCA

TGATGATTTGACGTCATCCCCACCTTCCTCCGGTTTGTCACCGGCAGTCACTCTAGAGTGCCCAACTGA

ATGCTGGCAACTAGAATCAAGGGTTGCGCTCGTTGCGGGACTTAACCCAACATCTCACGACACGAGCT

GACGACAACCATGCACCACCTGTCACGCTGTCCCGAAGGGAACGCCTTGTCTCCAAGGTTGTCAGCG

GATGTCAAGACCTGGTAAGGTTCTTCGCGTTGCTTCGAATTAAACCACATGCTCCACCGCTTGTGCGGG

CCCCCGTCAATTCTTTTGAGTTTCAGCCTTGCGGCCGTACTCCCCAGGCGGAGTGCTTAATGCGTTAAC

TTCAGCACTAAGGGGCGGAAACCCCCTAACACCTAGCACTCATCGTTTACGGCGTGGACTACCAGGGT

ATCTAATCCTGTTTGCTCCCCACGCTTTCGCGCCTCAGCGTCAGTTACAGACCAGAGAGTCGCCTTCG

CCACTGGTGTTCCTCCACATATCTACGCATTTCACCGCTACACGTGGAATTCCACTCTCCTCTTCTGCAC

TCAAGTTCCCCAGTTTCCAATGACCCTCCACAGTTAAGCTGTGGGCTTTCACATCA

-continued

OMPDAP5BK ID: *Bacillus* sp.

(SEQ ID NO: 15)
CGGATAGTTCCTTGAACCGCATGGTTCAAGGATGAAAGACGGTTTCGGCTGTCACTTACAGATGGACC
CGCGGCGCATTAGCTAGTTGGTGGGGTAATGGCTCACCAAGGCGACGATGCGTAGCCGACCTGAGAG
GGTGATCGGCCACACTGGGACTGAGACACGGCCCAGACTCCTACGGGAGGCAGCAGTAGGGAATCTT
CCGCAATGGACGAAAGTCTGACGGAGCAACGCCGCGTGAGTGATGAAGGTTTTCGGATCGTAAAGCT
CTGTTGTTAGGGAAGAACAAGTGCGAGAGTAACTGCTCGCACCTTGACGGTACCTAACCAGAAAGCCA
CGGCTAACTACGTGCCAGCAGCCGCGGTAATACGTAGGTGGCAAGCGTTGTCCGGAATTATTGGGCGT
AAAGGGCTCGCAGGCGGTTTCTTAAGTCTGATGTGAAAGCCCCCGGCTCAACCGGGGACGGTCATTGG
AAACTGGGAAACTTGAGTGCAGAAGAGGAGAGTGGAAGTACACGTGTAGCGGTGAAATGCGTAGAGA
TGTGGAGAAACAGCGGTGGA

Pp16 ID: *Pseudomonas* sp.

(SEQ ID NO: 16)
CTAGCGATTCCGACTTCACGCAGTCGAGTTGCAGACTGCGATCCGGACTACGATCGGTTTTATGGGATT
AGCTCCACCTCGCGGCTTGGCAACCCTCTGTACCGACCATTGTAGCACGTGTGTAGCCCAGGCCGTAA
GGGCCATGATGACTTGACGTCATCCCCACCTTCCTCCGGTTTGTCACCGGCAGTCTCCTTAGAGTGCCC
ACCATAACGTGCTGGTAACTAAGGACAAGGGTTGCGCTCGTTACGGGACTTAACCCAACATCTCACGA
CACGAGCTGACGACAGCCATGCAGCACCTGTCTCAATGTTCCCGAAGGCACCAATCTATCTCTAGAAA
GTTCATTGGATGTCAAGGCCTGGTAAGGTTCTTCGCGTTGCTTGAATTAAACCACATGCTCCACCGCT
TGTGCGGGCCCCCGTCAATTCATTTGAGTTTTAACCTTGCGGCCGTACTCCCCAGGCGGTCAACTTAAT
GCGTTAGCTGCGCCACTAAAAGCTCAAGGCTTCCAACGGCTAGTTGACATCGTTTACGGCGTGGACTA
CCAGGGTATCTAATCCTGTTTGCTCCCCACGCTTTCGCACCTCAGTGTCAGTATTAGTCCAGGTGGTCG
CCTTCGCCACTGGTGTTCCTTCCTATATCTACGCATTTCACCGCTACACAGGAAATTCCACCACCCTCT
ACCATACTCTAGTCAGTCAGTTTTGAATGCAGTTCCCAGGTTGAGCCCGGGGATTTCACATCCAACTTA
ACAAACCACCTACGCGCGCTTTACGCCCAGTAA

PP21 ID: *Exiguobacterium* sp.

(SEQ ID NO: 17)
ACCGAATAGTTCTTCAGACCGCATGGTCTGATGATGAAAGGCGCTCCGGCGTCACCTTGGGATGGCCT
TGCGGTGCATTAGCTAGTTGGTGGGGTAATGGCCCACCAAGGCGACGATGCATAGCCGACCTGAGAG
GGTGATCGGCCACACTGGGACTGAGACACGGCCCAGACTCCTACGGGAGGCAGCAGTAGGGAATCTT
CCACAATGGACGAAAGTCTGATGGAGCAACGCCGCGTGAGTGATGAAGGTTTTCGGATCGTAAAACTC
TGTTGTAAGGGAAGAACAAGTACGAGAGGTAATGCTCGTACCTTGACGGTACCTTGCGAGAAAGCCA
CGGCTAACTACGTGCCAGCAGCCGCGGTAATACGTAGGTGGCAAGCGTTGTCCGGAATTATTGGGCGT
AAAGCGCGCGCAGGCGGCCTTTTAAGTCTGATGTGAAAGCCCCCGGCTCAACCGGGGAGGGTCATTGG
AAACTGGAAGGCTTGAGTACAGAAGAGAAGAGTGGAATTCCATGTGTAGCGGTGAAATGCGTAGAGA
TGTGGAGGAACACCAGTGGCGAAGGCGACTCTTTGGTCTGTAACTGACGCTGAGGCGCGAAAGCGTG
GGGAGCAAACAGGATTAGATACCCTGGTAGTCCACGCCGTAAACGATGAGTGCTAGTGTTGGGGGGTT
TCCGCCCCTCAGTGCTGAAGCTAACGCATTAAGCACTCCGCCTGGGGAGTACGGCCGCAAGGCTGAAA
CTCAAGGAATTGACGGGGACCCGCACAAGCGGTGGAGCATGTGGTTTAATTCGA

Pp4F ID: *Pseudomonas* sp.

(SEQ ID NO: 18)
TAGCTACTTCTGGTGCAACCCACTCCCATGGTGTGACGGGCGGTGTGTACAAGGCCCGGGAACGTATT
CACCGCGACATTCTGATTCGCGATTACTAGCGATTCCGACTTCACGCAGTCGAGTTGCAGACTGCGATC
CGGACTACGATCGGTTTTGTGAGATTAGCTCCACCTCGCGGCTTGGCGACCCTCTGTACCGACCATTGT
AGCACGTGTGTAGCCCAGGCCGTAAGGGCCATGATGACTTGACGTCATCCCCACCTTCCTCCGGTTTGT

-continued

```
CACCGGCAGTCTCCTTAGAGTGCCCACCATAACGTGCTGGTAACTAAGGACAAGGGTTGCGCTCGTTA

CGGGACTTAACCCAACATCTCACGACACGAGCTGACGACAGCCATGCAGCACCTGTGTCAGAGTTCCC

GAAGGCACCAATCCATCTCTGGAAAGTTCTCTGCATGTCAAGGCCTGGTAAGGTTCTTCGCGTTGCTTC

GAATTAAACCACATGCTCCACCGCTTGTGCGGGCCCCCGTCAATTCATTTGAGTTTTAACCTTGCGGCC

GTACTCCCCAGGCGGTCAACTTAATGCGTTAGCTGCGCCACTAAAATCTCAAGGATTCCAACGGCTAG

TTGACATCGTTTACGGCGTGGACTACCAGGGTATCTAATCCTGTTTGCTCCCCACGCTTTCGCACCTCA

GTGTCAGTATCAGTCCAGGTGGTCGCCTTCGCCACTGGTGTTCCTTCCTATATCTACGCATTTCACCGCT

ACACAGGAAATTCCACCACCCTCTACTGTACTCTAGCTTGCCAGTTTTGGATGCAGTTCCCAGGTTGAG

CCCGGGGCTTTCACATCCAACTTAACAAACCACCTACGCGCGCTTTACGCCCAGTAATTCCGATTAACG

CTTGCACCCTCTGTATTACCGCGGCTGCTGGCACAGAGTTAGCCGGTGCTTATTCTGTCGGTAACGTCA

AAACAGCAAGGTATTCGCTTACTGCCCTTCCTCCCAACTTAAAGTGCTTTACAATCCGAAGACCTTCTT

CACACACGCGGCATGGCTGGATCAGGCTTTCGCCCATTGTCCAATATTCCCCACTGCTGCCTCCCGTAG

GAGTCTGGACCGTGTCTCAGTTCCAGTGTGACTGATCATCCTCTCAGACCAGTTACGGATCGTCGCCTT

GGTGAGCCATTACCCCACCAACTAGCTAATCCGACCTAGGCTCATCTGATAGCGCAAGGCCCGAAGGT

CCCCTGCTTTCTCCCGTAGGACGTATGCGGTATTAGCGTTCCTTTCGAAACGTTGTCCCCCACTACCAG

GCAGATTCCTAGGCATTACTCACCCGTCCGCCGCTGAATCGAAGAGCAAGC
```

Isolate 7 (16F, 27) *Pantoea* sp.

(SEQ ID NO: 19)
```
TGCAAGTCGGACGGTAGCACAGAGAGCTTGCTCTCGGGTGACGAGTGGCGGACGGGTGAGTAATGTC

TGGGGATCTGCCCGATAGAGGGGGATAACCACTGGAAACGGTGGCTAATACCGCATAACGTCGCAAG

ACCAAAGAGGGGGACCTTCGGGCCTCTCACTATCGGATGAACCCAGATGGGATTAGCTAGTAGGCGG

GGTAATGGCCCACCTAGGCGACGATCCCTAGCTGGTCTGAGAGGATGACCAGCCACACTGGAACTGA

GACACGGTCCAGACTCCTACGGGAGGCAGCAGTGGGGAATATTGCACAATGGGCGCAAGCCTGATGC

AGCCATGCCGCGTGTATGAAGAAGGCCTTCGGGTTGTAAAGTACTTTCAGCGGGGAGGAAGGCGATG

GGGTTAATAACCCTGTCGATTGACGTTACCCGCAGAAGAAGCACCGGCTAACTCCGTGCCAGCAGCCG

CGGTAATACGGAGGGTGCAAGCGTTAATCGGAATTACTGGGCGTAAAGCGCACGCAGGCGGTCTGTT

AAGTCAGATGTGAAATCCCCGGGCTTAACGGGGAACTGCATTTGAAACTGGCAGGCTTGAGTCTTGT

AGAGGGGGGTAGAATTCCAGGTGTAGCGGTGAAATGCGTAGAGATCTGGAGGAATACCGGTGGCGAA

GGCGGCCCCCTGGACAAAGACTGACGCTCAGGTGCGAAAGCGTGGGGAGCAAACAGGATTAGATACC

CTGGTAGTCCACGCCGTAAACGATGTCGACTTGGAGGTTGTTCCCTTGAGGAGTGGCTTCCGGAGCTA

ACGCGTTAAGTCGACCGCCTGGGGAGTACGGCCGCAAGGTTAAAACTCAAATGAATTGACGGGGGCC

CGCACAAGCGGTGGAGCATGTGGTTTAATTCGATGCAACGCGAAGAA
``` isolate 8

(16R, 1492 *Pantoea* sp. (SEQ ID NO: 20)
```
GGTAGCGCCCTCCCGAAGGTTACGTTCCCTAGTTTTTTCTACCCCCTCTCCTTTGGTCCCACTCCCGTGG

TGTACAAGGCCCGGGGAAGTAGGCACCGTGGCATACTGATCGACGATTTCTGGCGATTCCGACTTCAC

GGTTTCGAGTTGCAGGCTCCGATCCGGAGAACGCCGCACTTTATGAGATCCGCTTGCTCTCGCGAGGT

CGCTTCTCTTTGTATGCGCCATTGTAGCACGTGTGTAGCCCTACTCGTAAGGGCCATGTTGTCTTGGCG

TCATCCCCACCTTCCTCCGGTTTATCACCGGCAGTCTCCTTTGAGTTCCCGACCGAATCGCTGGCAACA

AAGGGCAAGGGTTGCGCTCGTTGCGGGGCTTAACCCAACATTTCACAACACGAGCTGACGAACACGA

GCTGACGACAGCCATGCAGCACCTGTCTGCACGCACCCGAAGGTGCTAAAGCATCTCTATGTCAAGAG

TAGGATGTCAAGAGTAGGTAAGATTCTTCGCGTTGCATCGAATTAAACCACATGCTCCACCGCTTGTG
```

-continued

CGGGCCCCCGTCAATTCATTTGAGTTTTAACCTTGCGGCCGTACTCCCCAGGCGGTCGACTTAACGCGT

TAGCTCCGGAAGCCACTCCTCAAGGGAACAACCTCTAAGTCGACATCGTTTACGGCGTGGACTACCAG

GGTATCTAATCCTGTTTGCTCCCCACGCTTTCGCACCTGAGCGTCAGTCTTCGTCCAGGGGCCGCCTT

CGCCACCGGTATTCCTCCAGATCTCTACGCATTTCACCGCTACACCAGAAATTCTACCCCCCTCTACGA

GATTCAAGCCTGCCGGTTTTAAATGCAGTTCCCAGGGTCAGCCCGGGGATTTCACATCTGATTCAACA

GAACGCCTGCGTGCGCTTTACGCCCAGGAATTCCGATTAACGCTTGCACCCTCCGTATTACCGGGGCTG

CTGGTACGGAGATAGCCGGAGCTTCTCGGCGGGGAATGGCGATCGAATA isolate 9 (16R, 1492) Pantoea sp.
(SEQ ID NO: 21)
AGCGCCCTCCCGAAGGTTAAGCTACCTACTTCTTTTGCAACCCACTCCCATGGTGTGACGGGCGGTGTG

TACAAGGCCCGGGAACGTATTCACCGTGGCATTCTGATCCACGATTACTAGCGATTCCGACTTCACGG

AGTCGAGTTGCAGACTCCGATCCGGACTACGACGCACTTTTATGAGGTCCGCTTGCTCTCGCGAGGTCG

CTTCTCTTTGTATGCGCCATTGTAGCACGTGTGTAGCCCTACTCGTAAGGGCCATGATGACTTGACGTC

ATCCCCACGTCCTCCGGTTTATCACCGGCAGTCTCCTTTGAGTTCCCGACCGAATCGCTGGCAACAAA

GGATAAGGGTTGCGCTCGTTGCGGGACTTAACCCAACATTTCACAACACGAGCTGACGACAGCCATGC

AGCACCTGTCTCAGAGTTCCCGAAGGCACCAAAGCATCTCTGCTAAGTTCTCTGGATGTCAAGAGTAG

GTAAGGTTCTTCGCGTTGCATCGAATTAAACCACATGCTCCACCGCTTGTGCGGGCCCCCGTCAATTCA

TTTGAGTTTTAACCTTGCGGCCGTACTCCCCAGGCGGTCGACTTAACGCGTTAGCTCCGGAAGCCACTC

CTCAAGGGAACAACCTCCAAGTCGACATCGTTTACGGCGTGGACTACCAGGGTATCTAATCCTGTTTG

CTCCCCACGCTTTCGCACCTGAGCGTCAGTCTTCGTCCAGGGGGCCGCCTTCGCCACCGGTATTCCTCC

AGATCTCTACGCATTTCACCGCTACACCTGGAATTCTACCCCCCTCTACGAGACTCAAGCCTGCCAGTT

TCAAATGCAGTTCCCAGGTTAAGCCCGGGGA isolate 10 (16R, 1492) Pantoea sp.
(SEQ ID NO: 22)
TACTTCTTTTGCAACCCACTCCCATGGNTGTGACGGGCGGTGTGTACAAGGCCCGGGAACGTATTCAC

CGTGGCATTCTGATCCACGATTACTAGCGATTCCGACTTCACGGAGTCGAGTTGCAGACTCCGATCCG

GACTACGACGCACTTTATGAGGTCCGCTTGCTCTCGCGAGGTCGCTTCTCTTTGTATGCGCCATTGTAG

CACGTGTGTAGCCCTACTCGTAAGGGCCATGATGACTTGACGTCATCCCCACCTTCCTCCGGTTTATCA

CCGGCAGTCTCCTTTGAGTTCCCGACCGAATCGCTGGCAACAAAGGATAAGGGTTGCGCTCGTTGCGG

GACTTAACCCAACATTTCACAACACGAGCTGACGACAGCCATGCAGCACCTGTCTCAGAGTTCCCGAA

GGCACCAAAGCATCTCTGCTAAGTTCTCTGGATGTCAAGAGTAGGTAAGGTTCTTCGCGTTGCATCGA

ATTAAACCACATGCTCCACCGCTTGTGCGGGCCCCCGTCAATTCATTTGAGTTTTAACCTTGCGGCCGT

ACTCCCCAGGCGGTCGACTTAACGCGTTAGCTCCGGAAGCCACTCCTCAAGGGAACAACCTCCAAGTC

GACATCGTTTACGGCGTGGACTACCAGGGTATCTAATCCTGTTTGCTCCCCACGCTTTCGCACCTGAGC

GTCAGTCTTCGTCCAGGGGCCGCCTTCGCCACCGGTATTCCTCCAGATCTCTACGCATTTCACCGCTA

CACCTGGAATTCTACCCCCCTCTACGAGACTCAAGCCTGCCAGTTTCAAATGCAGTTCCCAGGTTAAGC

CCGGGGATTTCACATCTGACTTAACAGACCGCCTGCGTGCGCTTFACGCCCAGTAATTTCCGATTAACG

CTTGCA

Isolate 11 (16F, 27) Staphylococcus sp.
(SEQ ID NO: 23)
TGCAAGTCGAGCGAACAGATAAGGAGCTTGCTCCTTTGACGTTAGCGGCGGACGGGTGAGTAACACGT

GGGTAACCTACCTATAAGACTGGGATAACTTCGGGAAACCGGAGCTAATACCGGATAACATTTGGAAC

CGCATGGTTCTAAAGTGAAAGATGGTTTTGCTATCACTTATAGATGGACCCGCGCCGTATTAGCTAGTT

GGTAAGGTAACGGCTTACCAAGGCGACGATACGTAGCCGACCTGAGAGGGTGATCGGCCACACTGGA

-continued

```
ACTGAGACACGGTCCAGACTCCTACGGGAGGCAGCAGTAGGGAATCTTCCGCAATGGGCGAAAGCCT

GACGGAGCAACGCCGCGTGAGTGATGAAGGGTTTCGGCTCGTAAAACTCTGTTATTAGGGAAGAACA

AATGTGTAAGTAACTGTGCACATCTTGACGGTACCTAATCAGAAAGCCACGGCTAACTACGTGCCAGC

AGCCGCGGTAATACGTAGGTGGCAAGCGTTATCCGGAATTATTGGGCGTAAAGCGCGCGTAGGCGGTT

TCTTAAGTCTGATGTGAAAGCCCACGGCTCAACCGTGGAGGGTCATTGGAAACTGGGAAACTTGAGTG

CAGAAGAGGAAAGTGGAATTCCATGTGTAGCGGTGAAATGCGCAGAGATATGGAGGAACACCAGTGG

CGAAGGCGACTTTCTGGTCTGTAACTGACGCTGATGTGCGAAAGCGTGGGGATCAAACAGGATTAGAT

ACCCTGGTAGTCCACGCCGTAAACGATGAGTGCTAAGTGTTAGGGGGTTTCCGCCCCTTAGTGCTGCA

GCTAACGCATTAAGCACTCCGCCTGGGGAGTACGACCGCAAGGTTGAAACTCAAAGGAATTGACGGG

GACCCGCACAAGCGGTGGAGCATGTGGTTTAATTCGAAGCAACGCGAAGAA

Isolate 13 (1492) Pantoea sp.
                                                          (SEQ ID NO: 24)
GGTAAGCGCCCTCCCGAAGGTTAAGCTACCTACTTCTTTTGCAACCCACTCCCATGGTGTGACGGGCG

GTGTGTACAAGGCCCGGGAACGTATTCACCGTGGCATTCTGATCCACGATTAGAGCGATTCCGACTTC

ACGGAGTCGAGTTGCAGACTCCGATCCGGACTACGACGCACTTTATGAGGTCCGCTTGCTCTCGCGAG

GTCGCTTCTCTTTGTATGCGCCATTGTAGCACGTGTGTAGCCCTACTCGTAAGGGCCATGATGACTTGA

CGTCATCCCCACCTTCCTCCGGTTTATCACCGGCAGTCTCCTTTGAGTTCCCGACCGAATCGCTGGCAA

CAAAGGATAAGGGTTGCGCTCGTTGCGGGACTTAACCCAACATTTCACAACACGAGCTGACGACAGCC

ATGCAGCACCTGTCTCAGAGTTCCCGAAGGCACCAAAGCATCTCTGCTAAGTTCTCTGGATGTCAAGA

GTAGGTAAGGTTGTCGCGTTGCATCGAATTAAACCACATGCTCCACCGCTTGTGCGGGCCCCCGTCAA

TTCATTTGAGTTTTAACCTTGCGGCCGTACTCCCCAGGCGGTCGACTTAACGCGTTAGCTCCGGAAGCC

ACTCCTCAAGGGAACAACCTCCAAGTCGACATCGTTTACGGCGTGGACTACCAGGGTATCTAATCCTG

TTTGCTCCCCACGCTTTCGCACCTGAGCGTCAGTCTTCGTCAGGGGGCCGCCTTCGCCACCGGTATTC

CTCCAGATCTCTACGCATTTCACCGCTACACCTGGAATTCTACCCCCCTCTACGAGACTCAAGCCTGCC

AGTTTCAAATGCAGTTCCCAGGTTAAGCCCGGGGATTTCACATCTGACTTAACAGACCGCCTGCGTGC

GCTTTACGCCCAGTAATTCCGATTAACGCTTGCACCCTCCGTATTACCGCGGCTGCTGGCACGGAGTTA

GCCGGTGCTTCTTCTGCGGGTAACGTCAATCGA

Isolate 14 (16F, 27) Paenibacillus sp.
                                                          (SEQ ID NO: 25)
AGAAGCTTGCTTCTTTGATAGCGTTAGCGGCGGACGGGTGAGTAACACGTAGGCAACCTGCCCTCAAG

TTTGGGACAACTACCGGAAACGGTAGCTAATACCGAATAGTTGTTTTCTTCGCCTGAAGGAAACTGGA

AAGACGGAGCAATCTGTCACTTGGGGATGGGCCTGCGGCGCATTAGCTAGTTGGTGGGGTAACGGCTC

ACCAAGGCGACGATGCGTAGCCGACCTGAGAGGGTGATCGGCCACACTGGGACTGAGACACGGCCCA

GACTCCTACGGGAGGCAGCAGTAGGGAATCTTCCGCAATGGGCGAAAGCCTGACGGAGCAATGCCGC

GTGAGTGATGAAGGTTTTCGATCGTAAAGCTCTGTTGCCAGGGAAGAACGCTTGGGAGAGTAACTGC

TCTCAAGGTGACGGTACCTGAGAAGAAAGCCCCGGCTAACTACGTGCCAGCAGCCGCGGTAATACGT

AGGGGGCAAGCGTTGTCCGGAATTATTGGGCGTAAAGCGCGCGCAGGCGGTCATTTAAGTGGGTGTT

TAATCCCGGGGCTCAACCCCGGATCGCACTGGAAACTGGGTGACTTGAGTGCAGAAGAGGAGAGTGG

AATTCCACGTGTAGCGGTGAAATGCGTAGATATGTGGAGGAACACCAGTGGCGAAGGCGACTCTCTG

GGCTGTAACTGACGCTGAGGCGCGAAAGCGTGGGGAGCAAACAGGATTAGATACCCTGGTAGTCCAC

GCCGTAAACGATGAGTGCTAGGTGTTAGGGGTTTCGATACCGTTGGTGCCGAAGTTAACACATTAAGC

ACTCCGCCTGGGGAGTACGGTCGCAAGACTGAAACTCAAAGGAATTGACGGGGACCCGCACAAGCAG
```

-continued

TGG

Isolate 16 (16F-16R) *Pantoea* sp.

(SEQ ID NO: 26)
AAGCGCCCTCCCGAAGGTTAAGCTACCTACTTCTTTTGCAACCCACTCCCATGGTGTGACGGGCGGTGT

GTACAAGGCCCGGGAACGTATTCACCGTGGCATTCTGATCCACGATTACTAGCGATTCCGACTTCACG

GAGTCGAGTTGCAGACTCCGATCCGGACTACGACGCACTTTATGAGGTCCGCTTGCTCTCGCGAGGTC

GGTCTCTTTGTATGCGCCATTGTAGCACGTGTGTAGCCCTACTCGTAAGGGCCATGATGACTTGACGT

CATCCCCACGTCCTCCGGTTTATCACCGGCAGTCTCCTTTGAGTTCCCGACCGAATCGCTGGCAACAA

AGGATAAGGGTTGCGCTCGTTGCGGGACTTAACCCAACATTTCACAACACGAGCTGACGACAGCCATG

CAGCACCTGTCTCAGAGTTCCCGAAGGCACCAAAGCATCTCTGCTAAGTTCTCTGGATGTCAAGAGTA

GGTAAGGTTCTTCGCGTTGCATCGAATTAAACCACATGCTCCACCGCTTGTGCGGGCCCCCGTCAATTC

ATTTGAGTTTTAACCTTGCGGCCGTACTCCCCAGGCGGTCGACTTAACGCGTTAGCTCCGGAAGCCACT

CCTCAAGGGAACAACCTCCAAGTCGACATCGTTTACGGCGTGGACTACCAGGGTATCTAATCGGTTT

GCTCCCCACGCTTTCGCACCTGAGCGTCAGTCTTCGTCCAGGGGGCCGCCTTCGCCACCGGTATTCCTC

CAGATCTCTACGCATTTCACCGCTACACCTGGAATTCTACCCCCCTCTACGAGACTCAAGCCTGCCAGT

TTCAAATGCAGTTCCC isolate 17 (16R, 1492) *Pantoea* sp.

(SEQ ID NO: 27)
GGGTAGCGCCCTCCCGAAGGTTAAGCTACCTACTTCTTTTGCAACCCACTCCCATGGTGTGACGGGCG

GTGTGTACAAGGCCCGGGAACGTATTCACCGTGGCATTCTGATCCACGATTACTAGCGATTCCGACTTC

ACGGAGTCGAGTTGCAGACTCCGATCCGGACTACGACGCACTTTATGAGGTCCGCTTGCTCTCGCGAG

GTCGCTTCTCTTTGTATGCGCCATTGTAGCACGTGTGTAGCCCTACTCGTAAGGGCCATGATGACTTGA

CGTCATCCCCACCTTCCTCCGGTTTATCACCGGCAGTCTCCTTTGAGTTCCCGACCGAATCGCTGGCAA

CAAAGGATAAGGGTTGCGCTCGTTGCGGGACTTAACCCAACATTTCACAACACGAGCTGACGACAGCC

ATGCAGCACCTGTCTCAGAGTTCCCGAAGGCACCAAAGCATCTCTGCTAAGTTCTCTGGATGTCAAGA

GTAGGTAAGGTTCTTCGCGTTGCATCGAATTAAACCACATGCTCCACCGCTTGTGCGGGCCCCCGTCAA

TTCATTTGAGTTTTAACCTTGCGGCCGTACTCCCCAGGCGGTCGACTTAACGCGTTAGCTCCGGAAGCC

ACTCCTCAAGGGAACAACCTCCAAGTCGACATCGTTTACGGCGTGGACTACCAGGGTATCTAATCCTG

TTTGCTCCCCACGCTTTCGCACCTGAGCGTCAGTCTTCGTCCAGGGGGCCGCGTTCGCCACCGGTATTC

CTCCAGATCTCTACGCATTTCACCGCTACACCTGGAATTCTACCCCCCTCTACGAGACTCAAGCCTGCC

AGTTTCAAATGCAGTTCCCAGGTTAAGCCCGGGGATTTCACATCTGACTTAACAGACCGCCTGCGTGC

GCTTTACGCCCAGTAATTCCGATTAACGCTTGCACCCTCCGTATTACCGCGGCTGCTGGCACGGAGTTA

GCCGGTGCTTCTTCTGCGGGTAACGTCAATCGA isolate 18 (16F, 27) *Xanthomonas* sp.

(SEQ ID NO: 28)
CATGCAGTCGAACGGCAGCACAGGAGAGCCTTGCTCTCTGGGTGGCGAGTGGCGGACGGGTGAGGAA

TACATCGGAATCTACCTTTTCGTGGGGGATAACGTAGGGAAACTTACGCTAATACCGCATACGACCTT

AGGGTGAAAGCGGAGGACCTTCGGGCTTCGCGCGGATAGATGAGCCGATGTCGGATTAGCTAGTTGG

CGGGGTAAAGGCCCACCAAGGCGACGATCCGTAGCTGGTCTGAGAGGATGATCAGCCACACTGGAAC

TGAGACACGGTCCAGACTCCTACGGGAGGCAGCAGTGGGGAATATTGGACAATGGGCGCAAGCCTGA

TCCAGCCATGCCGCGTGGGTGAAGAAGGCGTCGGTTGTAAAGCCGTTTTGTTGGGAAGAAAAGCA

GTCGGTTAATACCCGATTGTTCTGACGGTACCCAAAGAATAAGCACCGGCTAACTTCGTGCCAGCAGC

CGCGGTAATACGAAGGGTGCAAGCGTTACTCGGAATTACTGGGCGTAAAGCGTGCGTAGGTGGTTGTT

TAAGTCCGTTGTGAAAGCCCTGGGCTCAACCTGGGAATTGCAGTGGATACTGGGCAACTAGAGTGTGG

-continued

TAGAGGATGGCGGAATTCCCGGTGTAGCAGTGAAATGCGTAGAGATCGGAGGAACATCTGTGGCGA

AGGCGGCCATCTGGACCAACACTGACACTGAGGCACGAAAGCGTGGGGAGCAAACAGGATTAGATAC

CCTGGTAGTCCACGCCCTAAACGATGCGAACTGGATGTTGGGTGCAACTTGGCACGCAGTATCGAAGC

TAACGCGTTAAGTTCGCCGCCTGGGGAGTACGGTCGCAAGACTGAAACTCAAAGGAATTGACGGGGG

CCCGCACAAGCGGTGGAGTATGTGGTTTAATTCGATGCAACGCGAAGAACC

Isolate 19 (16, 27) *Staphylococcus* sp.
(SEQ ID NO: 29)
TGCAAGTCGAGCGAACAGGATAAGGAGCTTGCTCCTTTGAAGTTAGCGGCGGACGGGTGAGTAACAC

GTGGGTAACCTACCTATAAGACTGGAATAACTTCGGGAAACCGGAGCTAATGCCGGATAACATATAG

AACCGCATGGTTCTATAGTGAAAGATGGTTTTGCTATCACTTATAGATGGACCCGCGCCGTATTAGCTA

GTTGGTAAGGTAAAGGCTTACCAAGGCGACGATACGTAGCCGACCTGAGAGGGTGATCGGCCACACT

GGAACTGAGACACGGTCCAGACTCCTACGGGAGGCAGCAGTAGGGAATCTTCCGCAATGGGCGAAAG

CCTGACGGAGCAACGCCGCGTGAGTGATGAAGGTTTTCGGATCGTAAAACTCTGTTATTAGGGAAGAA

CAAATGCGTAAGTAACTGTGCGCATCTTGACGGTACCTAATCAGAAAGCCACGGCTAACTACGTGCCA

GCAGCCGCGGTAATACGTAGGTGGCAAGCGTTATCCGGAATTATTGGGCGTAAAGCGCGCGTAGGCG

GTTTCTTAAGTCTGATGTGAAAGCCCACGGCTCAACCGTGGAGGGTCATTGGAAACTGGGAAACTTGA

GTGCAGAAGAGGAAAGTGGAATTCCATGTGTAGCGGTGAAATGCGCAGAGATATGGAGGAACACCAG

TGGCGAAGGCGACTTTCTGGTGGTAACTGACGCTGATGTGCGAAAGCGTGGGGATCAAACAGGATTA

GATACCCTGGTAGTCCACGCCGTAAACGATGAGTGCTAAGTGTTAGGGGGTTTCCGCCCCTTAGTGCT

GCAGCTAACGCATTAAGCACTCCGCCTGGGGAGTACGACCGCAAGGTTGAAACTCAAAGGAATTGAC

GGGGACCCGCACAAGCGGTGGAGCATGTGGGTTTAATTCGAAGCAACGCGAAGAACC

Isolate 20 (27, 16F) *Methylobacterium* sp.
(SEQ ID NO: 30)
CGGGGTCAGCGGCGGACGGGTGAGTAACGCGTGGGAACGTGCCTTCTGGTTCGGAATAACCCTGGGA

AACTAGGGCTAATACCGGATACGCCCTTATGGGGAAAGGTTTACTGCCGAAGATCGGCCCGCGTCTG

ATTAGCTAGTTGGTGGGGTAACGGCCTACCAAGGCGACGATCAGTAGCTGGTCTGAGAGGATGATCAG

CCACACTGGGACTGAGACACGGCCCAGACTCCTACGGGAGGCAGCAGTGGGGAATATTGGACAATGG

GCGCAAGCCTGATCCAGCCATGCCGCGTGAGTGATGAAGGCCTTAGGGTTGTAAAGCTCTTTTATCCG

GGACGATAATGACGGTACCGGAGGAATAAGCCCCGGCTAACTTCGTGCCAGCAGCCGCGGTAATACG

AAGGGGGCTAGCGTTGCTCGGAATCACTGGGCGTAAAGGGCGCGTAGGCGGCGTTTTAAGTCGGGGG

TGAAAGCCTGTGGCTCAACCACAGAATGGCCTTCGATACTGGGACGCTTGAGTATGGTAGAGGTTGGT

GGAACTGCGAGTGTAGAGGTGAAATTCGTAGATATTCGCAAGAACACCGGTGGCGAAGGCGGCCAAC

TGGACCATTACTGACGCTGAGGCGCGAAAGCGTGGGGAGCAAACAGGATTAGATACCCTGGTAGTCC

ACGCCGTAAACGATGAATGCCAGCTGTTGGGTGCTTGCACCGCAGTAGCGCAGCTAACGCTTTGAGC

ATTCCGCCTGGGGAGTACGGTCGCAAGATTAAAACTCAAAGGAATTGACGGGGGCCCGCACAAGCGG

TGGAGCATGTGGTTTAATTCGAAGCAACGCGCAGAACCTTACCATCCTTTGACATGGCGTGTTACCCA

GAGAGATTTGGGGTCCACTTCGGTGGCGCGCACACAGGTGCTGCATGGCTGTCGTCAGCTCGTGTCGT

GAGA

Isolate 21 (16F-16R) *Pantoea* sp.
(SEQ ID NO: 31)
GCCTTCCGGCGGGTGAAACTACCTACTTCTTTTGCAACCCACTCCCATGGGGTGGAGGGCGGTGTGTA

CAAGGCCCGGGAACGTATTCACCGTGGCATTCTGATCCACGATTACTAGCGATTCCGACTTCACGGAG

TCGAGTTGCAGACTCCGATCCGGACTACGACGCACTTTATGAGGTCCGCTTGCTCTCGCGAGGTCGCTT

-continued

```
CTCTTTGTATGCGCCATTGTAGCACGTGTGTAGCCCTACTCGTAAGGGCCATGATGACTTGACGTCATC

CCCACCTTTCCTCCGGTTTATCACCGGCAGTCTCCTTTGAGTTCCCGACCGAATCGCTGGCAACAAAGGA

TAAGGGTTGCGCTCGTTGCGGGACTTAACCCAACATTTCACAACACGAGCTGACGACAGCCATGCAGC

ACCTGTCTCATCGATCCCGAAGGCCCGCAAAAATCTCTCCGGATATCTCCGGATGTCAAGAGTAGGTA

AGGTTCTTCGCGTTGCATCGAATTAAACCACATGCTCCACCGCTTCTGCGGGCCCCCGTCAATTCATTT

GAGTTTTTAACCTTGCGGTCGTACTCCCCAGGCGGTCGACTTAACGCGTTAGCTCCGGAAGCCACTCCTC

AAGGGAACAACCTCGTAGTCGACATCGTTTACGGCGTGGACTACCAGGGTATCTAATCCTGTTTGCTC

CCCACGCTTTCGCACCTGACCGTCAGTCTTCGTCCAGGGGGCCGCCTTCGCCACCGGTATTCCTCCCCA

CCTCTACGCATTTGTCCGCTACACCTGTAATTCTACCCCGCTCTACTACACTCAAGCCCGCGTGTTTCCA

ATGCAGTTCCCAGGTTAAGCCCGGGGATTTCCTCTCTGAATTTACAGACCGCCTGCGTGCGCTTTACGC

CCAGTAGTTTCCAATTAACGCTTGCCCCCTACGTATTACCGCCGACGCTTGGCACGCAGTTAGCCGTCG

CTTCTTCTGCGGTTAACGTCATTCGA
```

Isolate 22 (16F-16R) *Pantoea* sp.
                                                      (SEQ ID NO: 32)
```
GTAGGCGCCGTCCTCGCGGGGGATAACCCTACTTCTTTTTTTTCCCACTCCCTTGGTGTGAGGGGCGGT

GTGTACATGGCCCGGGCAGGTATTTACCGAGGCATTCTGTTCGACGATTACTAGCGATTCCGACTTCAC

GGACGCGAGTTGCATGCTCCGACCGATACTACGACGCACTTTATGAGGTCCGTTTGCTCTCGCGAGGT

CGCTTCTGTTTGTATGCGCCATTGTAGCACGTGTGTAGCCCTACTCGTAAGGGCCATGCTGGCTTGACG

TCATCCATACGTTCCTCCGGTTTATCACCGGCAGTCTCCTTTGAGTTCCCGACCGAATCGCTGGCAACA

AAGGAAAAGGGTTGCGCTCGTTGCGGGCGTTAACCCAACATTTCACAACACGAGCTGGCGACAGCCAT

GCAGCACCTGTCTGTCTATTCCCGAAGGAAGGACAAAATCTCTCTCTGCTTTCCGGGATGTCAAGAGT

AGGTAAGTATCTTCGCGTTGCATCGAATTAAACCACATGCTCCACCGCCCGTGCGGGCCCCCGTCAAT

CAATTCAAGTTTGAACCTTGCGGGCGTACTCCCCACGCGGTCGATTTAACGCGCTAGCTCCGGAAGCA

ACTCCTCCAGGGAAGGACCTCCCACTCGATCTCCTTCGTTGCGTGCGTGGCCTAGGTAGCTAACCCTGC

TTGTTTCCTCCGCTTGCTTACCTGACCGACCGTGTCCTCCGTGGGGCGGCCTCCCTCCCGGCCGGCCT

CCCTACCTCTCTCCACTTCTTTGCCCGCTCCGCCTGTCTATCCCCCTCCCTCAAACACAATCCAGCCAGT

TTCTTTCGAATGTCCCTTCTTAGTTCAGGGCGGTGACTATCCGTCTGTATTAAGCGACCGCGCGCGT

TACTCCCAGCAAGTATTACCTATTCGCGCTTCCACCCTCGTCCTACCTTGGTTGCTGGGACTGAGTTA

GAGAGTGCTTCGTCGGCTGCGTCAGTCAATCGAGGAAGTTGCTTCTTCACATCCTCTCCCCCCCTAATG

AAGTTAATTACCAGCCGAAGCCCACATCCGAATCGCGCAATTGGTCGTCCCAT
```

*Pantoea* sp. Strain 4
                                                    (MG100861; SEQ ID NO: 33)
```
ATCCAGACACGGAGGCAGAGATGCTTTGGTGCCTTCGGGAACTCTGAGACAGGTGCTGCA

TGGCTGTCGTCAGCTCGTGTTGTGAAATGTTGGGTTAAGT CCCGCAACGAGCGCAACCCT

TATCCTTTGTTGCCAGCGATTCGGTCGGGAACTCAAAGGAGACTGCCGGTGATAAACCGG

AGGAAGGTGGGGATGACGTCAAGTCATCATGGCCCTTACGAGTAGGGCTACACACGTGCT

ACAATGGCGCATACAAAGAGAAGCGACCTCGCGAGAGCAA GCGGACCTCA TAAAGTGCGT

CGTAGTCCGG ATCGGAGTCT GCAACTCGAC TCCGTGAAGTCG
```

*Pantoea* sp. Strain 5
                                                    (MG100862.1; SEQ ID NO: 34)
```
ACTGAGACAGGTGCTGCATGGCTGTCGTCAGCTCGTGTTGTGAAATGTTGGGTTAAGTCCCGCAACGA

GCGCAACCCTTATCGTTGTTGCCAGCGATTCGGTCGGGAACTCAAAGGAGACTGCCGGTGATAAACC

GGAGGAAGGTGGGGATGACGTCAAGTCATCATGGCCCTTACGAGTAGGGCTACACACGTGCTACAAT

GGCGCATACAAAGAGAAGCGACCTCGCGAGAGCAAGCGGACCTCATAAAGTGCGTCGTAGTCCGGAT
```

-continued

CGGAGTCTGCAACTCGACTCCGTGAAGTCGGAATCGCTAGTAATCGTGGATCAGAATGCCACGGTGAA

TACGTTCCCGGGCGTGTACACACCGCCCGTCACACCATGGGAGTGGGTTGCAAAAGAAGTAGGTAGC

TTAACCTTCGGGAGGGCGCTACC

Pantoea sp. Strain 12
(MG100863.1; SEQ ID NO: 35)
GAATCAAGAGACAGGTGCTGCATGGCTGTCGTCAGCTCGTGTTGTGAAATGTTGGGTTAAGTCCCGCA

ACGAGCGCAACCCTTATCCTTTGTTGCCAGCGATTCGGTCGGGAACTCAAAGGAGACTGCCGGTGATA

AACCGGAGGAAGGTGGGGATGACGTCAAGTCATCATGGCCCTTACGAGTAGGGCTACACACGTGCTA

CAATGGCGCATACAAAGAGAAGCGACCTCGCGAGAGCAAGCGGACCTCATAAAGTGCGTCGTAGTCC

GGATCGGAGTCTGCAACTCGACTCCGTGAAGTC 16S rDNA Micrococcus luteus
(SEQ ID NO: 36)
GGTCTAATACCGGATAGGAGCGTCCACCGCATGGTGGGTGTTGGAAAGATTTATCGGTTTTGGATGGA

CTCGCGGCCTATCAGCTTGTTGGTGAGGTAATGGCTCACCAAGGCGACGACGGGTAGCCGGCCTGAGA

GGGTGACCGGCCACACTGGGACTGAGACACGGCCCAGACTCCTACGGGAGGCAGCAGTGGGGAATAT

TGCACAATGGGCGAAAGCCTGATCGCAGCGACGCCGCGTGAGGGATGACGGCCTTCGGGTTGTAAACC

TCTTTCAGTAGGGAAGAAGCGAAAGTGACGGTACCTGCAGAAGAAGCACCGGCTAACTACGTGCCAG

CAGCCGCGGTAATACGTAGGGTGCGAGCGTTATCCGGAATTATTGGGCGTAAAGAGCTCGTAGGCGGT

TTGTCGCGTCTGTCGTGAAAGTCCGGGGCTTAACCCCGGATCTGCGGTGGGTACGGGCAGACTAGAGT

GCAGTAGGGGAGACTGGAATTCCTGGTGTAGCGGTGGAATGCGCAGATATCAGGAGGAACACCGATG

GCGAAGGCAGGTCTCTGGGCTGTAACTGACGCTGAGGAGCGAAAGCATGGGAGCGAACAGGATTAG

ATACCCTGGTAGTCCATGCCGTAAACGTTGGGCACTAGGTGTGGGGACCATTCCACGGTTTCCGCGCC

GCAGCTAACGCATTAAGTGCCCCGCCTGGGGAGTACGGCCGCAAGGCTAAAACTCAAAGGAATTGAC

GGGGGCCCGCACAAGCGGCGGAGCATGCGGATTAATTCGATGCAACGCGAAGAACCTTACCAAGGCT

TGACATGTTCCCGATCGCCGTAGAGATACGATTTCCCCTTTGGGGCGGGTTCACAGGTGGTGCATGGTT

GTCGTCAGCTCGTGTCGTGAGATGTTGGGTTAAGTCCCGCAACGAGCGCAACCCTCGTTCCATGTTGCC

AGCACGTAATGGTGGGGACTCATGGGAGACTGCCGGGGTCAACTCGGAGGAAGGTGAGGACGACGTC

AAATCATCATGCCCCTTATGTCTTGGGCTTCACGCA

As used herein, "sequence identity" generally refers to the percent identity of nucleotide bases or amino acids comparing a first polynucleotide or polypeptide to a second polynucleotide or polypeptide using algorithms having various weighting parameters. Sequence identity between two polynucleotides or two polypeptides can be determined using sequence alignment by various methods and computer programs (e.g., BLAST, CS-BLAST, FASTA, HMMER, L-ALIGN, and the like) available through the worldwide web at sites including but not limited to GENBANK (on the world wide web at ncbi.nlm.nih.gov/genbank/) and EMBL-EBI (on the world wide web at ebi.ac.uk.). Sequence identity between two polynucleotides or two polypeptide sequences is generally calculated using the standard default parameters of the various methods or computer programs. A high degree of sequence identity, as used herein, between two polynucleotides or two polypeptides is typically between about 90% identity and 100% identity, for example, about 90% identity or higher, preferably about 95% identity or higher, more preferably about 98% identity or higher. A moderate degree of sequence identity, as used herein, between two polynucleotides or two polypeptides is typically between about 80% identity to about 85% identity, for example, about 80% identity or higher, preferably about 85% identity. A low degree of sequence identity, as used herein, between two polynucleotides or two polypeptides is typically between about 50% identity and 75% identity, for example, about 50% identity, preferably about 60% identity, more preferably about 75% identity.

The terms "promoting plant growth" and "stimulating plant growth" are used interchangeably herein, and refer to the ability to enhance or increase at least one of the plant's height, weight, leaf size, root size, shoot length, stem size, competition with competitor plants, resistance to fungal infection, increased protein yield from the plant or increased grain yield of the plant.

Particular formulations to be applied in spraying forms such as water dispersible concentrates or wettable powders may contain surfactant such as wetting and dispersing agents, e.g., the condensation product of formaldehyde with naphthalene sulphonate, an alkyl-aryl-sulphonate, a lignin sulphonate, a fatty alkyl sulphate an ethoxylated alkylphenol and an ethoxylated fatty alcohol.

As used herein the terms "spray" or "spraying" include the technique of applying to an exterior surface an ejected liquid material.

As used herein, the terms "coat" or "coating" include application, typically of a liquid or flowable solid, to an exterior surface such as a seed.

As used herein, a "stabilizer" includes a chemical compound that can be added to a formulation to prolong the stability and/or viability of components of the formulation, a critical aspect of product shelf-stability. A stabilizer can be one of a variety of compounds, such as a dessicant.

As used herein, a "preservative" includes any chemical compound and/or physical conditions that prevent the decomposition of organic constituents of seeds treated with formulations. Chemical preservatives could include, for example, synthetic or non-synthetic antioxidants and physical preservatives could include, for example, refrigeration, freeze-drying or drying.

According to an embodiment the at least one dispersing agent can be in the range of about 2% to about 60% on a dry weight by weight basis. Various dispersing agents are commercially available for use in agricultural compositions, such as those marketed by Rhone Poulenc, Witco, Westvaco, International Speciality products, Croda chemicals, Borregaard, BASF, Rhodia, etc. According to an embodiment the dispersing agents which can be used in the agricultural composition can be chosen from a group comprising polyvinylpyrrolidone, polyvinylalcohol, lignosulphonates, phenyl naphthalene sulphonates, ethoxylated alkyl phenols, ethoxylated fatty acids, alkoxylated linear alcohols, polyaromatic sulfonates, sodium alkyl aryl sulfonates, glyceryl esters, maleic anhydride copolymers, phosphate esters, condensation products of aryl sulphonic acids and formaldehyde, condensation products of alkylaryl sulphonic acids and formaldehyde, addition products of ethylene oxide and fatty acid esters, salts of addition products. of ethylene oxide and fatty acid esters, sulfonates of condensed naphthalene, addition products of ethylene oxide and fatty acid esters, salts of addition products of ethylene oxide and fatty acid esters, lignin derivatives, naphthalene formaldehyde condensates, sodium salt of isodecylsulfosuccinic acid half ester, polycarboxylates, sodium alkylbenzenesulfonates, sodium salts of sulfonated naphthalene, ammonium salts of sulfonated naphthalene, salts of polyacrylic acids, salts of phenolsulfonic acids and salts of naphthalene sulfonic acids. However, those skilled in the art will appreciate that it is possible to utilize other dispersing agents known in the art without departing from the scope of the claims of the present invention.

In some embodiments, a bacterial endophyte is a seed-origin bacterial endophyte. As used herein, a "seed-origin" or "seed-vectored" bacterial endophyte" refers to a population of bacteria associated with or derived from the seed of a host plant. For example, a seed-origin bacterial endophyte can be found in mature, dry, undamaged (e.g., no cracks, visible fungal infection, or prematurely germinated) seeds. The bacteria can be associated with or derived from the surface of the seed; alternatively, or in addition, it can be associated with or derived from the interior seed compartment (e.g., of a surface-sterilized seed) or from a seedling. In some cases, a seed-origin bacterial endophyte is capable of replicating within the plant tissue, for example, the interior of the seed. Also, in some cases, the seed-origin bacterial endophyte is capable of surviving desiccation.

Seed-origin or seed-vectored means that the microbe entity is obtained directly or indirectly from the seed surface or seed interior compartment or is obtainable from a seed surface or seed interior compartment. For example, a seed-origin bacterial entity can be obtained directly or indirectly from a seed surface or seed interior compartment when it is isolated, or isolated and purified, from a seed preparation; in some cases, the seed-origin bacterial entity which has been isolated, or isolated and purified, may be cultured under appropriate conditions to produce a purified bacterial population consisting essentially of a seed-origin bacterial endophyte. A seed-origin bacterial endophyte can be considered to be obtainable from a seed surface, a seedling, or seed interior compartment if the bacteria can be detected on or in, or isolated from, a seed surface or seed interior compartment of a plant.

In some embodiments, the present invention contemplates methods of manually or mechanically combining an endophyte described herein with one or more plant elements, such as a seed, a leaf, or a root, in order to confer an improved agronomic trait or improved agronomic trait potential to said plant element or host plant. In some embodiments, the present invention contemplates methods of manually or mechanically combining a plurality of endophytes described herein with one or more plant elements.

As used herein, a "synthetic combination" is the combination of a plant element, seedling, or whole plants and a plurality of endophytes, combined by human endeavor, in which one or more of the plurality of endophytes are heterologously disposed, said combination which is not found in nature. In some embodiments, the synthetic combination includes two or more endophytes that synergistically interact providing a benefit to an agricultural seed, seedling, or plant derived thereby. In some embodiments, a synthetic combination is used to refer to a treatment formulation comprising an isolated, purified population of endophytes heterologously disposed to a plant element. In some embodiments of the present invention, "synthetic combination" refers to a purified population of endophytes in a treatment formulation comprising additional compositions with which said endophytes are not found associated in nature.

As used herein, an endophyte is "heterologously disposed" when mechanically or manually applied, artificially inoculated or disposed onto or into a plant element, seedling, plant or onto or into a plant growth medium or onto or into a treatment formulation so that the endophyte exists on or in said plant element, seedling, plant, plant growth medium, or treatment formulation in a manner not found in nature prior to the application of the endophyte, e.g., said combination which is not found in nature. In some embodiments, such a manner is contemplated to include: the presence of the endophyte; presence of the endophyte in a different number, concentration, or amount; the presence of the endophyte in or on a different plant element, tissue, cell type, or other physical location in or on the plant; the presence of the endophyte at different time period, e.g. developmental phase of the plant or plant element, time of day, time of season, and combinations thereof. In some embodiments, plant growth medium is soil, a hydroponic apparatus, or artificial growth medium such as commercial potting mix. In some embodiments, the plant growth medium is soil in an agricultural field. In some embodiments, the plant growth medium is commercial potting mix. In some embodiments, the plant growth medium is an artificial growth medium such as germination paper. As a non-limiting example, if the plant element or seedling or plant has an endophyte normally found in the root tissue but not in the leaf tissue, and the endophyte is applied to the leaf, the endophyte would be considered to be heterologously disposed. As a non-limiting example, if the endophyte is naturally found in the mesophyll layer of leaf tissue but is applied to the epithelial layer, the endophyte would be considered to be heterologously disposed. As a non-limiting example, an endophyte is heterologously disposed at a concentration that is at least 1.5 times, between 1.5 and 2 times, 2 times, between 2 and 3 times, 3 times, between 3 and 5 times, 5 times, between 5 and 7 times, 7 times, between 7 and 10 times, 10 times greater, or even greater than 10 times higher number, amount, or concentration than that which is naturally present. As a non-limiting example, an endophyte is heterologously disposed on a seedling if that endophyte is normally found at the flowering stage of a plant and not at a seedling stage.

The compositions provided herein are preferably stable. The seed-origin bacterial endophyte is optionally shelf stable, where at least 10% of the CFUs are viable after storage in desiccated form (i.e., moisture content of 30% or less) for 1, 2, 3, 4, 5, 6, 7, 8, 9, 10 or greater than 10 weeks at 4° C. or at room temperature. Optionally, a shelf stable formulation is in a dry formulation, a powder formulation, or a lyophilized formulation. In some embodiments, the formulation is formulated to provide stability for the population of bacterial endophytes. In one embodiment, the formulation is substantially stable at temperatures between about 0° C. and about 50° C. for at least about 1, 2, 3, 4, 5, or 6 days, or 1, 2, 3 or 4 weeks, or 1, 2, 3, 4, 5, 6, 7, 8, 9, 10, 11 or 12 months, or one or more years. In another embodiment, the formulation is substantially stable at temperatures between about 4° C. and about 37° C. for at least about 5, 10, 15, 20, 25, 30 or greater than 30 days.

In some embodiments, plants (including seeds and other plant elements) treated in accordance with the present invention are monocots. In some embodiments, plants (including seeds or other plant elements) treated in accordance with the present invention are dicots. In some embodiments, plants treated in accordance with the present invention include, but are not limited to: agricultural row, agricultural grass plants or other field crops: wheat, rice, barley, buckwheat, beans (soybean, snap, dry), corn (grain, seed, sweet corn, silage, popcorn, high oil), cotton, canola, peas (dry, succulent), peanuts, safflower, sunflower, alfalfa hay, forage crops (alfalfa, clover, vetch, and trefoil), berries and small fruits (blackberries, blueberries, currants, elderberries, gooseberries, huckleberries, loganberries, raspberries, strawberries, bananas and grapes), bulb crops (garlic, leeks, onions, shallots, and ornamental bulbs), citrus fruits (citrus hybrids, grapefruit, kumquat, lines, oranges, and pummelos), cucurbit vegetables (cucumbers, melons, gourds, pumpkins, and squash), flowers, bedding plants, ornamentals, fruiting vegetables (eggplant, sweet and hot peppers, tomatillos, and tomatoes), herbs, spices, mints, hydroponic crops (cucumbers, tomatoes, lettuce, herbs, and spices), leafy vegetables and cole crops (arugula, celery, chervil, endive, fennel, lettuce (head and leaf), parsley, radicchio, rhubarb, spinach, Swiss chard, broccoli, Brussels sprouts, cabbage, cauliflower, collards, kale, kohlrabi, and mustard greens), asparagus, legume vegetable and field crops (snap and dry beans, lentils, succulent and dry peas, and peanuts), pome fruit (pears and quince), root crops (beets, sugarbeets, red beets, carrots, celeriac, chicory, horseradish, parsnip, radish rutabaga, salsify, and turnips), deciduous trees (maple and oak), pine, small grains (rye, wheat, sorghum, millet, stone fruits (apricots, cherries, nectarines, peaches, plums, and prunes), tree nuts (almonds, beech nuts, Brazil nuts, butternuts, cashews, chestnuts, filberts, hickory nuts, macadamia nuts, pecans, pistachios, and walnuts), tuber crops (potatoes, sweet potatoes, yams, artichoke, cassava, and ginger), and turfgrass (turf, sports fields, parks, established and new preparation of golf course tees, greens, fairways and roughs, seed production and sod production). Preferred target species of agricultural plants include species of Malvaceae (cotton family): Cotton (*Gossypium* spp.), Okra *Abelmoschus esculentus*, Cacao (*Theobroma cacao*), Kenaf (*Hibiscus cannabinus*) and Kola nut (*Cola* spp.). Target species also include other dicot crops, including but not limited to, Coffee (*Coffea* spp.), Tobacco (Nicotianatabacum), Potato (*Solanum tuberosum*), Tomato (*Solanum* lycopsersicum), Sweet potato (*Ipomoea batatas*), Beans (*Phaseolus* spp.), Soybeans (*Glycine max*), Sunflowers (*Helianthus* spp.) and Rapeseed (*Brassica napus*).

As used herein, an agricultural grass plant includes, but is not limited to, maize (*Zea mays*), common wheat (*Triticum aestivum*), spelt (*Triticum spelta*), einkorn wheat (*Triticum monococcum*), emmer wheat (*Triticum dicoccum*), durum wheat (*Triticum durum*), Asian rice (*Oryza sativa*), African rice (*Oryza* glabaerreima), wild rice (*Zizania aquatica, Zizania latifolia, Zizania palustris, Zizania texana*), barley (*Hordeum vulgare*), Sorghum (*Sorghum bicolor*), Finger millet (*Eleusine coracana*), Proso millet (*Panicum miliaceum*), Pearl millet (*Pennisetum glaucum*), Foxtail millet (*Setaria* italic), Oat (*Avena sativa*), Triticale (*Triticosecale*), rye (*Secale* cereal), Russian wild rye (*Psathyrostachys juncea*), bamboo (Bambuseae), grasses, including *Agrostis* spp., *Poa* spp., *Festuca* spp., *Lolium* spp., *Cynodon* spp., *Zoysia* spp., *Koleria* spp., *Danthonia* spp., or sugarcane (e.g., *Saccharum arundinaceum, Saccharum barberi, Saccharum bengalense, Saccharum edule, Saccharum munja, Saccharum officinarum, Saccharum procerum, Saccharum ravennae, Saccharum robustum, Saccharum sinense*, or *Saccharum spontaneum*).

A "host plant" includes any plant, particularly an agricultural plant, which an endophytic microbe such as a bacterial endophyte can colonize. As used herein, a microbe is said to "colonize" a plant or seed when it can be stably detected within the plant or seed over a period time, such as one or more days, weeks, months or years; in other words, a colonizing microbe is not transiently associated with the plant or seed.

As used herein, a "reference agricultural plant" is an agricultural plant of the same species, strain, or cultivar to which a treatment, formulation, composition or endophyte preparation as described herein is not administered/contacted. Exemplary reference agricultural plants are described herein. A reference agricultural plant, therefore, is identical to the treated plant with the exception of the presence of the endophyte and can serve as a control for detecting the effects of the endophyte that is conferred to the plant.

A "plant element" is intended to generically reference either a whole plant or a plant component, including but not limited to plant tissues, parts, and cell types. A plant element is preferably one of the following: whole plant, seedling, meristematic tissue, ground tissue, vascular tissue, dermal tissue, seed, leaf, root, shoot, stem, flower, fruit, stolon, bulb, tuber, corm, kelkis, shoot, bud. As used herein, a "plant element" is synonymous to a "portion" of a plant, and refers to any part of the plant, and can include distinct tissues and/or organs, and may be used interchangeably with the term "tissue" throughout.

"Biomass" means the total mass or weight (fresh or dry), at a given time, of a plant tissue, plant tissues, an entire plant, or population of plants. Biomass is usually given as weight per unit area. The term may also refer to all the plants or species in the community (community biomass).

A "bacterial network" means a plurality of endophyte entities (e.g., bacteria, fungi, or combinations thereof) co-localized in an environment, such as on or within a grass agricultural plant. Preferably, a bacterial network includes two or more types of endophyte entities that synergistically interact, such synergistic endophytic populations capable of providing a benefit to the agricultural seed, seedling, or plant derived thereby.

An "increased yield" can refer to any increase in biomass or seed or fruit weight, seed size, seed number per plant, seed number per unit area, bushels per acre, tons per acre, kilo per hectare, or carbohydrate yield. Typically, the particular characteristic is designated when referring to increased yield, e.g., increased grain yield or increased seed size.

The terms "pathogen" and "pathogenic" in reference to a bacterium includes any such organism that is capable of causing or affecting a disease, disorder or condition of a host containing the organism.

As used herein, an "agricultural seed" is a seed used to grow a plant typically used in agriculture (an "agricultural plant"). The seed may be of a monocot or dicot plant, and may be planted for the production of an agricultural product, for example grain, food, fiber, etc. As used herein, an agricultural seed is a seed that is prepared for planting, for example, in farms for growing.

In some cases, the present invention contemplates the use of microbes that are "compatible" with agricultural chemicals, for example, a fungicide, an anti-bacterial compound, or any other agent widely used in agricultural which has the effect of killing or otherwise interfering with optimal growth of microbes. As used herein, a microbe is "compatible" with an agricultural chemical when the microbe is modified, such as by genetic modification, e.g., contains a transgene that confers resistance to an herbicide, or is adapted to grow in, or otherwise survive, the concentration of the agricultural chemical used in agriculture. For example, a microbe disposed on the surface of a seed is compatible with the fungicide metalaxyl if it is able to survive the concentrations that are applied on the seed surface.

In some embodiments, an agriculturally compatible carrier can be used to formulate an agricultural formulation or other composition that includes a purified bacterial preparation. As used herein an "agriculturally compatible carrier" refers to any material, other than water, which can be added to a seed or a seedling without causing or having an adverse effect on the seed (e.g., reducing seed germination) or the plant that grows from the seed, or the like.

As used herein, a "portion" of a plant refers to any part of the plant, and can include distinct tissues and/or organs, and is used interchangeably with the term "tissue" throughout.

A "population" of plants, as used herein, can refer to a plurality of plants that were subjected to the same inoculation methods described herein, or a plurality of plants that are progeny of a plant or group of plants that were subjected to the inoculation methods. In addition, a population of plants can be a group of plants that are grown from coated seeds. The plants within a population will typically be of the same species, and will also typically share a common genetic derivation.

A "reference environment" refers to the environment, treatment or condition of the plant in which a measurement is made. For example, production of a compound in a plant associated with a purified bacterial population (e.g., a seed-origin bacterial endophyte) can be measured in a reference environment of drought stress, and compared with the levels of the compound in a reference agricultural plant under the same conditions of drought stress. Alternatively, the levels of a compound in plant associated with a purified bacterial population (e.g., a seed-origin bacterial endophyte) and reference agricultural plant can be measured under identical conditions of no stress.

As used herein, a "colony-forming unit" ("CFU") is used as a measure of viable microorganisms in a sample. A CFU is an individual viable cell capable of forming on a solid medium a visible colony whose individual cells are derived by cell division from one parental cell.

In part, the present invention describes preparations of novel endophytes, and the creation of synthetic combinations of agricultural seeds and/or seedlings with heterologous endophytes and formulations containing the synthetic combinations, as well as the recognition that such synthetic combinations display a diversity of beneficial properties present in the agricultural plants and the associated endophyte populations newly created by the present inventors. Such beneficial properties include metabolism, transcript expression, proteome alterations, morphology, and the resilience to a variety of environmental stresses, and the combination of a plurality of such properties.

Provided herein are novel compositions, methods, and products related to our invention's ability to overcome the limitations of the prior art in order to provide reliable increases in crop yield, biomass, germination, vigor, stress resilience, and other properties to agricultural crops.

In some embodiments, microbes can confer beneficial properties across a range of concentrations.

In some embodiments, combinations of one or more heterologously disposed endophytes confer additive advantages to plants, including multiple functional properties and resulting in seed, seedling, and plant hosts that display single or multiple improved agronomic properties. In some embodiments, combinations of heterologously disposed endophytes confer synergistic advantages to plants, including multiple functional properties and resulting in seed, seedling, and plant hosts that display single or multiple improved agronomic properties.

In one aspect, the present invention contemplates a synthetic combination of a plant element of a plant that is coated with an endophyte on its surface. The plant element can be any agricultural plant element, for example an agricultural seed. In one embodiment, the plant element of the first plant is from a monocotyledonous plant. For example, the plant element of the first plant is from a cereal plant. The plant element of the first plant can be selected from the group consisting of a maize plant, a wheat plant, a barley plant, an onion plant, a sorghum plant, or a rice plant. In an alternative embodiment, the plant element of the first plant is from a dicotyledonous plant. The plant element of the first plant can be selected from the group consisting of a cotton plant, a *Brassica napus* plant, a tomato plant, a pepper plant, a cabbage plant, a lettuce plant, a melon plant, a strawberry plant, a turnip plant, a watermelon plant, a peanut plant, or a soybean plant. In still another embodiment, the seed of the first plant can be from a genetically modified plant. In another embodiment, the seed of the first plant can be a hybrid seed.

The Examples below are provided to illustrate certain embodiments of the invention. They are not intended to limit the invention in any way.

Example I

Endobiome Interference

The process of degradation of microbes within roots has been termed 'rhizophagy' (meaning 'root eating') (Paung-foo-Lonhienne et al., 2013). The cyclic process where symbiotic bacteria alternate between a free-living soil phase and an intracellular endophytic phase has been termed 'rhizophagy cycle' or 'rhizophagy symbiosis' (Verma and White, 2018). It seems reasonable—that the primary function of the rhizophagy cycle is the transport of nutrients via microbes from the rhizosphere to the plant root where nutrients are extracted from microbes (Hill et al., 2011; Beltran-Garcia et al., 2014; Prieto et al., 2017). It is also logical that microbes that are symbiotic with plants and function in the rhizophagy cycle are adapted to the host plant and likely show the following features: 1) possess the capacity to enter plant cell walls at the root tip meristem; 2) release electrolytes to plant cells on exposure to ROS secreted by root cell plasma membranes; 3) ability to survive ROS exposure in its host; 4) triggers root hair elongation to exit the hair as it elongates; and 5) are attracted back to the root exudate zone at root tip meristems.

Endobiome Interference

Our results show that microbes of the endobiome of a particular plant appear to be adapted to the internal conditions of that plant, and that the conditions in the endospheres of plants may differ between species of plants. The removal of endobiome microbes from hosts to which they are adapted, and transference to seedling hosts to which they are not adapted, results in: 1) internal colonization, 2) interference with the functioning of other microbes of the endobiome, 3) interference with plant development, or 4) increases in seedling mortality. Perturbations in seedling development or increases in seedling mortality as a result of colonization by non-adapted microbes may result from 'endobiome interference'.

To evaluate whether 'endobiome interference' occurs we conducted a series of experiments where we removed microbes (bacteria and yeasts) from seeds of plants (including species *Abrus precatorius, Froelichia gracilis, Lycopersicum esculentum* and *Poa annua*) and inoculated them onto axenic seedlings in agarose; we then assessed internal colonization of seedling roots, root growth, and seedling mortality (Table 1; FIGS. 1-18). Test seedlings included dandelion (*Taraxacum officinale*), curly dock (*Rumex crispus*) and clover (*Trifolium repens*). Some experiments were also done where microbes were inoculated onto seedlings of *Amaranthus hypochondriacus* and *Amaranthus viridis*. Microbes included yeasts *Rhodotorula* sp. (strain *Abrus* #1; SEQ ID NO: 1) and *Aureobasidium pullulans* (strain *Froelichia* #2; (SEQ ID NO: 8), and bacteria *Sphingomonas* sp. (strain *Abrus* #3; (SEQ ID NO:2), *Rhodococcus* sp. (strain AbrusR; SEQ ID NO:3), *Micrococcus luteus* (strain *Lycopersicon* #1; (SEQ ID NO: 36), *Curtobacterium* sp. (strain *Froelichia* #4; SEQ ID NO: 4) and *Paenibacillus* sp. (strain PA-NA-2B1; SEQ ID NO: 5). None of these microbes appeared to be pathogenic or inhibitory of root growth in their original hosts based on growth of seedlings containing microbes on agarose media. In fact, *Micrococcus luteus* was found to be growth promotional in tomato seedlings, resulting in intracellular colonization and increased root hair length. See Table 2. All of the microbes were found to become intracellular in seedling root cells when inoculated onto germinating seeds (FIGS. 3, 5-18). The occurrence of effects that we termed "endobiome interference" depended on the microbe, and the host seedling the microbe was inoculated into. The two most potent microbes in terms of increased mortality in seedlings after 3 weeks included the yeast *Aureobasidium pullulans* (*Froelichia* #2) and bacterium *Micrococcus luteus* (*Lycopersicum* #1). In terms of inhibition of root growth *Rhodotorula* sp. (strain *Abrus* #1), *Sphingomonas* sp. (strain *Abrus* #3) and *Micrococcus luteus* (*Lycopersicum* #1) were more inhibitory. *Curtobacterium* (strain *Froelichia* #4) was growth promotional in all three species, increasing root growth and reducing seedling mortality in test seedlings. The mechanisms of inhibition of root growth or increase in seedling root growth are not clear.

TABLE 1

Endobiome interference results summary

| Microbe | Host origin | Target host | Intracellular | Δ Root length* | Δ Mortality |
|---|---|---|---|---|---|
| Rhodotorula | A. precatorius | Dandelion | Yes | −40% | +18% |
| Rhodotorula | A. precatorius | Curly dock | Yes | −45% | −27% |
| Rhodotorula | A. precatorius | Clover | Yes | −64% | +24% |
| Sphingornonas | A. precatorius | Dandelion | Yes | −28% | +39% |
| Sphingornonas | A. precatorius | Curly dock | Yes | −19% | 0% |
| Sphingornonas | A. precatorius | Clover | Yes | −40% | −6% |
| Rhodococcus | A. precatorius | Dandelion | Yes | −7% | +50% |
| Rhodococcus | A. precatorius | Curly dock | Yes | −23% | −3% |
| Rhodococcus | A. precatorius | Clover | Yes | −13% | 0% |
| Aureobasidium | F. gracilis | Dandelion | Yes | +46% | +44% |
| Aureobasidium | F. gracilis | Curly dock | Yes | −17% | +57% |
| Aureobasidium | F. gracilis | Clover | Yes | +2% | +10% |
| Curtobacterium | F. gracilis | Dandelion | Yes | +15% | −13% |
| Curtobacterium | F. gracilis | Curly dock | Yes | +10% | −13% |
| Curtobacterium | F. gracilis | Clover | Yes | +7% | −7% |
| Micrococcus | L. esculentum | Dandelion | Yes | −60% | +80% |
| Micrococcus | L. esculentum | Curly dock | Yes | −30% | −14% |
| Micrococcus | L. esculentum | Clover | Yes | −27% | +31% |
| Paenibacillus | P. annua | Dandelion | Yes | −12% | +51% |
| Paenibacillus | P. annua | Curly dock | Yes | −30% | −14% |
| Paenibacillus | P. annua | Clover | Yes | — | — |

*Percentages are from means of 40 seeds/seedlings; mortality includes germination suppression and seedling death after 3 weeks on agarose; Δ designates change (Δ Root length = change in root length compared to control, and Δ Mortality = change in mortality compared to control).

TABLE 2

*Micrococcus luteus* is Growth Promotional in Tomato Seedlings

| *Micrococcus*-treated seedlings | Non-treated seedlings |
|---|---|
| Root 22.6 ± 4.5 mm long | Root 22.86 ± 5.95 mm long |
| N = 20 | N = 21 |
| Root hair lengths | Root hair lengths |
| Field 1 (n = 16) | Field 1 (n = 9) |
| 634 ± 94.02μ | 214.16 ± 54.78μ |
| Field 2 (n = 15) | Field 2 (n = 14) |
| 578.49 ± 57.92μ | 294.15 ± 95.9μ |
| Field 3 (n = 14) | Field 3 (n = 17) |
| 574.8 ± 81.08μ | 208.23 ± 70.19μ |

Data expressed as mean ± standard deviation. Results from tomato seedling experiment (7 days growth on agarose)

However, two factors seem relevant, including: 1) entry of microbes into root cells, and 2) resistance of microbes to reactive oxygen species (ROS) secreted by the host. Microbes that are highly resistant to ROS secreted by root cells may be difficult to control once they are in the endosphere—and especially when they become intracellular. Microbes that enter root cells and situate in close contact with root cell plasma membranes may be able to extract more nutrients from plant cells and may more frequently trigger cell death. *Micrococcus luteus* and *Aureobasidium pullulans* are good examples where this may be occurring. Both microbes are resistant to ROS due to production of antioxidants. *Micrococcus luteus* produces antioxidant carotenoids, catalases, peroxidases and other antioxidant enzymes that reduce the negative effects of host secreted ROS (Mohanna, Thippeswamy and Abhishek, 2013). Similarly, *Aureobasidium pullulans* possesses antioxidant cell wall components mannans and glucans (Machova and Bystricky, 2013) and because they are eukaryotic, their plasma membranes are reinforced with ergosterol to stabilize the membrane and prevent passage of ROS into the cytoplasm (White et al., 2018). This oxidative resistance appears to enable *Micrococcus luteus* and *Aureobasidium pullulans* to proliferate within root cells in an unregulated manner. Overgrowth of these microbes within root cells and tissues results in diversion of seedling nutrients from support of seedling growth to microbe replication—resulting in seedling growth suppression. This is especially evident in the case of *Micrococcus luteus* where inoculated seedlings on agarose were found to have repressed root growth with bacteria accumulating en masse around seedling roots.

Mode of Entry of *Micrococcus luteus* Entry into Root Cells

We tracked *Micrococcus luteus* through seedling tissues and cells in the previously described 'endobiome interference' experiments. *Micrococcus luteus* initially infected root meristem cells—entering periplasmic spaces of outer layers of root tip meristem cells as walled tetrads (FIGS. 2 and 3). As root cells matured the tetrads converted to unicellular cells—likely L-forms. Spherical cells (wall-less L-forms) were visible in periplasmic spaces of root epidermal cells and root hairs when they formed (FIGS. 5-8, 12). The spherical cells did not swell or lose capacity to stain with aniline blue, suggesting that plant ROS was not degrading the intracellular bacterial cells. This is an indication that *Micrococcus luteus* is resistant to ROS produced by NOX on the root cell plasma membranes. When less oxidatively-resistant pseudomonads are used, L-forms in periplasmic spaces are seen to swell and they lose interior staining with aniline blue due to loss of cell contents by the L-forms (White et al., 2014; White et al., 2017). The spherical bacteria of *Micrococcus luteus* in primordial root hairs were seen to exit root hair tips through channels in the plant cell walls; once outside bacteria reformed walls and tetrad shapes (FIGS. 8-12). This route of bacteria through root tissues is what has been observed for bacteria in the rhizophagy cycle (Prieto et al., 2018). It seems evident that microbes that show endobiome interference are partially compatible with host plants, but they are not adapted to the host like native symbiotic microbes—and rather than increase growth and survival of seedlings, they reduce growth and/or increase seedling mortality.

Intracellular Phases of *Aureobasidium pullulans* and *Rhodotorula* sp.

Atsatt and Whiteside (2014) demonstrated that *Aureobasidium pullulans* and *Rhodotorula pinicola* develop an intracellular phase in plants. The intracellular phase includes cells that retain cell walls and those forms that lack cell walls termed 'mycosomes'. Our experiments with various Amaranthaceae indicate that *Aureobasidium pullulans* may be a frequent endophyte in this family of plants. In *Abrus precatorius Rhodotorula* sp. appears to be a common seed-vectored endophyte. Mycosomes appear to behave like bacterial L-forms in that they bud or 'bleb' sequentially to form chains (Atsatt and Whiteside, 2014). The wall-less mycosome phase may also be a response to plant-produced reactive oxygen or to particular nutrients to which fungi are exposed to in plant tissues. Mycosomes have also been reported to spontaneously revert to the walled cell phase. Intracellular walled *Aureobasidium* cells are visible in FIGS. 13 and 14, while mycosomes are seen in FIGS. 15-17. Yeasts appear to be entering root cells at the root tip meristems, similar to bacteria based on presence of mycosomes in meristematic cells in our inoculation experiments.

Figure 19B:
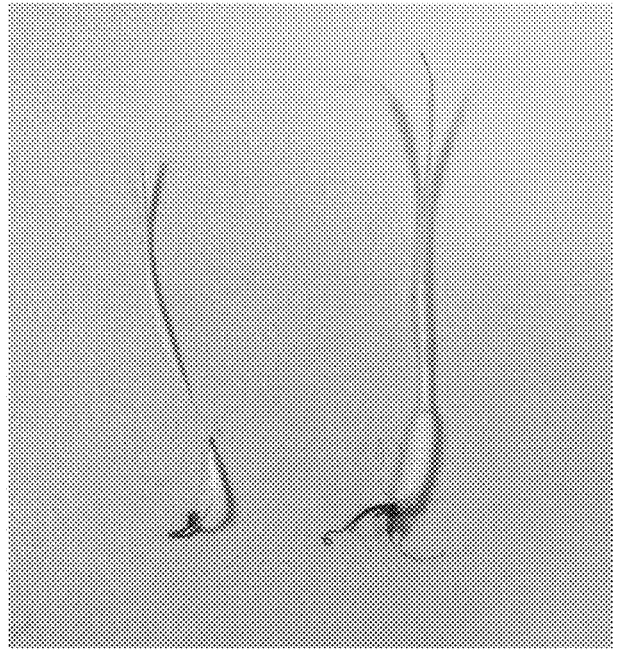
FIG. 19B. Suppression of root development is seen in *Micrococcus*-treated *Poa annua* seedlings (arrows indicate root tips; seedlings are 10-days-old; stained with DAB).

FIGS. 19A to 19D show the effects of *M. luteus* treatment on root length/growth in a variety of different species. FIG. 19A. *Micrococcus*-treated *Poa annua* seedlings do not grow properly in the agarose assays. Seedling roots are undeveloped and seedlings lodge rather than stand upright. FIG. 19B. Suppression of root development is seen in *Micrococcus*-treated *Poa annua* seedlings (arrows indicate root tips; seedlings are 10-days-old; stained with DAB). FIG. 19C. Carrot (*Daucus carota*; Apiaceae) Seedlings are Inhibited by *Micrococcus*. FIG. 19D. Japanese knotweed (*Fallopia japonica* Polygonaceae) seedling growth is also inhibited by *M. luteus*. *Taraxacum officionale* and *Amaranthus caudatus* seedling growth is also inhibited by treatment with *M. luteus*.

Figure 20:
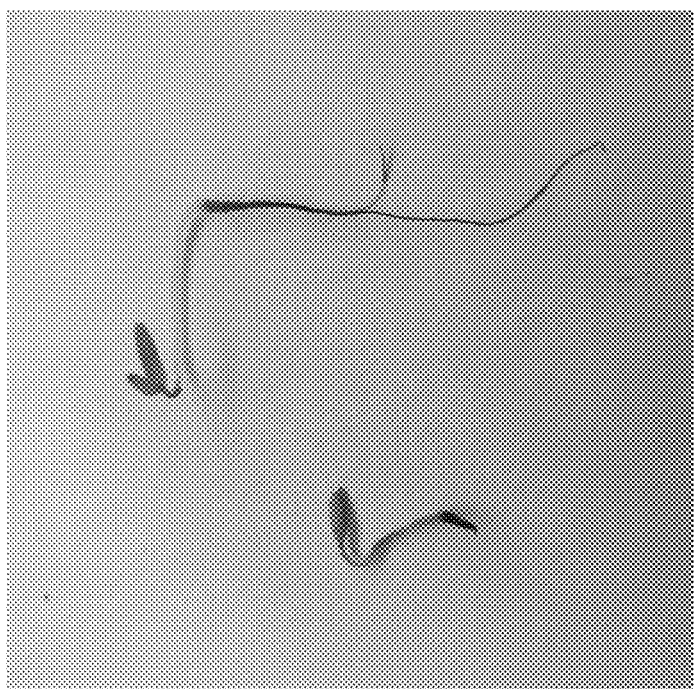
FIG. 20. Yeast *Aureobasidium* (*Froelichia* #2)-inoculated seedling (left) compared to control seedling (right) of *Amaranthus hypochondriacus* containing only native endophytic bacteria. Seedlings were stained overnight with DAB to visualize reactive oxygen in roots (brown coloration). Both seedlings are 7 days old.

FIG. 20 shows the effects of treatment with yeast *Aureobasidium* (*Froelichia* #2)-inoculated seedling (left) compared to control seedling (right) of *Amaranthus hypochondriacus* containing only native endophytic bacteria. Seedlings were stained overnight with DAB to visualize reactive oxygen in roots (brown coloration). Both seedlings are 7 days old.

Endobiome Interference Affects Plant-Plant Interactions

Some plants may maintain microbial symbionts and nourish them within tissues and cells as defensive or offensive weapons that can be employed against competitor plant species. The plants from which we obtained seed-vectored microbes in the endobiome interference experiment are generally aggressive weedy species. Notably, tomato plants are known to have allelopathic properties—where tomato plants may suppress growth of some other plant species. *Abrus precatorius*, *Froelichia gracilis* and *Poa annua* are competitive, and may be invasive. We suggest that these species use their endobiomes against competitor plant species—where microbes may colonize competitor seedlings and reduce their growth and persistence. This possibility seems likely when it is considered that microbes in the rhizophagy cycle alternate between an endophytic/intracellular phase and a free-living soil phase (Prieto et al., 2017; Verma et al., 2018; White et al. In press). These microbes may move out from the plant, forming a zone around plants where certain vulnerable competitor species cannot grow. Seedlings of competitor species that begin to grow in that zone would be colonized and their nutrients used by the microbes for their own reproduction; return of bacteria to the original host plant and reentry into the endosphere of that plant may deliver nutrients that were extracted from the competitor plant species. In a previous study (White et al., 2017) of seed-vectored pseudomonads from invasive *Phragmites australis* pseudomonads were seen to promote the growth of grass seedlings but were seen to inhibit growth of competitor dicot species (*Taraxacum officionale* and *Rumex crispus*). It is also conceivable that plant species that share endobiome microbes where those microbes are growth promotional in both plant species may grow together; endobiome interference may force plants apart.

Applications of Endobiome Interference to Control Invasive or Weedy Plant Species Invasive and weedy plant control generally employs use of chemical herbicides. Endobiome interference offers a non-chemical means whereby particular weeds could be controlled without herbicides (Kowalski et al., 2014). Thus, growth of crop species can be enhanced, and growth of weedy competitor species simultaneously repressed through applications of microbes that growth promotional in crops—but produce endobiome interference in competitor plants. Such an approach should reduce applications of agrochemicals in crops with economic and environmental benefits.

CONCLUSIONS

Seed-vectored microbes play roles in modulation of seedling development, defense from abiotic and biotic stresses, defense from pathogens and herbivores, and nutrient acquisition. We have identified endobiome interference as a means whereby symbiotic microbes of one plant suppress growth of competitor plant species by reducing seedling growth and increasing seedling mortality. One mechanism of endobiome interference involves oxidative resistance of the microbe which reduces the capacity of host cells to control intracellular microbes using ROS produced by NOX enzymes on root cell plasma membranes. Endobiome interference is a factor in plant-plant interactions in natural plant communities and a strategy that can be employed successfully to control invasive or weedy plant species.

Example II

Inhibitory Endophytes in Grasses

Plants possess seed-transmitted host-adapted native endophytic microbes that associate with plants in the 'rhizophagy symbiosis'. In the rhizophagy symbiosis microbes enter into root cells at the root tip meristem, becoming located within the periplasmic spaces, between the cell wall and plasma membrane, where root cell plasma membranes secrete superoxide onto bacteria, degrading them. Oxidative degradation of microbes in the rhizophagy symbiosis is thought to be a source of nutrients for plants. The microbes involved in the rhizophagy symbiosis also play roles in modulation of plant development, including stimulation of root gravitropic response (trigger roots to grow downward) and increasing root growth. Introduction of alien endophytic microbes from other hosts into a plant may displace native endophytes and disrupt functions of the rhizophagy symbiosis.

In this study of endobiome interference in seedlings of the grass *Poa annua* var. *reptans*, we first removed microbes from seeds through surface disinfection (40 min in 4% NaOCl), then we inoculated seeds with endophytic microbes obtained from several other plant species and assessed seedling growth on agarose after three days. Results of this experiment show: 1) two yeasts from invasive plants *Froelichia gracilis* and *Abrus precatorius*, respectively, entered into root cells and induced the highest gravitropic response in roots (indicating symbiotic compatibility) and the highest root growth repression (64% and 55.2% root growth repression; indicating endobiome interference), 2) the bacterium *Micrococcus luteus* induced a 51% root growth repression, 3) bacteria from several hosts were less effective in improving gravitropic response in seedlings or reducing root growth (with root growth repressions below 50%, 4) several of the microbes also were seen to reduce $H_2O_2$ secretion by roots, and 5) all microbes were microscopically confirmed in tissues of seedling roots. We hypothesize that suppression of $H_2O_2$ secretion from roots may be due to production of antioxidants by the microbes. The most effective microbes in suppression of root growth were the two yeasts, followed by *Micrococcus luteus*. The yeasts are known to produce higher levels of antioxidants (catalases, peroxidases, carotenoids and antioxidant cell wall polysaccharides) than many prokaryotes (*Micrococcus luteus* is an exception since it also produces high levels of antioxidants). Resistance of the two yeasts and *Micrococcus luteus* to degradation by reactive oxygen (superoxide) produced by the root cells enables them to proliferate within root cells and tissues without regulation by host roots, resulting in greater internal microbe growth and repression of root elongation. Essentially, these oxidatively-resistant microbes divert nutrients from root development to microbe development, resulting in root growth repression.

Endophytic microbes obtained from roots of seedlings obtained from surface disinfected seeds of several plants (Table 3A). Microbes suspended in water and inoculated onto surface-disinfected seeds of *Poa annua* var. *reptans* on agarose. After three days seedling root gravitropic response and root lengths were determined, and agarose plates stained for $H_2O_2$ using diaminobenzidine tetrachloride. Roots were examined microscopically to confirm intercellular and intracellular location of microbes in plant roots.

TABLE 3A

Gravitropic response (%), root length growth, and root hydrogen peroxide secretion after three days of growth of *poa annua* var. *reptans* seedlings inoculated with microbes obtained from seedlings of several other plants

| Strain | Host | Gravitropic resp.* | Root length | $H_2O_2^t$ |
| --- | --- | --- | --- | --- |
| No microbes | N/A | 18.29% (n = 66) | 8.7 ± 1.6 mm (n = 21) | +++ |
| Rhodotorula | Abrus sp. | 83.3% (n = 30) | 3.1 ± 1.2 mm (n = 14) | + |

TABLE 3A-continued

Gravitropic response (%), root length growth, and root hydrogen peroxide secretion after three days of growth of poa annua var. reptans seedlings inoculated with microbes obtained from seedlings of several other plants

| Strain | Host | Gravitropic resp.* | Root length | $H_2O_2^t$ |
|---|---|---|---|---|
| Aureobasidium | Froelichia sp. | 79.1% (n = 43) | 3.9 ± 1.3 mm (n = 21) | ++ |
| Micrococcus sp. | Lycopersicum | 70.6% (n = 34) | 4.2 ± 1.6 mm (n = 16) | + |
| Rhodococcus | Abrus sp. | 75% (n = 48) | 4.5 ± 1.5 mm (n = 21) | ++ |
| Curtobacterium | Abrus sp. | 69.3% (n = 39) | 4.6 ± 1.9 mm (n = 19 | ++ |
| Paenibacillus | Poa annua | 63% (n = 31) | 4.7 ± 1.7 mm (n = 17) | + |

*Gravitropic response (%) was calculated as number of seedlings with roots growing downward/total number of roots x 100. $^tH_2O_2$ intensity in medium scored as +++ = high $H_2O_2$ secretion, ++ = moderate $H_2O_2$ secretion, + = low $H_2O_2$ secretion.

We performed additional experiments using seeds of Kentucky bluegrass (*Poa pratensis*), common ragweed (*Ambrosia* sp.) and oregano (*Origanum* sp.) The results are shown in table 3B below.

TABLE 3B

Weed inhibitor endophytes from seeds of Kentucky bluegrass (*Poa pratensis*), common ragweed (*Ambrosia* sp.) and oregano (*Origanum* sp.)

| Strain name (genus) | Source (seeds) | Plants Inhibited (roots) | SEQ ID NO: | Disclosures | Protease | Phosphatase |
|---|---|---|---|---|---|---|
| PP16 (*Pseudomonas* sp.) | Poa pratensis | Dandelion | (16) | None | + | + |
| PP21 (*Exiguobacterium* sp.) | Poa pratensis | Dandelion | (17) | None | + | − |
| PP4-F (*Pseudomonas* sp.) | Poa pratensis | Clover | (18) | None | − | + |
| AA3A (*Bacillus* sp.) | Ambrosia sp. | Clover, Dandelion | (13) | None | + | − |
| Aa2 (*Bacillus* sp.) | Ambrosia sp. | Clover | (12) | None | + | − |
| AA15 (*Bacillus* sp.) | Ambrosia sp. | Clover, Dandelion | (11) | None | + | − |
| OVLBP2R (*Methylobacter* sp.) | Oregano | Dandelion | (9) | None | + | + |
| OVYP4AD19 (*Sphingomonas* sp.) | Oregano | Dandelion | (10) | None | + | − |
| OMPDAP5BK (*Bacillus* sp.)* | Oregano | Dandelion | (15) | None | + | − |
| OMYESP3B (*Terribacillus* sp.) | Oregano | Dandelion | (14) | None | + | − |

*Isolate was stimulatory to corn, wheat and potato.

Example III

Bacteria Associated with Smooth Crabgrass (*Digitaria ischaemum*) Seed Inhibit Competitor Plant Species

*Digitaria* (crabgrass) species are some of the most competitive C$_4$ weeds of agricultural, horticultural and turfgrass landscapes in tropical and temperate regions. *Digitaria ischaemum* and *D. sanguinalis* (smooth and large crabgrass, respectively) are the some of most problematic weed species in the United States and are particularly well adapted to turfgrass systems where as a C$_4$ species they often outcompete C$_3$ grasses and forbs in the summertime (Kim et al. 2002). *Digitaria sanguinalis* is known to produce allelochemicals that may contribute to its competitiveness but these have not been studied extensively (Zhou et al. 2013a, b).

*Poa annua* is another prolific early successional C$_3$ plant that is extremely competitive in turfgrass and horticultural systems and can be found on all seven continents (Chwedorzewska et al. 2015). The success of *P. annua* as a weed is attributed to genotypic variability, prolific seed production, and a short life cycle (Beard 1978).

The weed microbiome may also contribute to weed competitiveness. Communities of bacteria and fungi, which colonize internal tissues as commensals or mutualists are referred to as endophytes and are ubiquitous in plants (reviewed in Hardoim et al. 2008, Truyens et al. 2015, Wilson 1995). A wide range of endophytes are commonly found in plants, although there are several potential mechanisms that reduce microbial endophyte density and diversity when compared with the root rhizosphere (Hardoim et al. 2008, Compant et al. 2010). These endophytes can affect tolerance to abiotic and biotic stressors such as disease, drought, heat and salinity (Podolich et al 2015, Rodriguez et al. 2009).

The well-studied Epichloë endophyte symbionts are known to confer enhanced drought tolerance and resistance to insect herbivory in grasses (Clay 1990, Schardl 2001). These fungi are vertically transmitted through seed of the host plant. It is thought that early-successional weeds may rely on associations with non-clavicipitaceous endophytes to increase their competitiveness, although these have not been studied extensively (Trognitz et al. 2016). Two exceptions are endophytes associated with *Centaurea stoebe* and *Phragmites australis*, which can be invasive outside of their native range. A sampling of fungal endophytes associated with *C. stoebe* achenes (seeds) in the invaded range (North America) found that they were more diverse and were taxonomically different than those associated with plants in the native (European) range (Shipunov et al. 2008). Other researchers found *C. stoebe* infected with a fungal endophyte from the native range and another endophyte common to the non-native range suppressed competitor grasses of the invaded range more than grasses in the native range (Aschehoug et al. 2012). There is considerable diversity among fungal endophytes of *P. australis* in North America as well, although the contribution of these endophytes to fitness of mature plants is unknown (Clay et al. 2016). However, other researchers have demonstrated that *P. australis* seed-associated bacteria and fungi from native and invaded ranges can enhance germination, seedling growth and antagonize other species (Ernst et al. 2003; Shearin et al. 2017, White et al. 2017).

Although *Digitaria ischaemum* and *Poa annua* are not classified as invasive weeds like *P. australis* and *C. stoebe*, they are very prolific in North America outside of their native Eurasian range (Anton and Connor 1995, Kim et al. 2002). However, it is not known whether endophytes affect competitiveness of *Digitaria* spp. or *P. annua*. *Poa annua* endophytes have not been reported, but this weed has been found to cause changes in the soil microbial community that affect the fitness of mid-successional species (Kardol et al. 2007). Previous research has examined fungal endophytes of *Digitaria* spp., but not seed-associated bacteria. Zhou et al. (2015) found over 20 different fungal taxa endophytic to roots of *D. ischaemum* grown in a geothermal soil in China. They found most of these endophytic fungi of *D. ischaemum* were also found in the rhizospheric soil, but there were some species found only in the plant, including *Curvularia protuberata*, suggesting endophytes were vertically or horizontally transmitted. Other researchers have demonstrated that *C. protuberata* colonized by a virus increases thermotolerance of *Dichanthelium lanuginosum* (panic grass) (Redman et al. 1999, 2002, Marquez et al. 2007). This previous research with *Digitaria* spp. endophytes did not examine their role in antagonizing competitor plants.

Compared to endophytes of root and shoot tissues, considerably less research has been conducted on seed-associated bacteria. Prolific seed production is a key strategy for *P. annua* and *D. ischaemum* survival. Where *P. annua* populations are high, seedbank densities have been reported at between 20,000 and 200,000 seeds per m$^2$ (Lush 1988). *D. ischaemum* and *D. sanguinalis* are annuals that survive by prolific seed production and can produce up to 188,000 seeds per plant (Kim et al. 2002). Bacterial endophytes have been isolated from seed of several food crop species including rice (*Oryza sativa*), maize (*Zea mays*) as well as certain grass species (reviewed by Truyens et. al 2015). These endophytes can be important for seedling growth and development and can contribute to the endophytic community of a mature plant (Puente et al. 2009, Ringelberg et al. 2012). Fungal endophytes can be vertically transmitted via seed in forbs as demonstrated by Hodgson et al. (2014), who observed cultivable fungal endophytes in true leaves of various forb seedlings grown in aseptic conditions after surface-sterilization. In grasses, bacterial endophyte transmission from mature maize parents to seed offspring was demonstrated by Liu et al. 2012. It is possible that these endophytes are vertically transmitted because they benefit the host plant. Cultivable diazotrophic endophytes of *Pennisetum purpureum*, a perennial $C_4$ plant that is capable of producing large amounts of biomass under low or high $N_2$ fertilization were found to produce indole acetic acid and solubilize phosphate and may play a role in the competitiveness of this $C_4$ grass in the wild (Videira et al. 2012).

We tested whether bacteria and fungi associated with *D. ischaemum* and *P. annua* seed antagonize competitor species and enhance the ability of host seedlings to grow.

Materials and Methods for Example III

Seed Collection

*Digitaria ischaemum* seed was collected from a single site at the Rutgers Horticultural Research Farm No. 2 in North Brunswick, NJ (40° 45'25"N 74° 47'67"W). The site consisted of a mixed stand of *D. ischaemum* and *Lolium perenne* maintained as a mowed stand of turfgrass for several years. Mowing was suspended in October to allow inflorescence production and maturity prior to harvest in November. Seed was collected from a 300 m$^2$ area using a leaf sweeper. Seeds were stored at 13° C. until they were moved to storage at −20° C. for one week prior to preparation to break seed dormancy. *Poa annua* seed was collected from a single site in University Park, PA (40° 81'09"N 77° 86'73"W) that was maintained as a mowed turfgrass stand for several years. Seeds were stored at 13° C. until they were moved to storage at −20° C. for one week prior to preparation to break seed dormancy.

Surface Sterilization and Endophyte Isolation

*P. annua* and *D. ischaemum* seeds were surface sterilized by placing 5 g of seed in a 200 mL container filled with a 160 mL solution of DI water and 4.125% (v/v) NaOCl based on the methods of White et al. (2017). This container was placed on an orbital shaker to vigorously agitate the solution for 40 minutes. The bleach solution was then decanted and seeds were rinsed at least five times with sterile DI water in a laminar flow hood. Seeds were then placed on Petri dishes containing yeast extract sucrose agar (YESA) and the plates were incubated at room temperature. Four seeds were placed on each plate and there were 10 replicates. The process was repeated with *D. ischaemum* seed one week later with 8 replicates; a second 5 g sample of seed was sterilized using the same process except that 5 μL of polysorbate 20 (Tween20, Thermo Fisher Scientific, Waltham, MA) was added to the 160 mL of 4.125% (v/v) NaOCl solution. Outgrowing fungi were observed after 48 h of incubation and isolated for further study. After 7 to 14 d of incubation, bacteria were observed and isolated for further study. No outgrowing fungi or bacteria were observed in surface-sterilized *P. annua* seed. Therefore, using the same methods described above except without NaOCl, *P. annua* seeds were agitated in sterile water for 5 minutes and then the water was decanted and seeds were rinsed with sterile water before placing on YESA to isolate bacteria.

Bacterial Identification and Characterization

Genomic DNA from bacteria was isolated using GenElute Bacterial Genomic DNA Kits (SigmaAldrich, St. Louis, MO). Bacterial identifications were made by obtaining 16S rDNAsequences after methods employed by Lane (1991) using universal primers 16SF (5'-AGAGTTT-GATCCTGGCTCAG-3'; SEQ ID NO:37) and 16SR (5'-CTACGGCTACCTTGTTACGA-3'; SEQ ID NO:38). Amplified PCR products were resolved by electrophoresis in 1.5% (w/v) agarose gel stained with SYBR safe for visual examination. The PCR products were purified using a PCR purification kit (Qiagen, USA) and sent to Genewiz Inc. (South Plainfield, New Jersey) for sequencing.

Sequences were compared to GenBank accessions using BLAST on the world wide web at ncbi.nlm.nih.gov. Sequences for isolates 4, 5, and 12 were deposited in GenBank under accession numbers MG100861-MG100863.

Experiment 1: Effect of Bacterial Isolates on *Taraxacum officinale* Seedling Mortality In turfgrass systems, *Taraxacum officinale* is a common competitor forb and was selected for use in these experiments. *T. officinale* seeds were surface sterilized using the same process described above for *D. ischaemum* surface sterilization (agitation with 4.125% NaOCl for 40 min). Ten *T. officinale* seeds were plated onto each experimental unit, which consisted of a Petri dish (85 mm diameter) filled with 0.7% agarose media. Isolates were maintained on trypticase soy agar (TSA) and streaked onto Luria-Bertani (LB) agar 12 to 24 h before inoculation. The bacteria were then removed from the agar with an inoculation loop and suspended in 1 mL of sterile water. One 3 µl drop of bacterial suspension was pipetted onto each seed within 1 h of placement on agarose. Each isolate was evaluated in triplicate on a total of 30 seeds. A non-treated axenic control was included for comparison. A *Pseudomonas fluorescens* (Sandy LB4; GenBank No. KX665565) and *Pantoea* sp. isolate (RiLB4; GenBank No. KX752781) isolated from *Phragmites australis* seed by White et al. (2017) were included as standards of comparison. The Sandy LB4 isolate has been shown to increase mortality of competitor forbs while RiLB4 did not affect mortality.

*T. officinale* seedlings were assessed as healthy, injured or dead at 14 days after treatment. Seedlings were considered healthy if cotyledons and leaves were green in color, turgid and not displaying any symptoms of cell membrane leakage (necrosis or greasy, off-color leaf tissues). Seedlings were considered dead if they were completely necrotic. Seedlings were scored as injured if they displayed some injury symptoms but were not completely dead. The number of healthy, injured, and dead plants was assessed in each Petri dish and this number was used to determine the percentage of healthy, injured or dead plants in each experimental unit (Petri dish) based on the total number of plants that germinated. Germination was considered to have occurred if a radicle at least 1 mm in length was visible. Not all bacterial isolates were evaluated on the same date. Therefore, separate non-treated axenic controls were used in each run for comparison. Using isolates that increased mortality compared to the non-treated control, this experiment was repeated on *T. officinale* and *T. repens*. *T. repens* is also a common competitor species in turfgrass. *T. repens* seeds were surface-sterilized using a similar method as *T. officinale* except that a 2% (v/v) NaOCl solution was used instead of a 4.125% solution. To ensure this method effectively sterilized clover seed, 100 seeds were placed on LB agar and no bacteria or fungi were observed after 10 d of incubation.

After *T. officinale* plants were evaluated at 14 days after treatments, the agarose plates containing seedlings were flooded with a 2 mmol/L solution of 3,3-diaminobenzidine tetrahydrochloride (DAB; Sigma Aldrich, St. Louis, MO) 12 h prior to observation to aid in visual observation of bacteria (White et al. 2014). Randomly selected plants were removed from the agarose and squash prepared with aniline blue (0.01%) for microscope observation.

Experiment 2: Effect of Bacterial Isolates on *D. ischaemum* Germination and Seedling Mortality Based on the results of Experiment 1, certain bacterial isolates were evaluated against surface sterilized *D. ischaemum* seedlings. To successfully remove cultivable bacteria from *D. ischaemum* seeds required several iterations of various sterilization procedures before finding an effective method. Seeds were placed on mesh screen and a wooden block was used to rub the seeds through the plastic screen, which removed the paleas and lemmas. These seeds were then placed on a finer plastic screen and a wooden block wrapped in the same screen was rubbed on the seed to remove the seed coat. The naked seeds were separated from the debris and put into a 2 mL microcentrifuge tube filled with 1.5 mL of a 1.5% (v/v) NaOCl solution. The tube was vortexed for 5 min, the NaOCl solution was removed and fresh solution was added before vortexing again for 5 min. Seeds were then rinsed several times with sterile water. To ensure this method effectively sterilized *D. ischaemum* seed, 100 seeds were placed on LB agar. No bacteria were observed after 10 d of incubation and a *Curvularia* sp. was observed outgrowing from 2/100 seeds.

Surface-sterilized *D. ischaemum* seeds were placed on agarose and inoculated with bacteria in the same manner as described in Experiment 1. *T. officinale* seeds were also included in the experiment as a standard of comparison to Experiment 1. This experiment was conducted once, but was repeated with Isolates 4 and 5 within Experiment 3.

Experiment 3: Effect of Bacterial Isolates Alone and in Combination with *Curvularia* sp. on *D. ischaemum*, *T. Repens* and *P. annua* Seedlings The effects of certain bacterial isolates alone and in combination with a *Curvularia* sp. on germination and mortality of *D. ischaemum* and *T. repens* were then evaluated. This experiment was conducted twice on separate dates.

Surface-sterilized seeds were placed on agarose and inoculated as described previously. Seeds were inoculated with bacterial isolates 4 and 5, the combination of 4+5, RiLB4 (standard), or no bacteria alone and in combination with a *Curvularia* sp. isolate collected outgrowing from *D. ischaemum* seed forming a factorial treatment design. Bacterial isolates were prepared and inoculated onto seeds in the same manner as described for Experiment 1; isolates 4 and 5 were combined by taking an aliquot of each bacterial suspension and combining them in a 1:1 ratio. A suspension of *Curvularia* conidia was prepared by gently washing a potato dextrose agar lawn culture with a solution of sterile water and 0.05% polysorbate 20 and lightly scraping with an inoculation loop. This resulted in a suspension that contained some hyphae but was primarily conidia. Four 10 µl aliquots were sampled and evaluated with a hemocytometer grid to determine the conidia concentration. Within 2 h of spore suspension preparation, a 2 or 4 µl drop (run A and B, respectively) was applied to each seed to inoculate $10^3 \pm 200$ conidia per seed.

The effect of each treatment on germination and seedling mortality was evaluated as previously described in Experiment 1. *P. annua* was used as a model plant to evaluate the effect of these treatments on root gravitropism and root length based on previous research (Verma et al. 2017, White et al. 2017). For each *P. annua* seedling, it was determined whether the root penetrated vertically into the agarose or grew horizontally along the surface of the agarose at 14 days after inoculation. Roots penetrating the agarose were determined to have a positive gravitropic response and the percentage of roots demonstrating a positive gravitropic response is presented (Verma et al. 2017). *P. annua* root length was measured by removing the plant from the agarose and measuring the length of the primary root with a ruler.

Statistical Analysis

Experimental units were arranged in a completely randomized design in all experiments. For each experiment, the ANOVA was conducted using the GLM procedure in SAS (SAS Institute, Cary, NC) v9.4 ($p<0.05$). Means were separated using Fisher's Protected LSD test at the 0.05 level.

Bacterial and Fungal Isolates

Nine morphologically unique bacterial isolates were selected from non-surface sterilized *P. annua* seed. No bacteria or fungi were observed outgrowing from surface sterilized *P. annua* seed. Fifteen isolates were selected from surface sterilized *D. ischaemum* seeds (Table 4). Of these fifteen isolates, twelve were morphologically similar. Of these twelve morphologically similar isolates (5, 8, 9, 10, 12, 16, 17, 18, 21, 22, 23), two were sequenced (isolates 5 and 12) and determined to be two genetically different *Pantoea* spp. (Genbank No. MG100862 and MG100863). Isolate 4 was morphologically distinct and was also determined to be a *Pantoea* sp. (Genbank MG100861). Two unique fungal species were isolated and determined to be *Epicoccum* and *Curvularia* spp. through morphological characterization (Barnett and Hunter, 1998). A *Curvularia* sp. was observed on 55% and 28% of the seeds in the first and second experimental run, respectively, and was isolated for further experimentation given its prevalence on surface-sterilized seed in this experiment and previous reports of *Curvularia* sp. affecting thermotolerance (Redman et al. 1999, 2002, Marquez et al. 2007). An *Epicoccum* sp. was observed outgrowing from 4 of 40 seeds in the first run and 10 out of 32 seeds in the second run.

While *P. annua* isolates had limited or no effects on *T. officinale*, *D. ischaemum* isolates 4, 5, 21 and 22 of caused seedling mortality of 19 to 47%. Isolates 4, 5, 8, 9, 10, 12, 21, 22, and 24 caused seedling injury that was greater than the bacteria free control. When selected *D. ischaemum* isolates were evaluated in a second experimental run, isolates 5 and 8 caused 39 and 17% *T. officinale* seedling mortality, respectively (Table 5). All *D. ischaemum* isolates caused injury to >75% of *T. repens* seedlings at 7 days after inoculation and these seedlings likely would have completely died if observed 14 days after inoculation. In sub-

TABLE 4

Effect of bacteria collected outgrowing from surface-sterilized *Digitaria ischaemum* seeds and non-sterile annual bluegrass (*Poa annua*) on dandelion (*Taraxacum officinale*) seedling mortality in axenic agarose culture 14 days after inoculation. Isolates 1 to 6, 7 to 12, 13 to 18, and 19 to 24 were evaluated in separate experiments in Run A. A non-treated control was included in each experiment. Sandy LB4 and RiLB4 (Genbank No. KX752781 and KX665565, respectively) were included as standards and evaluated with isolates 7 to 12.

| Isolate No. | Isolated from | Seedling mortality (%)† | Seedlings injured (%) |
|---|---|---|---|
| 1 (*) | *P. annua* | 0 | 21 |
| 2 (*) | *P. annua* | 0 | 5 |
| 3 (*) | *P. annua* | 0 | 7 |
| 4 (33) | *D. ischaemum* | 19*§ | 44* |
| 5 (34) | *D. ischaemum* | 47* | 87* |
| 6 (*) | *P. annua* | 0 | 6 |
| No bacteria | — | 0 | 18 |
| 7 (19) | *P. annua* | 0 | 11 |
| 8 (20) | *D. ischaemum* | 29 | 69* |
| 9 (21) | *D. ischaemum* | 13 | 42* |
| 10 (22) | *D. ischaemum* | 8 | 67* |
| 11 (23) | *P. annua* | 0 | 30* |
| 12 (36) | *D. ischaemum* | 10 | 67* |
| No bacteria | — | 0 | 3 |
| 13 (24) | *D. ischaemum* | 21 | 54 |
| 14 (25) | *P. annua* | 0 | 31 |
| 15 (*) | *P. annua* | 0 | 16 |
| 16 (26) | *D. ischaemum* | 10 | 27 |
| 17 (27) | *D. ischaemum* | 14 | 52 |
| 18 (28) | *D. ischaemum* | 23 | 40 |
| No bacteria | — | 0 | 22 |
| 19 (29) | *P. annua* | 0 | 45 |
| 20 (30) | *D. ischaemum* | 0 | 41 |
| 21 (31) | *D. ischaemum* | 39* | 80* |
| 22 (32) | *D. ischaemum* | 37* | 79* |
| 23 (*) | *D. ischaemum* | 0 | 36 |
| 24 (*) | *D. ischaemum* | 0 | 46* |
| RiLB4 | *P. australis* | 0 | 11 |
| Sandy LB4 | *P. australis* | 8 | 35 |
| No bacteria | — | 0 | 38 |

†Percent mortality is the percentage of emerged seedlings that were determined by visual assessment to be completely dead. Seedlings were scored as injured if they displayed some injury symptoms but were not completely dead.
§An asterisk indicates that the level of mortality or injury was significantly different from the non-treated control according to Fisher's Protected LSD test ($p = 0.05$). Isolates were evaluated in four separate experiments; Numbers in parentheses are SEQ ID NOS: (*) indicates not yet sequenced.

Experiment 1: Effect of Bacterial Isolates on *Taraxacum officinale* Seedling Mortality Of the nine bacteria isolated from *P. annua* seed, none caused *T. officinale* seedling mortality (Table 4). Isolate 11 caused 30% *T. officinale* seedling injury, which was different than the non-treated control. Injury caused by other *P. annua* isolates was not different from the bacteria free control. This experiment indicates that bacteria isolated from non-surface-sterilized *P. annua* seed do not increase *T. officinale* seedling mortality.

sequent experiments mortality of inoculated seedlings increased between 7 and 14 days after inoculation. In previous research evaluating bacteria isolated from *Phragmites australis*, White et al. (2017) demonstrated that *Pseudomonas fluorescens* strain Sandy LB4 caused >70% *T. officinale* seedling mortality while a *Pantoea* sp. strain RiLB4 did not increase mortality compared to the axenic control. In our experiments, Sandy LB4 nor RiLB4 increased *T. officinale* mortality compared to the bacteria free control.

TABLE 5

Effect of bacteria collected outgrowing from surface-sterilized *Digitaria ischaemum* seeds on dandelion (*Taraxacum officinale*) seedling mortality 14 days after inoculation and white clover (*Trifolium repens*) 7 days after inoculation in axenic agarose culture. Only certain isolates were evaluated based on the results of Run A. Isolates RiLB4 and Sandy LB4 (Genbank No. KX752781 and KX665565, respectively) were isolated from *Phragmites australis* and were included as standards.

|  | *T. officinale* | | *T. repens* | |
| --- | --- | --- | --- | --- |
| Isolate No. | Seedling mortality (%)† | Seedlings injured (%) | Seedling mortality (%) | Seedlings injured (%) |
| 4 | 12 | 49* | 16* | 88* |
| 5 | 39* | 68* | 5 | 76* |
| 8 | 17* | 42* | 8 | 83* |
| 10 | 3 | 19 | 8 | 84* |
| 12 | 11 | 33* | 12 | 93* |
| 13 | 11 | 22 | 8 | 78* |
| 17 | 4 | 40* | 7 | 67* |
| 18 | 0 | 29* | 49* | 84* |
| 21 | 4 | 17 | 7 | 89* |
| 22 | 4 | 40* | 0 | 96* |
| RiLB4 | — | — | 0 | 36 |
| Sandy LB4 | 0 | 22 | 0 | 23 |
| None | 0 | 4 | 0 | 34 |

†Percent mortality is the percentage of emerged seedlings that were determined by visual assessment to be completely dead. Seedlings were scored as injured if they displayed some injury symptoms but were not completely dead.
§An asterisk indicates that this level of mortality was significantly different from the non-treated control according to Fisher's Protected LSD test (p = 0.05).

Bacteria were observed in squash preparations of *T. officinale* root tips treated with isolates 4 and 5. Root hairs of seedlings treated with isolates 4 and 5 were malformed and the membrane at the tip of the root hair was often completely destroyed where bacteria were present (FIG. 21). Intact root hairs were observed in the axenic controls. Based on the results of this experiment, we selected certain isolates for further study.

Experiment 2: Effect of Bacterial Isolates on *D. ischaemum* Germination and Seedling Mortality Isolate 22 and the combination of isolates 4 and 5 reduced *D. ischaemum* germination to 33 and 20%, respectively (Table 6). Other isolates did not reduce germination compared to the bacteria free control. Isolates 8 and 22 increased *D. ischaemum* seedling mortality at 14 days after inoculation compared to the bacteria free control. Low germination prevented a proper assessment of the effect of the isolate 4+5 combination on *D. ischaemum* seedling mortality; these data were removed from the statistical analysis and are not presented. *T. officinale* was included to aid comparison to other experiments. All isolates except isolate 18 increased *T. officinale* mortality; a similar response was observed in Experiment 1. Based on the results of Experiments 1 and 2, we selected isolates 4 and 5 for further study.

TABLE 6

Effect of *Pantoea* spp. isolates on *Digitaria ischaemum* germination and seedling mortality 14 and 28 days after inoculation in axenic agarose culture. Ten seeds were placed in each Petri dish and each treatment was replicated in three Petri dishes. *Taraxacum officinale* seeds were also inoculated in separate Petri dishes and included for comparison; mortality was evaluated at 21 days after treatment.

|  |  | Seedling mortality (%)† | | | |
| --- | --- | --- | --- | --- | --- |
|  | *D. ischaemum* | *D. ischaemum* | | *T. officinale* | |
| Bacterial isolate | Germination (%) | 14 days | 28 days | 21 days | |
| 4 | 40 abc§ | 0 B | 29 | 71 | a |
| 5 | 53 Ab | 6 ab | 13 | 86 | a |
| 8 | 43 Ab | 18 A | 43 | 78 | a |
| 18 | 43 Ab | 0 ab | 7 | 33 | b |
| 22 | 33 Bc | 19 A | 17 | 79 | a |
| 4 + 5 | 20 C | — | — | 72 | a |
| none | 57 A | 0 B | 0 | 17 | b |

†Percent mortality is the percentage of emerged seedlings that were determined by visual assessment to be completely dead.
§Means followed by the same letter are not significantly different according to Fisher's Protected LSD test (p = 0.05). In columns where no letters are present, the ANOVA determined that the treatment effect was not significant (p ≤ 0.05).

Effect of Bacterial Isolates Alone and in Combination with *Curvularia* sp. on *D. ischaemum*, *T. Repens* and *P. annua* Seedling Mortality Germination of *P. annua* and *T. repens* was 93 and 83%, respectively and was not affected by bacteria or *Curvularia* treatment (data not presented). *D. ischaemum* germination was reduced from 71% to 34% by *Curvularia*, but was not affected by bacterial treatment (data not presented). Among seedlings that germinated, the main effect interaction of bacteria and *Curvularia* treatment was significant for *T. repens* seedling mortality 2 weeks after inoculation, (Table 7). Bacterial isolates 4 and 5 alone or in combination with each other caused between 57 and 81% *T. repens* mortality compared to 0 and 4% for RiLB4 and the bacteria free control (FIG. 22). When inoculated with *Curvularia*, seedling mortality was similar across all treatments (64 to 87%).

the cytoplasm; observations of root hairs treated with isolate 4 were similar except that L-forms of bacteria were occasionally observed in root hair cytoplasm. In every observation (n>20) of DAB stained roots of seeds inoculated with bacteria, large numbers of bacterial rods were present in the rhizosphere, while no bacteria were observed in the rhizosphere of axenic controls. Conclusions from microscopic observations are limited, and the mechanism by which these bacteria kill *T. repens* and *T. officinale* should be investigated in more detail.

DISCUSSION

Our experiments demonstrate that *D. ischaemum* seed contains cultivable bacteria of the *Pantoea* genus and at least two cultivable fungi in genera *Epicoccum* and *Curvularia*.

TABLE 7

Effect of *Pantoea* spp. isolates alone and in combination with *Curvularia* sp. spores outgrowing from surface-sterilized *Digitaria ischaemum* seeds on *Trifolium repens* seedling mortality 14 days after inoculation in axenic agarose culture. Ten seeds were placed in each Petri dish and each treatment was replicated in three Petri dishes per experimental run. Combined results of two experimental runs are presented. A *Pantoea* sp. (RiLB4; Genbank No. KX752781) isolated from *Phragmites australis* and was included as a standard.

| Bacterial isolate | *Curvularia* | Seedling mortality (%)[†] | | | |
|---|---|---|---|---|---|
| | | *T. repens* | | *D. ischaemum* | |
| 4 | No | 67 | a[§] | 19 | b |
| 5 | No | 81 | A | 31 | B |
| 4 + 5 | No | 57 | A | 2 | B |
| RiLB4 | No | 0 | B | 0 | B |
| none | No | 4 | B | 3 | B |
| 4 | Yes | 73 | A | 77 | A |
| 5 | Yes | 87 | A | 63 | A |
| 4+ 5 | Yes | 87 | A | 68 | A |
| RiLB4 | Yes | 64 | A | 77 | A |
| none | Yes | 73 | A | 83 | A |

[†]Percent mortality is the percentage of emerged seedlings that were determined by visual assessment to be completely dead.
[§]Means followed by the same letter are not significantly different according to Fisher's Protected LSD test (p = 0.05).

*Curvularia* also increased *D. ischaemum* mortality regardless of bacteria treatment. When averaged across bacterial treatments, *Curvularia* increased *D. ischaemum* mortality from 11% to 73%. Bacterial isolates 4 and 5 alone or in combination did not affect *D. ischaemum* mortality compared to RiLB4 and the bacteria free treatment, although there is a non-significant trend that bacteria 4 and 5 alone increased mortality compared to the combination of 4+5, RiLB4 and the bacteria free control.

The bacteria treatments did not affect *P. annua* mortality (data not presented). The interaction of bacteria and *Curvularia* treatment on *P. annua* mortality and root gravitropic response was not statistically significant and therefore will not be presented. However, the main effect of *Curvularia* was significant. When averaged across all bacterial treatments, *Curvularia* increased *P. annua* mortality from 0 to 6% and the fraction of plants injured from 5 to 10%. *Curvularia* sp. treatment increased the positive gravitropic response of *P. annua* roots. When averaged across bacterial treatments, 57% of roots inoculated with *Curvularia* demonstrated a positive gravitropic response compared to 21% of roots without *Curvularia*. Bacteria treatments did not affect root gravitropism (data not presented). *Curvularia* nor bacteria treatments affected *P. annua* root length.

Observation of Bacteria in Seedling Roots

*T. repens* and *T. officinale* root hairs stained with DAB after inoculation with isolate 5 were often malformed and bacteria were observed around root hairs but not usually in Several *Pantoea* spp. isolates increased seedling mortality of competitor forbs more than *D. ischaemum* in axenic culture indicating some selectivity. *Pantoea* spp. have been isolated as epiphytes from the phyllosphere of many plant species and non-sterilized *Oryza sativa* and *Phragmites australis* seed (Cottyn et al. 2001, Walterson and Stavrinides 2015, White et al. 2017). Ferreira et al. (2008) demonstrated that a *P. agglomerans* strain can colonize *Eucalyptus* seedlings after being inoculated onto the seed. As plant epiphytes, *Pantoea* spp. can behave as growth promoters, plant pathogens, and disease suppressors; some strains are registered as commercial products (reviewed by Walterson and Stavrinides 2015). However, we are not aware of any research demonstrating the efficacy of *Pantoea* spp. for selective weed control. Research evaluating seed-associated bacteria as antagonists of competitor forbs is also limited. White et al. (2017) found that mixtures of certain bacteria associated with *Phragmites australis* seed increased mortality of *T. officinale* seedlings in axenic culture to a similar degree as bacteria evaluated in these experiments. Previous research investigating deleterious rhizobacteria of plants evaluated bacterial strains further if they reduced root length of the target and non-target species by more than 30% and 10%, respectively, in Petri dish culture (Kennedy 1991, Kremer and Kennedy 1996, Kennedy et al. 2016). We did not measure root length in our experiments, but forb:crabgrass mortality ratios are between 2:1 and 5:1.

These data demonstrate that *Pantoea* spp. isolated from *D. ischaemum* seed have the capacity to antagonize seedlings of competitor forbs in axenic culture. *Pantoea* isolates consistently caused necrosis indicative of membrane leakage in *T. repens* and *T. officinale* cotyledons beginning about 7 days after inoculation and progressing until complete death was observed 14 to 21 days after inoculation. In our analysis, RiLB4 was included as a standard control and did not increase mortality of *T. repens* and *T. officinale* while several *Pantoea* spp. isolates from *D. ischaemum* caused 50 to 80% mortality of *T. repens* and *T. officinale* seedlings. The effect of these isolates on *D. ischaemum* seedlings was inconsistent, but results indicate that they may increase seedling mortality. However, in some experiments, mortality was reduced when isolates 4 and 5 were combined. It is possible that the method of *D. ischaemum* seed surface sterilization that required seed coat removal and sterilization of a naked seed increased the susceptibility of *D. ischaemum* to these bacteria and reduced the selectivity of these bacteria. The combination of isolates 4 and 5 demonstrated the greatest amount of selectivity.

Figure 23:
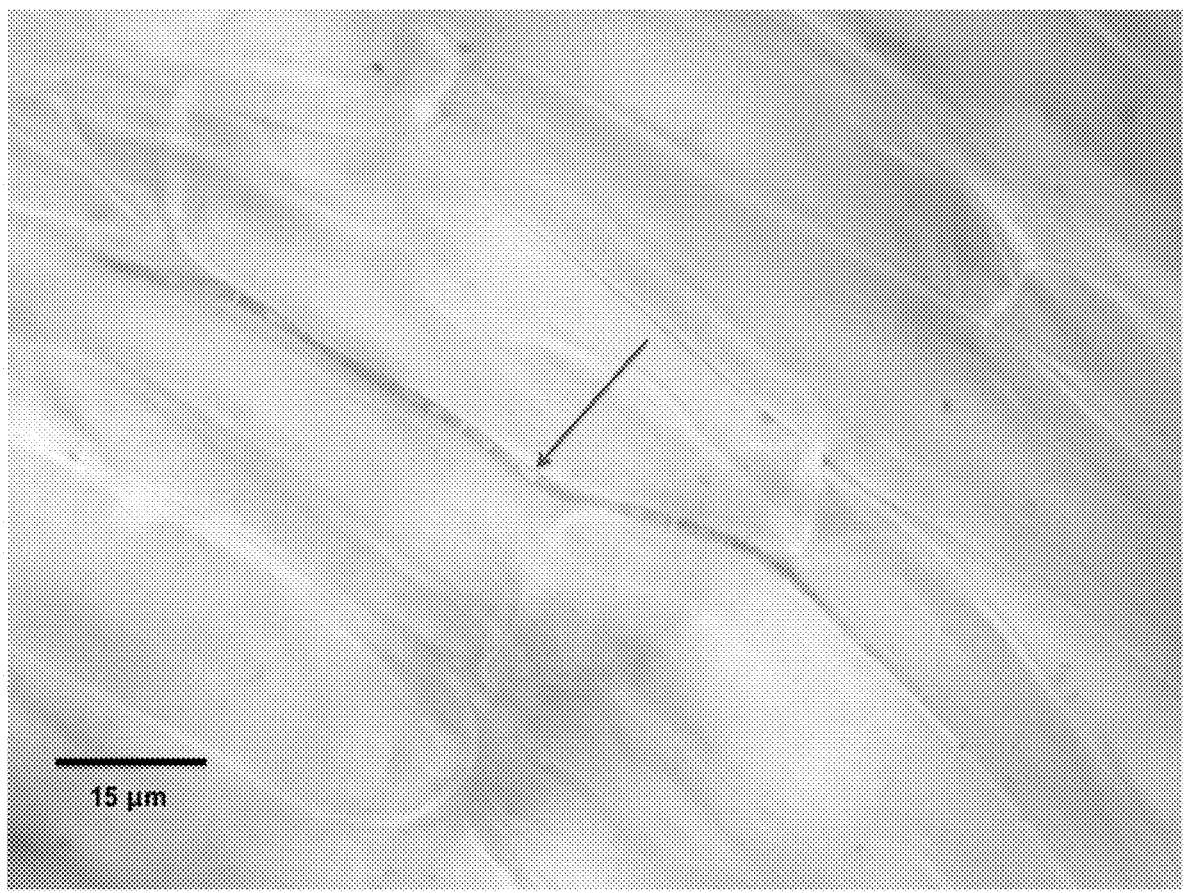
FIG. 23. Root cortex cells in the primary *Poa annua* seedling root 10 days after seeds were inoculated with a *Curvularia* sp. showing an intercellular fungal hyphae (indicated with arrows) stained with aniline blue (0.1%).

In our experiments *Curvularia* functioned primarily as a pathogen of *T. repens* and *D. ischaemum*, although with a different combination of bacterial cohorts it may function as a symbiont (Podolich et al. 2015). *Curvularia* was much less pathogenic to *P. annua* and increased the positive gravitropic response of *P. annua* roots. To potentially avert the pathogenic effect against *D. ischaemum*, more mature seedlings could be tested, perhaps allowing plants to develop at least one true leaf before inoculating with this *Curvularia* sp. isolate to evaluate stress responses similar to Redman et al. (2002) and Marquez et al. (2007). Seeds inoculated with *Curvularia* sp. in these experiments developed segmented hyphae as the bacteria appear to colonize intercellular spaces of inoculated *P. annua* and *D. ischaemum* root cortex tissue which suggests it has endophytic capabilities (FIG. 23).

These experiments demonstrate that *Digitaria ischaemum* seeds contain bacteria that antagonize competitor species in Petri dish experiments. The *Pantoea* spp. isolates evaluated in these experiments may provide *D. ischaemum* a competitive advantage against competitor species.

Example IV

Application of Combinations of Heterologous Endophytic Bacteria to Improve Agronomic Traits As described in the previous example, the endophytic bacteria listed in Table 1 can be used alone or in combination with other bacteria or agents to control, or suppress growth of competitor plant species, thereby conferring growth advantages to plants of interest. These advantages include one or more of an increase in root growth promotion, shoot growth promotion, resistance to salt stress, via increased competition with undesirable plant species in a plant produced from the seed, as compared to a reference plant which is not treated with the inventive bacterial combination. The bacteria can act synergistically in combination or their effects may be additive in achieving the advantages set forth above. Such combinations can include 1, 2, 3, 4, 5, 6, 7, or all of the strains listed in Table 1 or Table 4. However, in certain embodiments the combinations lack *Curtobacterium* (strain *Froelichia* #4) as this strain has been found to promote the growth of invasive weed species. In cases where *Curtobacterium* (strain *Froelichia* #4) provides a growth advantage to the target plant of interest, it may be included in the formulations of the invention. Combinations can include one or more strains in Table 1 and other strains known to confer beneficial growth properties to plants. The strains may be present in differing amounts or ratios, e.g., 1:1, 1:2, 1:3, 1:4, 1:2:1, 1:5:1, etc. Exemplary combinations include, without limitation:

combination 1: the yeast *Aureobasidium pullulans* (*Froelichia* #2) and bacterium *Micrococcus luteus* (*Lycopersicum* #1) where strains complement one another, and the mixture shows maximum seedling mortality;

combination 2: the yeast *Rhodotorula* sp. (strain *Abrus* #1), *Sphingomonas* sp. (strain *Abrus* #3) and *Micrococcus luteus* (*Lycopersicum* #1) which were each effective to inhibit root growth; and combination 3: all of the members of combinations 1 and 2.

To maximize inhibition of undesirable weeds, the following strains can be employed:

Combination 4: Strain #5 (*Pantoea* sp. from crabgrass which inhibits dandelion)+strain PP4F (*Pseudomonas* sp. from *Poa pratenses*) (that inhibits clover)+strain *Froelichia* #2 (*Aureobasidium pullulans*) (that inhibits curly dock).

To maximize use on grass hosts (like turf grasses) and inhibit competitor weeds use:

Combination 5: Strain #4 (*Pantoea* sp. from crabgrass which inhibits dandelion)+strain PA-NA-2B1 (*Paenibacillus* sp. from *Poa annua*) (inhibiting dandelion)+strain PP4-F (*Pseudomonas* sp. from *Poa pratensis* for inhibiting clover)

Combination 6: Strain PP4F (*Pseudomonas* sp. from *Poa pratenses*) (that inhibits clover)+Strain PA-NA-2B1 (*Paenibacillus* sp. from *Poa annua*) (inhibiting dandelion)+Strain Froelichia #2 (*Aureobasidium pullulans*) (that inhibits curly dock)

The combined microbes may be formulated to facilitate administration to target plants of interest, using methods described herein above. They may be lyophilized, and optionally formulated into synthetic alginate beads for distribution into soil. Alternatively, they can be formulated as an aerosol for spraying on areas to be treated. Such methods are known to those of skill in the art of plant and crop propagation.

The formulations described above can also be added to certain fertilizer compositions, such as the controlled release fertilizer composition described in U.S. Pat. No. 9,266,787. Such fertilizer compositions can optionally comprise one or more reagents selected from urea, ammonia, ammonium nitrate, ammonium sulfate, calcium nitrate, diammonium phosphate, monoammonium phosphate, potassium nitrate and sodium nitrate. monopotassium phosphate, dipotassium phosphate, tetrapotassium pyrophosphate, and potassium metaphosphate and optionally a macronutrient selected from the group consisting of sulfur, calcium and magnesium and/or micronutrients including boron, copper, iron, manganese, molybdenum and zinc provided that such reagent does not interfere with the growth promoting action of the endophytic bacteria described herein.

These aforementioned formulations and compositions can further comprise a dispersing agent, such as those disclosed in U.S. Pat. No. 8,241,387.

REFERENCES

Atsatt P R, Whiteside M D (2014) Novel Symbiotic Protoplasts Formed by Endophytic Fungi Explain Their Hidden Existence, Lifestyle Switching, and Diversity within the Plant Kingdom. PLoS ONE 9(4): e95266. haps://doi.org/10.1371/journal.pone.0095266

Bacon C, White J F. (2015) Functions, mechanisms and regulation of endophytic and epiphytic microbial communities of plants. Symbiosis DOI: 10.13140/RG.2.1.1956.9124.

Badri D V, Vivanco J M. (2009) Regulation and function of root exudates. Plant, Cell and Environment 32: 666-681.

Beltrán-Garcia, M J, White J F, Prado F M, Prieto K R, Yamaguchi L F, Tones M S, Kato M J, Medeiros M H G, Di Mascio P. (2014) Nitrogen acquisition in Agave tequilana from degradation of endophytic bacteria. Scientific reports 4, 6938

Beran V, Havelkova M, Kaustova J, Dvorska L, Pavlik I (2006) Cell wall deficient forms of mycobacteria: a review. Veterinarni Medicina 51: 365-389.

Buer C S, Sukumar P, Muday G K. (2006) Ethylene modulates flavonoid accumulation and gravitropic responses in roots of Arabidopsis, Plant Physiology 140: 1384-4396. http://doi.org/10.1104/pp 0.105.075671.

Bowsher A W, Ali R, Harding S A, Tsai C-J. Donovan L A. (2016). Evolutionary Divergences in Root Exudate Composition among Ecologically-Contrasting Helianthus Species. PLoS ONE, 11(1). e0148280, http://doi.org/10.1371/journal.pone.0148280

Broeckling C D, Broz A K, Bergelson J, Manter D K, Vivanco J. M. (2008) Root exudates regulate soil fungal community composition and diversity. Appl. Environ. Microbiol. 74: 738-744.

Cabiscol E, Tamarit J, Ros J. (2000) Oxidative stress in bacteria and protein damage by reactive oxygen species. Internat. Microbiol. 3: 3-8.

Clarkson D. Marschner I L (1995) Mineral Nutrition of Higher Plants. Second edition. London, Academic Press, 889 pp.

Clay K. (1988) Fungal endophytes of grasses: A defensive mutualism between plants and fungi. Ecol. 69: 1046.

Clay K, Holah J, Rudgers J A. (2005) Herbivores cause a rapid increase in hereditary symbiosis and alter plant community composition. PNAS 102: 12465-12470.

Compant S, Clement C, Sessitsch A. (2010) Plant growth-promoting bacteria in the rhizo- and endosphere of plants: Their role, colonization, mechanisms involved and prospects for utilization. Soil Biol Biochem 42: 669-678.

Cox N A, Mahn F, Bailey J B, Shotts E B. (1994) Effect of butyric or lactic acid on the In vivo colonization of Salmonella typhimurium. J. Appl. Poult. Res. 3: 315-318.

Cook D, Gardner D R, Pfister J A. (2014) Swainsonine-containing plants and their relationship to endophytic fungi J. Ag. and Food Chemistry 62: 7326-7334. DOI: 10.1021/jf501674r.

Cook D, Donzelli B G G, Creamer R, Baucom D L, Gardner D R, Pan J, Schardl C L (201.7). Swainsonine biosynthesis genes in diverse symbiotic and pathogenic fungi. G3: Genes|Genomes|Genetics 7: 1791-1797. http://doi.org/10.1534/g3.117.041384.

Doty S L (2017) Functional importance of the plant microbiome: Implications for agriculture, forestry and bioenergy. Pages 1-5 in: Doty S L (Ed.), Functional Importance of the Plant Microbiome. Springer, Amsterdam, Netherlands.

Environmental Justice Foundation (2007). The Deadly Chemicals in Cotton, Environmental Justice Foundation in collaboration with Pesticide Action Network UK, London, UK. ISBN No. 1-904523-10-2.

Errington J, Mickiewicz K, Kawai Y, Wu L J. (2016) L-form bacteria, chronic diseases and the origins of life. Phil. Trans. R. Soc. B 2016 371 20150494; DOI: 10.1098/rstb.2015.0494. Funk-Jensen D, Hockenhull J. (1984) Root exudation, rhizosphere microorganisms and disease control. Växtskyddsnotiser 48: 49-54.

Gond S K, Bergen M, Torres M S, White J F. (2015) Effect of bacterial endophyte on expression of defense genes in Indian popcorn against Fusarium moniliforme. Symbiosis 66: 133-140. DOI: 10.1007/s13199-015-0348-9.

Hamilton C E, Gundel P E, Helander M, Saikkonen K. (2012) Endophytic mediation of reactive oxygen species and antioxidant activity in plants: a review. Fungal Diversity 54: 1-10.

Hardoim P R, van Overbeek L S, Berg G, Pirttila A M, Compant S, Campisano A, Döring M, Sessitsch A. (2015) The hidden world within plants: ecological and evolutionary considerations for defining functioning of microbial endophytes. Microbiol. Mol. Biol. Rev. 79: 293-320. doi: 10.1128/MMBR.00050-14.

Hill P W, Quilliam R S, DeLuca T H, Farrar J, Farrell M, et al. (2011) Acquisition and assimilation of nitrogen as peptide-bound and D-enantiomers of amino acids by wheat. PLoS ONE 6(4): e19220. doi:10.1371/journal.pone.0019220.

Holland M A. 1997. Methylobacterium and plants. Recent Res Dev in Plant Physiol 1: 207-213. Hurek T, Handley L L, Reinhold-Hurek B, Piché Y. (2002) Azoarcus grass endophytes contribute fixed nitrogen to the plant in an uncluturable state. Molecular Plant-Microbe Interactions 15: 233-242.

Irizarry I. White J R (2017) Application of bacteria from non-cultivated plants to promote growth, alter root architecture and alleviate salt stress of cotton. J Appl. Microbiol. 122: 1110-1120; doi: 10.1111/jam.13414.

Irizarry I, White J F. (2018). Bacillus amyloliquefaciens alters gene expression, ROS production, and lignin synthesis in cotton seedling roots. J. Applied Microbiology 124: 1589-1603.

Johnstone T C, Nolan E M (2015) Beyond iron: Non-classical biological functions of bacterial siderophores. Daltan Trans. 44: 6320-6339. http://dxdoi.org/10.1039/c4dt03559c.

Johnston-Monje D, Raizada M N. (2011) Conservation and diversity of seed associated endophytes in Zea across boundaries of evolution, ethnography and ecology. PLoS ONE 6(6): e20396. doi:10.1371/journal.pone.0020396.

Kandel S L, Joubert P M, Doty L S. (2017) Bacterial endophyte colonization and distribution within plants. Microorganisms 5: 77; doi:10.3390/microorganisms5040077.

Kaul S, Gupta S. Sharma S, Dhar M K. (2017) The fungal endobiome of medicinal plants: A prospective source of bioactive metabolites. In: Agrawal D, Tsay H S, Shyur L F, Wu Y C, Wang S Y. (eds) Medicinal Plants and Fungi: Recent Advances in Research and Development. Medicinal and Aromatic Plants of the World, vol 4. Springer, Singapore.

Kowalski K P, Bacon C, Bickford W, Braun H, Clay K, Leduc-Lapierre M, Lillard E, McCormick M, Nelson E, Torres M, White J F, Wilcox D A. (2015) Advancing the science of microbial symbiosis to support invasive species management: A case study on Phragmites in the Great Lakes. Frontiers in Microbiology 01/2015; 6:95. DOI: 10.3389/fmicb.2015.00095

Kocha T, Yamaguchi M, Ohtaki H, Fukuda T, Aoyagi T. (1997) Hydrogen peroxide-mediated degradation of protein: different oxidation modes of copper- and iron-dependent hydroxyl radicals on the degradation of albumin. Biochimica et Biophysica Acta 1337: 319-326.

Koga R, Nikoh N, Matsuura Y, Meng X-Y, Fukatsu T. (2013) Mealybugs with distinct endosymbiotic systems living on the same host plant. FEMS Microbiol Ecol 83: 93-100.

Kuldau G, Bacon C W. (2008) Clavicipitaceous endophytes: Their ability to enhance grass resistance to multiple stresses. *Biological Control* 46: 57-71.

Lamb C, Dixon R A. (1997) The oxidative burst in plant disease resistance. *Annu. Rev. Plant Physiol. Mol. Biol.* 48: 251-275.

Lanzagorta J M A, de la Torre C, Aller P. (1988) The effect of butyrate on cell cycle progression in *Allium cepa* root meristems. *Physiologia Plantarum* 72: 775-781.

Machova E, Bystricky S. (2013) Antioxidant capacities of mannans and glucans are related to their susceptibility to free radical degradation. *Int. J. Biol. Macromol.* 61: 308-311.

Mohanna D C, Thippeswamy S, Abhishek R U. (2013) Antioxidant, antibacterial, and ultraviolet protective properties of carotenoids isolated from *Micrococcus* spp. *Radiat. Prot. Environ.* 36: 168-174.

Paungfoo-Lonhienne C, Rentsch D, Robatzrk S, Webb R I, Sagulenko E, Nasholm T, Schmidt S, Lonhienne T G A. (2010) Turning the table: plants consume microbes as a source of nutrients. *PLOS ONE* 5(7): e11915. doi: 10:1371/journal.pone.0011915.

Paungfoo-Lonhienne, C., Schmidt, S., Webb, R. and Lonhienne, T. (2013) Rhizophagy—A new dimension of plant-microbe interactions, in de Briujn, F. J. (Ed.) Molecular Microbial Ecology of the Rhizosphere. Wiley-Blackwell. Pub John Wiley & Sons, Inc.

Prieto K R, Echaide-Aquino F, Huerta-Robles A, Valerio H P, Macedo-Raygoza G, Prado F M, Medeiros M, Brito H F, da Silva I, Felinto M C F, White J F, Di Masci, P, Beltran-Garcia M. (2017) Endophytic bacteria and rare earth elements; Promising candidates for nutrient use efficiency in plants. Pp. 285-302, in Hossain M, Kamiya T, Burritt D, Tram L-S P, Fujiwara T. (Eds). Plant Macronutrient Use Efficiency. Academic Press, Cambridge, MA, USA.

Puente M E, Lib C Y, Bashan Y. (2009) Endophytic bacteria in cacti seeds can improve the development of cactus seedlings. *Environ. Exp. Bot.* 66: 402-408.

Redman R S, Sheehan K B, Stout R G, Rodriguez R J, Henson J M. (2002) Thermotolerance generated by plant/fungal symbiosis. *Science* 298: 1581.

Reinhold-Hurek B, Hurek T. (2011) Living inside plants: bacterial endophytes. *Current Opinion in Plant Biology* 14: 435-443.

Rodríguez C E, Mitter B, Barret M, Sessitsch A, Compant S. (2017) Commentary: Seed bacterial inhabitants and their routes of colonization. *Plant & Soil* 422: 129-134. https://doi.org/10.1007/s11104-017-3368-9.

Rodriguez R J, Woodward C, Kim Y O, Redman R S. (2009) Habitat-adapted symbiosis as a defense against abiotic and biotic stresses. In: White J F Jr, Tones M S (eds) Defensive Mutualism in Microbial Symbiosis, CRC Press, Boca Raton, FL, USA. pp. 335-346.

Rudrappa T, Czymmek K J, Paré P W, Bais H P. (2008) Root-secreted malic acid recruits beneficial soil bacteria. *Plant Physiol.* 148:1547-1556.

Schardl C L, Young C A, Pan J, Florea S, Takach J, Panaccione D G, Farman M L, Webb J S, Jaromczyk J, Charlton N D, Nagabhyru P, Chen L, Shi C, Leuchtmann A. (2013) Currencies of mutualisms: Sources of alkaloid genes in vertically transmitted epichloae. *Toxins* 5: 1064-1088.

Soares M A, Li H, Bergen M, White J F. (2015) Functional role of an endophytic *Bacillus amyloliquefaciens* in enhancing growth and disease protection of invasive English ivy (*Hedera helix* L.). *Plant and Soil* 405: 107-123. DOI: 10.1007/s11104-015-2638-7

Soares M A, Li H-Y, Kowalski K P, Bergen M, Torres M S, White J F. (2016) Functional roles of bacteria from invasive *Phragmites australis* in promotion of host growth. *Microb Ecol* 72: 407-17.

Steiner U, Leibner S, Schardl C L, Leuchtmann A, Leistner E. (2011) *Periglandula*, a new fungal genus within the Clavicipitaceae and its association with Convolvulaceae. *Mycologia* 103: 1133-1145.

Stone J K, Bacon C W, White J F. (2000) An overview of endophytic microbes: endophytism defined. In: Bacon C W, White J F (eds) *Microbial Endophytes*, Marcel-Dekker, New York, USA, pp. 3-30.

Sun Y, O'Riordan M. (2013) Regulation of bacterial pathogenesis by intestinal short-chain fatty acids. Pp. 93-113 in *Advances in Applied Microbiology*. Elsevier, N Y.

Tramontano W A, Scanlon C. (1996) Cell cycle inhibition by butyrate in legume root meristems. *Phytochemistry* 41: 85-88.

Thomas P, Soly T A. (2009) Endophytic bacteria associated with growing shoot tips of banana (*Musa* sp.) cv. Grand Naine and the affinity of endophytes to the host. *Microbial Ecology* 58: 953-964.

Thomas P, Reddy K M. (2013) Microscopic elucidation of abundant endophytic bacteria colonizing the cell wall-plasma membrane peri-space in the shoot-tip tissue of banana. *AOB Plants* 5: plt011, https://doi.org/10.1093/aobpla/plt011.

Torres M S, White J F, Zhang X, Hinton D M, Bacon C W. (2012) Endophyte-mediated adjustments in host morphology and physiology and effects on host fitness traits in grasses. *Fungal Ecology* 5: 322-330.

Verma S K, Kingsley K, Irizarry I, Bergen M, Kharwar R N, White J F. (2017a) Seed vectored endophytic bacteria modulate development of rice seedlings. *J. Applied Microbiology* 122: 1680-1691.

Verma S K, Kingsley K, Bergen M, English C, Elmore M, Kharwar R N, White J F. (2017b) Bacterial endophytes from rice cut grass (*Leersia oryzoides* L.) increase growth, promote root gravitropic response, stimulate root hair formation, and protect rice seedlings from disease. Plant and Soil 422: 223-238. DOI: 10.1007/s11104-017-3339-1.

Verma S K, White J F. (2018) Indigenous endophytic seed bacteria promote seedling development and defend against fungal disease in browntop millet (*Urochloa ramosa* L.). *Journal of Applied Microbiology* 124: 764-778. DOI: 10.1111/jam.13673.

Verma S K, Kingsley K L, Bergen M S, Kowalski K P, White J R (2018) Fungal disease protection in rice (*Oryza* saliva) seedlings by growth promoting seed-associated endophytic bacteria from invasive *Phragmites australis*. *MDP*1: *Microorganisms*. doi: 10.3390/microorganisms6010021, Waller F, Achatz B, Baltruschat H, Fodor J, Becker K, Fisher M, Heier T, Huckelhoven R, Neumann C, Wettstein D, Franken P, Kogel K H. (2005) The endophytic fungus *Piriformospora indica* reprograms barley to salt-stress tolerance, disease resistance, and higher yield. PNAS 102: 13386-13391.

White J F, Cole G T. (1986). Endophyte-host associations in forage grasses. IV. The endophyte of *Festuca versuta*. *Mycologia* 78:102-107.

White J F, Chen Q, Torres M S, Mattera R, Irizarry I, Tadych M, Bergen M. (2015) Collaboration between grass seedlings and rhizobacteria to scavenge organic nitrogen in soils. *AoB PLANTS* 7: plu093. doi:10.1093/aobpla/plu093.

White J F. Crawford H, Torres M S, Mattera R, Irizarry I, Bergen M. (2012). A proposed mechanism for nitrogen acquisition by grass seedlings through oxidation of symbiotic bacteria, *Symbiosis* 57: 161-171. http://doi.org/10.1007/s13199-012-0189-8.

White J F, Kingsley K, Harper C J, Verma S K, Brindisi L, Chen Q, Chang X, Micci A, Bergen M. (2018) Reactive oxygen defense against cellular endoparasites and the origin of eukaryotes, in: Krings M, Harper C J, Cuneo N R, Rothwell G W (eds.). *Transformative Paleobotany: Papers to Commemorate the Life and Legacy of Thomas N. Taylor*. Elsevier, Amsterdam, Netherlands.

White I F, Kingsley K L, Kowalski K P, Irizarry 1, Micci A, Soares M A, Bergen M S. (2017). Disease protection and allelopathic interactions of seed-transmitted endophytic pseudomonads of invasive seed grass (*Phragmites australis*). *Plant and Soil*. 422: 195-208. doi:10.1007/s11104-016-3169-6.

White J F, Torres M S. (2010) Is endophyte-mediated defensive mutualism oxidative stress protection? *Physiologia Plantarum* 138: 440-446.

White J F, Torres M S, Somu M P, Johnson H, Irizarry I, Chen Q, Zhang N, Walsh E, Tadych M, Bergen M. (2014). Hydrogen peroxide staining to visualize intracellular bacterial infections of seedling root cells. *Microscopy Research and Technique* 77: 566-573. DOI: 10.1002/jemt.22375.

White J F, Torres M S, Verma S K, Elmore M T, Kowalski K P, Kingsley K L. (In press). Evidence for widespread microbivory of endophytic bacteria in roots of vascular plants through oxidative degradation in root cell periplasmic spaces. In: *PGPR Amelioration in Sustainable Agriculture: Food Security and Environmental Management* (Eds. Kumar A. Singh A, Singh V), Elsevier.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A synthetic combination comprising at least two microbes selected from:
   *Rhodotorula* sp. strain *Abrus* #1 having a 16S rDNA sequence with at least 97% identity to SEQ ID NO: 1,
   *Aureobasidium pullulans* strain *Froelichia* #2 having a 16S rDNA sequence with at least 97% identity to SEQ ID NO: 8
   *Rhodococcus* sp. strain AbrusR having a 16S rDNA sequence with at least 97% identity to SEQ ID NO: 3,
   *Curtobacterium* sp. strain *Froelichia* #4 having a 16S rDNA sequence with at least 97% identity to SEQ ID NO: 4,
   *Paenibacillus* sp. strain PA-NA-2B1 having a 16S rDNA sequence with at least 97% identity to SEQ ID NO: 5,
   *Bacillus* sp. strain AA2 having a 16S rDNA sequence with at least 97% identity to SEQ ID NO: 12,
   *Bacillus* sp. strain OMPDAP5BK having a 16S rDNA sequence with at least 99% identity to SEQ ID NO: 15,
   *Bacillus* sp. strain AA3A having a 16S rDNA sequence with at least 100% identity to SEQ ID NO: 13,
   *Pseudomonas* sp. strain PP4-F having a 16S rDNA sequence with at least 100% identity to SEQ ID NO: 18,
   *Pseudomonas* sp. strain PP16 having a 16S rDNA sequence with 100% identity to SEQ ID NO: 16,
   *Sphignomonas* sp. strain OVYP4AD19 having a 16S rDNA sequence with at least 99% identity to SEQ ID NO: 10, and
   *Exiguobacterium* sp. PP21 having a 16S rDNA sequence with at least 97% identity to SEQ ID NO: 17 in a formulation suitable for application to a plant element or soil of a target plant, which modulate growth of undesirable competitor weed species growing in a habitat of said target plant, as compared to a reference, untreated plant grown under identical conditions, wherein said at least two microbes are combined by human endeavor, act synergistically, and are not found associated in nature.

2. The synthetic combination of claim 1, present in a seed ball.

3. The synthetic combination of claim 1, wherein all of said microbes are present.

4. The synthetic combination of claim 1, further comprising an insecticide or fungicide.

5. A synthetic combination comprising two or more microbes, selected from:
   *Rhodotorula* sp. strain *Abrus* #1 having a 16S rDNA sequence with at least 97% identity to SEQ ID NO: 1,
   *Aureobasidium pullulans* strain *Froelichia* #2 having a 16S rDNA sequence with at least 97% identity to SEQ ID NO: 8
   *Rhodococcus* sp. strain AbrusR having a 16S rDNA sequence with at least 97% identity to SEQ ID NO: 3,
   *Curtobacterium* sp. strain *Froelichia* #4 having a 16S rDNA sequence with at least 97% identity to SEQ ID NO: 4,
   *Paenibacillus* sp. strain PA-NA-2B1 having a 16S rDNA sequence with at least 97% identity to SEQ ID NO: 5,
   *Bacillus* sp. strain AA2 having a 16S rDNA sequence with at least 97% identity to SEQ ID NO: 12,
   *Terrabacillus* sp. strain OMYESP3B having a 16S rDNA sequence with at least 97% identity to SEQ ID NO: 14,
   *Bacillus* sp. strain AA3A having a 16S rDNA sequence with at least 100% identity to SEQ ID NO: 13,
   *Pseudomonas* sp. strain PP4-F having a 16S rDNA sequence with 100% identity to SEQ ID NO: 18,
   *Pseudomonas* sp. strain PP16 having a 16S rDNA sequence with 100% identity to SEQ ID NO: 16,
   *Sphignomonas* sp. strain OVYP4AD19 having a 16S rDNA sequence with at least 99% identity to SEQ ID NO: 10, and
   *Exiguobacterium* sp. PP21 having a 16S rDNA sequence with at least 97% identity to SEQ ID NO: 17,
   in a formulation suitable for application to a plant element or soil of a target plant, which modulates growth of undesirable competitor weed species growing in a habitat of said target plant, as compared to a reference, untreated plant grown under identical conditions wherein said at least two microbes are combined by human endeavor, -act synergistically, and are not found associated in nature.

6. A synthetic combination comprising *Aureobasidium pullulans* strain *Froelichia* #2 having a 16S rDNA sequence with at least 97% identity to SEQ ID NO: 8, and *Micrococcus luteus* strain *Lycopersicum* #1 having a 16S rDNA sequence with at least 97% identity to SEQ ID NO: 36, in a formulation suitable for application to a plant element or soil of a target plant, which modulate growth of undesirable competitor weed species growing in a habitat of said target plant, as compared to a reference, untreated plant grown under identical conditions, wherein said at least two microbes are combined by human endeavor, act synergistically, and are not found associated in nature, wherein said combination increasing seedling mortality in said undesirable competitor weed species as compared to a reference, untreated plant grown under identical conditions.

7. A synthetic combination for inhibiting competitor weed root growth, comprising *Rhodotorula* sp. strain *Abrus* #1 having a 16S rDNA sequence with at least 97% identity to SEQ ID NO: 1, and *Micrococcus luteus* strain *Lycopersicum* #1 having a 16S rDNA sequence with 100% identity to SEQ ID NO: 36, in a formulation suitable for application to a plant element or soil of a target plant, which modulate growth of undesirable competitor weed species growing in a habitat of said target plant, as compared to a reference, untreated plant grown under identical conditions, wherein said at least two microbes are combined by human endeavor, act synergistically, and are not found associated in nature.

8. A method of improving a competitive advantage in a target plant of interest over invasive weed species which grow in the same habitat, comprising inoculating a plant element with the synthetic combination of claim 1.

9. The method of claim 8, wherein said plant is selected from the group of plants consisting of cotton, okra, soybean, cacao, kenaf and kola nut, coffee, tobacco, potato, tomato, sweet potato, sunflower, rapeseed, wheat, corn, rice, barley, sorghum, grass, sugarcane, bamboo, buckwheat, snap bean, dry bean, canola, peas, peanuts, safflower, sunflower, alfalfa hay, clover, vetch, and trefoil, blackberry, blueberry, currant, elderberry, gooseberry, huckleberry, loganberry, raspberry, strawberry, grape, garlic, leek, onion, shallot, citrus hybrid, grapefruit, kumquat, lime, orange, pummelo, cucumber, melon, gourd, pumpkin, squash, eggplant, sweet pepper, hot pepper, tomatillo, herb, spice, mint, arugula, celery, chervil, endive, fennel, lettuce, parsley, radicchio, rhubarb, spinach, swiss chard, broccoli, brussels sprout, cabbage, cauliflower, collard, kale, kohlrabi, mustard green, asparagus, pear, quince, beet, sugarbeet, red beet, carrot, celeriac, chicory, horseradish, parsnip, radish rutabaga, salsify, and turnips, maple, pine, rye, wheat, sorghum, millet, apricot, cherry, nectarine, peach, plum, prune, almond, beech nut, Brazil nut, butternut, cashew, chestnut, filbert, hickory nut, macadamia nut, pecan, pistachio, walnut, artichoke, cassava, and ginger plants.

10. The method of claim 8, wherein said at least two microbes in the synthetic combination are present in a synthetic seed ball or are present in a seed treatment.

11. The method of claim 8, wherein said at least two microbes in the synthetic combination are present in a liquid formulation.

12. The method of claim 11, wherein the liquid formulation is sprayed on the plant element.

13. The method of claim 11, wherein the liquid formulation is applied to the plant element as a root dunk.

14. The method of claim 8, wherein the synthetic combination additionally comprises a controlled release fertilizer formulation.

\* \* \* \* \*

SEQUENCE LISTING

```
<160> NUMBER OF SEQ ID NOS: 38

<210> SEQ ID NO 1
<211> LENGTH: 532
<212> TYPE: DNA
<213> ORGANISM: Rhodotorula sp.

<400> SEQUENCE: 1
ctaaagttga ctaatagaat tagaagcttc tactttacaa aactcggcca ctcccgaaag      60
agcgtcctca gcgaatagtc tattacactg agtcaatccg attttcgaat atgagatgct     120
aatcatttac gaacgagctt cgccaataaa ggccagcagg cgttcagaat ccaaacacta     180
atccgattta ctagaaaccg gtaggttgaa gagttcatga cactcaaaca gacatgctct     240
ccggaatacc agagagcgca aggtgcgttc aaagattcga tgattcactg aattctgcaa     300
ttcacattac ttatcacatt tcgctgcgtt cttcatcgat gcgagagcca agagatccgt     360
tgttgaaagt ttttttttgt tttgttttta tttacatact ttaactaatg tttaatagtg     420
agccgcagac tgaatagcaa ttgcttactc tcagtccgcc aatagtgcac agagttggaa     480
aatgaaggtt gagctaaccg aagttacgct ctaaattcac taatgatcct tc             532

<210> SEQ ID NO 2
<211> LENGTH: 1044
<212> TYPE: DNA
<213> ORGANISM: Sphingomonas sp.

<400> SEQUENCE: 2
agtcgacgat gctctctcgg catagggttg cgtgggtgct gcgccttggg ggcgtaccgc      60
gtccctctgg gataacaggt gtgggcgaac ggtctgagaa cgtggtatct cgaggttgat     120
atcttgccat caaaggatga tcccccgtcg tattcccgc ttggagagaa ctatctggtg      180
gggggaaggc ctacgaaggc ggcttgctgg gacggtcctg cgcggcggat ctgacaccct     240
gggactgctc ctcgggccgg cctcctaggg gaagaatcag tggggaataa tgccctatgc     300
gcgaaagcct gtgccagcgg tgccctgttt atggtggagc acttcgggtt gtaaagctct     360
ttttgccggg atgcgaatga cagtacccgc caaattcccc gcggccaacc ccgtgcctgc     420
agccggggca ataggggcgg ggatagcgtg gttcggaagt actgggcgta aagtttgcgg     480
```

```
acctggcaag agctggtgaa ggtctgctcg ttaattccaa ttaaacaagt gcctttgccg    540
ctgggtcact tgaccggcag ttccttaggg gtttatccaa ttgtacaaga gacactcgag    600
gataatctga agagccagct gggcgaaccg aggatgatgt tgcggggctg ctactgatca    660
tcgaaagagg cgtggattac ctgggaatcc actccggtat gcttggcccg cttttgcgcc    720
tcgtcgcgga tcggggtgt ggaagttggg tggtccactg aagctcctgg aatatctac    780 taggtagtcc tgtaccctcg aataaacggg ccctctcca gcggggcatc gtggggctgt    840
ggaacgagcg gctcacatca agtaccgcc gttaaccttg gccggactat ttctgtaccg    900
ggcgcttcac cactcgggc tcctacctca ggtacttgct ggcggacggc tgcttgggtg    960
tcgacgggtt gagcaagggc tgattggacc gggaccccca tccataagtt cctatccttt   1020
aattaccgta atttaaaagg gaac                                          1044

<210> SEQ ID NO 3
<211> LENGTH: 946
<212> TYPE: DNA
<213> ORGANISM: Rhodococcus sp.

<400> SEQUENCE: 3
ttcgccgccg gcttcgggtg ttaccgactt tcatgagggg acgggcggtg tgtacaaggc     60
ccgggaacgt attcaccgca gcgttgctga tctgcgatta ctagcgactc cgacttcacg    120
gggtcgagtt gcagaccccg atccgaactg agaccggctt aagggattc gctccacctc    180 acggtatcgc agccctctgt accggccatt gtagcatgtg tgaagccctg gacataaggg    240
gcatgatgac ttgacgtcgt ccccaccttc ctccgagttg accccggcag tctcctgcga    300
gtcccccgac tccgcgggtg gcaacacagg acaaggggttg cgctcgttgc gggacttaac    360
ccaacatctc acgacacgag ctgacgacag ccatgcacca cctgtacacc gaccacaagg    420
ggggccgtgt ctccacggct ttccggtgta tgtcaaaccc aggtaaggtt cttcgcgttg    480
catcgaatta atccacatgc tccgccgctt gtgcgggccc ccgtcaattc ctttgagttt    540
tagccttgcg gccgtactcc ccaggcgggg cgcttaatgc gttagctacg gcacggatcc    600
cgtggaagga aacccacacc tagcgcccac cgtttacggc gtgaactacc agggtatcta    660
atcctgttcg ctaccacgc attcgctcct cagcgtcagt tatttcccag agaccgcct    720 tcgccaccgg tgttcctcct gatatctgcg catttcaccg ctacatcagg aattccagtc    780 tccctgaag tactcaagtc tgcccgtatc gcctgcaagc caacagttga gctgctggga    840
tcctcagacg atgcgacaaa ccgcctacaa gctctttacc cccagtaatt ccggacgaag    900
cttggagcct acgtggtacc ccggctgctg gcacgtagtt ggccgg                  946

<210> SEQ ID NO 4
<211> LENGTH: 1008
<212> TYPE: DNA
<213> ORGANISM: Curtobacterium sp.

<400> SEQUENCE: 4
tggggtcgtc cgacgagggg gagcttgccc gggtgcgggg tggagaaagg ttgatgactt     60
cgtgagtaac ctgcccatgg ctctgggatg tatttagcac acgacgtcta atactggata    120
agatcagacg ccgcatggac tggtggtgga agcagatttc agttggggct ggactcgcgg    180
cctatcagct tgttggtgag gtaatggctc accaaggcgg cgccgggtag ccggcctggc    240
ggggtgcccg gccacactgg ggctgaatga cggcccagcc tcctacgggt cgcagcagtg    300
```

-continued

```
gggaatattg cacaatgggc gaaagcctgc tgcagcaacg ccgcgtgtag gacgagggcc        360
ttcgggttgt aaacctcttt tagtagggaa gaagccacga ggtgggtacc tgcagaaaaa        420
gcaccggcta actacgtgcg agcagccgcg gtaatacgta gggtgcaagc gttgtccgga        480
attattgggc gtaaagagct cgtacgcggt ttgtcgcgtc ctccgccgct tgccgaggct        540
ccccctcggg cttgcggtgg gtacgggcag actagagtgc ggcaggggag gctgtaaatg        600
ctggagctgc ggcgcaaagc gcagagaaca ggccgaacat ctatggccaa acgttaactc        660
tggggcgtaa ctgggctgt  agtcctgatc cgtggggacc cattcggtct acagcgtctg        720
gtactgcccg cagtaatcgt ttcgccctcg gtgtaccgcc cgttaccgg  gttctgcgcc        780 gcaactcccg gatttccgc  cccccctagg gaattctgcc gcgccggtaa accttgaagg        840 ccttagggg  ggcctcggca atccgcggca catgcgacta aactcctagc agcgctttac        900
accttaccat tcctggacat cccccggacc ataggtatga catgggctgc ccctacggag        960
cggggcaggg gcttttatt  gcaggtatcg gcactttccc tgcgatct                   1008
```

<210> SEQ ID NO 5
<211> LENGTH: 849
<212> TYPE: DNA
<213> ORGANISM: Paenibacillus sp.
<220> FEATURE:
<221> NAME/KEY: misc_feature
<222> LOCATION: (670)..(670)
<223> OTHER INFORMATION: n is a, c, g, or t

<400> SEQUENCE: 5

```
caattccgac ttcatgcagg cgagttgcag cctgcaatcc gaactgagac cggcttttaa         60
ggattggctc catcttgcga tattgcttcc cgttgtaccg gccattgtag tacgtgtgta        120
gcccaagtca taggggcat  gatgatttga cgtcatcccc accttcctcc ggtttgtcac        180
cggcagtctg cttagagtgc ccaccatgat gtgctggcaa ctaagcataa gggttgcgct        240
cgttgcggga cttaacccaa catctcacga cacgagctga cgacaaccat gcaccacctg        300
tctcctttgt cccgaaggaa aagactatct ctagtccggt caaagggatg tcaagacttg        360
gtaaggttct tcgcgttgct tcgaattaaa ccacatactc cactgcttgt gcgggtcccc        420
gtcaattcct ttgagtttca gtcttgcgac cgtactcccc aggcggaatg cttaatgtgt        480
taacttcggc accaagggta tcgaaacccc taacacctag cattcatcgt ttacggcgtg        540
gactaccagg gtatctaatc ctgtttgctc cccacgcttt cgcgcctcag cgtcagttac        600
agcccagaaa gtcgccttcg ccactggtgt tcctccacat ctctacgcat ttcaccgcta        660
cacgtggaan ttccactttc ctcttctgta ctcaagctct ccagtttcca gtgcgaccca        720
aggttgagcc ttgggctgtg acaccggact aaaaagccg  cctgcgcgcg ctttacgccc        780
aataattccg acaacgctt  gccccctacg tattaccgcg gctgctggca cgtagttagc        840
cggggcttt                                                               849
```

<210> SEQ ID NO 6
<211> LENGTH: 995
<212> TYPE: DNA
<213> ORGANISM: Pantoea sp.

<400> SEQUENCE: 6

```
ggtatgcact ccccgggtgg ctagccaccc tacttctttt gcaccccct  cccttgttgt         60 gacgggggt  gtgtacaagg cccgggaagg tattacccgg ggaattctgt tcaccgataa        120
ctggcgattc cgacttcagg gagccgagtt gcagattccg atccggacaa cgccgcattt        180
```

```
tatgaggtcc gttggctctc gcggggtcgc ttctctttgt tggcgccatg gaagcacgtg    240
tgtagcccta ctcgtaaggg ccatgttgcc ttgccgtcat ccccaccttc ctccggttta    300
tcaccggcag tctcttttga gttcccgacc gaatcgctgg caacaaaggt taagggttgc    360
gctcgttgcg ggatttaacc caacatttca caacacgagc tgccgacagc catgcagcac    420
ctgtctcaaa tttcccgaag gaaaaaagga atctctgcct cttcgtcggg ttgtcaagag    480
taggtaaggt tcttcgcgtt gcatcgaatt aaaccacatg ctccacccct tgtgcgggccc    540 cccgtcaatt catttgattt taaaccttgc ggccgaattc ccagggcggc cgcttaaccg    600
cgtaacctcc ggaacccctt ccccagggaa aaaccctcca atccaaattc tttaaggggg    660
ggaataacag gggaaccaat cctggtttct tcccacgcct tcggcaccgg acggcagtcc    720
tcggtcaagg gggcgccctt ccccccggga attcctccga actccaatcc ttttaccccc    780
tctcccggaa atctaacccc ctttaacaaa tttcaagccg gccgttttca atggaagttc    840
ccggttaaag ccgggggctt tacattcgaa tttaaaaaac ccccgggcgg cgttttagcc    900
ccagaatttc caattaagct tggaaccctc ttaataacct cgatggctgg accgatttaa    960
acagagcctt ttccgggggg atcggtcatc caatg                               995
```

<210> SEQ ID NO 7
<211> LENGTH: 1098
<212> TYPE: DNA
<213> ORGANISM: Pantoea sp.

<400> SEQUENCE: 7

```
ggggagtatg ctgcgggttg taccacatag cttcgggagg gaaaatactt tcagtggggg     60
tgctaacatt ctttcagtgg ccgagtcgat gacgttaccc acaggagtag attcgggtaa    120
ccccgtgcaa gcgcccgcgc taattcggag gcagcaggcc cgattaggag ttagtggcca    180
gaaagagtag gcaggagttg gcgtaaagcg catgcgacg cccggggcat tcagatggga     240
atgccctgga atctggcagg caagagcatt gtaaaggggg ggagaattcc atgtgaggcg    300
gggaaaggag tagaggtgta gcggaaaacc gggggagag gcggcccct gccggaagag     360 aggcggtcag ctgcgaaagc gagggagca aacaggatta ggtgccctga tcatccacgc    420
tttgatcgat gtcgactccg agcttgttcc gatgtcgact gggatctgga gctcacgcgt    480
taaggcgtcc gcagggagag tacgaccgca aggttaaaac tcaaacgaat ggaagggac    540 ccgcacaagc ggtggagcat gtggtttaat tcgatgcaac gcgaagaacc ttacctactc    600
ttgacaaaga accttaccta cagagatcat ccagtgcctt cggagagat gagacaggtg    660 ctgcatggct gtcgtcagct cgtgttgtga atgttgggt taacgcccgc aacgagcgca    720
acccttatcc tttgttgcca gcgattcggt cgggaactca aaggagactg ccggggataa    780
accggaggaa ggtggggatg acgacaagac acatggccct tacgagtagg gctacacacg    840
tgctacaatg gcgcctacaa agagaagcga ccgcgcgaga gcaagcggac ctcataaact    900
gcggcgtacg ccggatcgga atctgcaact cgaccgggtg aaatcggaat cgccggtaat    960
cggagatcag aatcccacgg taaatacgtt cccaggcctt gtacacatac gttcccggac   1020
catgggagca ggttgcaaaa gaagatggga gtgggttgta aaagaagtag gtagcttaac   1080
cttcgggagg gcgctacc                                                 1098
```

<210> SEQ ID NO 8
<211> LENGTH: 581
<212> TYPE: DNA

<213> ORGANISM: Aureobasidium pullulans

<400> SEQUENCE: 8

| | | | | | |
|---|---|---|---|---|---|
| ccgtagggtg | aacctgcgga | aggatcatta | aagagtaagg | gtgctcagcg | cccgacctcc | 60 |
| aacccttttgt | tgttaaaact | accttgttgc | tttggcggga | ccgctcggtc | tcgagccgct | 120 |
| ggggattcgt | cccaggcgag | cgcccgccag | agttaaacca | aactcttgtt | atcaaaccgg | 180 |
| tcgtctgagt | taaaattttg | aataaatcaa | aactttcaac | aacggatctc | ttggttctcg | 240 |
| catcgatgaa | gaacgcagcg | aaatgcgata | agtaatgtga | attgcagaat | tcagtgaatc | 300 |
| atcgaatctt | tgaacgcaca | ttgcgcccct | tggtattccg | aggggcatgc | ctgttcgagc | 360 |
| gtcattacac | cactcaagct | atgcttggta | ttgggtgccg | tccttagttg | ggcgcgcctt | 420 |
| aaagacctcg | gcgaggcctc | accggcttta | ggcgtagtag | aatttattcg | aacgtctgtc | 480 |
| aaaggagagg | acttctgccg | actgaaacct | ttattttttct | agttgacctc | ggatcaggta | 540 |
| gggatacccg | ctgaacttaa | gcatatcaat | aagcggagga | a | | 581 |

<210> SEQ ID NO 9
<211> LENGTH: 1219
<212> TYPE: DNA
<213> ORGANISM: Methylobacter sp.

<400> SEQUENCE: 9

| | | | | | |
|---|---|---|---|---|---|
| tcgagttgca | gagtgcaatc | tgaactgaga | cggttttttgg | ggatttgctc | cagatcgctc | 60 |
| cttgcgtccc | actgtcaccg | ccattgtagc | acgtgtgtag | cccatcccgt | aagggccatg | 120 |
| aggacttgac | gtcatccaca | ccttcctcgc | ggcttatcac | cggcagtctc | cctagagtgc | 180 |
| ccaactgaat | gatggcaact | aaggacgtgg | gttgcgctcg | ttgcgggact | taacccaaca | 240 |
| tctcacgaca | cgagctgacg | acagccatgc | agcacctgtg | ttcgcgtccc | cgaagggaac | 300 |
| cccggatctc | tccggatggc | acgacatgtc | aagggatggt | aaggttctgc | gcgttgcttc | 360 |
| gaattaaacc | acatgctcca | ccgcttgtgc | gggcccccgt | caattccttt | gagttttaat | 420 |
| cttgcgaccg | tactccccag | gcggaatgct | taaagcgtta | gctgcgctac | tgcggtgcaa | 480 |
| gcacccccaac | agctagcatt | catcgtttac | ggcgtggact | accagggtat | ctaatcctgt | 540 |
| ttgctcccca | cgctttcgcg | cctcagcgtc | agtaatggcc | cagtcagccg | ccttcgccac | 600 |
| tggtgttctt | gcgaatatct | acgaatttca | cctctacact | cgcagttcca | ctgacctctg | 660 |
| ccatactcaa | gccaaacagt | atcgaaggca | attctgtggt | tgagccacag | gctttcaccc | 720 |
| ccgacttgaa | tggccgccta | cgcgcccttt | acgcccagtg | attccgagca | acgctagccc | 780 |
| ccttcgtatt | accgcggctg | ctggcacgaa | gttagccggg | gcttattctt | ccggtaccgt | 840 |
| cattatcgtc | ccggacaaaa | gagctttaca | accctaaggc | cttcatcact | cacgcggcat | 900 |
| ggctggatca | ggcttgcgcc | cattgtccaa | tattccccac | tgctgcctcc | cgtaggagtc | 960 |
| tgggccgtgt | ctcagtccca | gtgtggctga | tcatcctctc | agaccagcta | ctgatcgtcg | 1020 |
| ccttggtagg | ccattacccc | accaactagc | taatcagacg | cgggccgatc | cttcggcagt | 1080 |
| aaaccttttcc | ccagggccag | aggccatggg | cgtatccggt | attagcgcta | gtttcccagc | 1140 |
| gttattccga | accgaagggt | acgttccac | gtgttactca | cccgtctgcc | gctgacaccg | 1200 |
| aagtgcccgc | tcgacttcc | | | | | 1219 |

<210> SEQ ID NO 10
<211> LENGTH: 853
<212> TYPE: DNA
<213> ORGANISM: Sphingomonas sp.

<400> SEQUENCE: 10

```
actagcgatt ccgccttcat gctctcgagt tgcagagaac aatccgaact gagacggctt      60
ttggagatta gcgcacactc gcgtgcttgc tgcccactgt caccgccatt gtagcacgtg     120
tgtagcccag cgcgtaaggg ccatgaggac ttgacgtcat ccccaccttc ctccggctta     180
tcaccggcgg ttcctttaga gtccccaact gaatgatggt aactaaaggc gagggttgcg     240
ctcgttgcgg gacttaaccc aacatctcac gacacgagct gacgacagcc atgcagcacc     300
tgtgttccag tccccgaagg gaagagatcc atctctggaa atcgtccgga catgtcaaac     360
gctggtaagg ttctgcgcgt tgcttcgaat taaaccacat gctccaccgc ttgtgcaggc     420
ccccgtcaat tcatttgagt tttaaccttg cggccgtact ccccaggcgg ataacttaat     480
gcgttagctg cgccacccaa agaccaagtc cccggacagc tagttatcat cgtttacggc     540
gtggactacc agggtatcta atcctgtttg ctccccacgc tttcgcacct cagcgtcaat     600
accagtccag tgagccgcct tcgccactgg tgttcttccg aatatctacg aatttcacct     660
ctacactcgg aattccactc acctctcctg gattcaagcc atgcagtatc aaaggcaatt     720
ctggggttga gccccaggct ttcacctcta acttacaaag ccgcctacgt gcgctttacg     780
cccagtaatt ccgaacaacg ctagctccct ccgtattacc gcggctgctg gcacggagtt     840
agccggagct tat                                                       853
```

<210> SEQ ID NO 11
<211> LENGTH: 736
<212> TYPE: DNA
<213> ORGANISM: Bacillus sp.

<400> SEQUENCE: 11

```
gctaataccg gataacattt tgaactgcat ggttcgaaat tgaaaggcgg cttcggctgt      60
cacttatgga tggacccgcg tcgcattagc tagttggtga ggtaacggct caccaaggca     120
acgatgcgta gccgacctga gagggtgatc ggccacactg ggactgagac acggcccaga     180
ctcctacggg aggcagcagt agggaatctt ccgcaatgga cgaaagtctg acggagcaac     240
gccgcgtgag tgatgaaggc tttcgggtcg taaaactctg ttgttaggga agaacaagtg     300
ctagttgaat aagctggcac cttgacggta cctaaccaga aagccacggc taactacgtg     360
ccagcagccg cggtaatacg taggtggcaa gcgttatccg gaattattgg gcgtaaagcg     420
cgcgcaggtg gtttcttaag tctgatgtga aagcccacgg ctcaaccgtg agggtcatt     480
ggaaactggg agacttgagt gcagaagagg aaagtgaat tccatgtgta gcggtgaaat     540
gcgtagagat atggaggaac accagtggcg aaggcgactt tctggtctgt aactgacact     600
gaggcgcgaa agcgtgggga gcaaacagga ttagatacc tggtagtcca cgccgtaaac     660
gatgagtgct aagtgttaga ggtttccgc cctttagtgc tgaagttaac gcattaagca     720
ctccgcctgg ggagta                                                    736
```

<210> SEQ ID NO 12
<211> LENGTH: 770
<212> TYPE: DNA
<213> ORGANISM: Bacillus sp.

<400> SEQUENCE: 12

```
gatggttcga aattgaaagg cggcttcggc tgtcttttat ggatggaccc gcgtcgcatt      60
agctagttgg tgaggtaacg gctcaccaag gcaacgatgc gtagccgacc tgagagggtg     120
```

| | |
|---|---|
| atcggccaca ctgggactga gacacggccc agactcctac gggaggcagc agtagggaat | 180 |
| cttccgcaat ggacgaaagt ctgtcaaggc ttgcgctcgt tgcgggtgtt aacccaacat | 240 |
| cccacgacac gagctgtcga caaccatgca ccacctgtca ctctgctccc gaccgtgaag | 300 |
| ccctatctct agggttttca gaggaagtca aggcctggta acgctctaat acgtaggtgg | 360 |
| caagcgttat catgctctac cgctcgtgcg gcgcccggtc gtttcctttg aattttgacc | 420 |
| tggcagccga cgtcccaacg ggggatggtc attggaaaat gtgaagcttg aatggaggaa | 480 |
| aggcctctgg aacttagtgt ttagcgttga agggggggaga tacctggatg actaaccctg | 540 |
| gtgaatccgc actctttgtc tgcacctggc cctgtagagc gaaaacgtgc ggctccaaca | 600 |
| gggttggatc ccctggtatc taccgcctta acgatgagc gtggaatgtt agttgcctct | 660 |
| cccccttttaa agttgacgtg ttcgcattga gcactccggc tggggactag ggcttcaagg | 720 |
| ttgaaattca aaagaattga gggggggcct cacgaccggt ggagcatgag | 770 |

```
<210> SEQ ID NO 13
<211> LENGTH: 863
<212> TYPE: DNA
<213> ORGANISM: Bacillus sp.

<400> SEQUENCE: 13
```

| | |
|---|---|
| attactagcg attccagctt catgtaggcg agttgcagcc tacaatccga actgagaacg | 60 |
| gttttatgag attagctcca cctcgcggtc ttgcagctct ttgtaccgtc cattgtagca | 120 |
| cgtgtgtagc ccaggtcata agggggcatga tgatttgacg tcatccccac cttcctccgg | 180 |
| tttgtcaccg gcagtcacct tagagtgccc aacttaatga tggcaactaa gatcaagggt | 240 |
| tgcgctcgtt gcgggactta acccaacatc tcacgacacg agctgacgac aaccatgcac | 300 |
| cacctgtcac tctgctcccg aaggagaagc cctatctcta gggttttcag aggatgtcaa | 360 |
| gacctggtaa ggttcttcgc gttgcttcga attaaaccac atgctccacc gcttgtgcgg | 420 |
| gcccccgtca attcctttga gtttcagcct tgcggccgta ctcccaggc ggagtgctta | 480 |
| atgcgttaac ttcagcacta aagggcggaa accctctaac acttagcact catcgtttac | 540 |
| ggcgtggact accagggtat ctaatcctgt ttgctcccca cgctttcgcg cctcagtgtc | 600 |
| agttacagac cagaaagtcg ccttcgccac tggtgttcct ccatatctct acgcatttca | 660 |
| ccgctacaca tggaattcca cttcctcttt ctgcactcaa gtctcccagt ttccaatgac | 720 |
| cctccacggg ttgagccgtg ggctttcaca tcagacttaa gaaaccacct gcgcgcgctt | 780 |
| tacgcccaat aattccggat aacgcttgcc acctacgtat taccgcggct gctggcacgt | 840 |
| agttagccgt ggctttctgg gtt | 863 |

```
<210> SEQ ID NO 14
<211> LENGTH: 744
<212> TYPE: DNA
<213> ORGANISM: Terribacillus sp.

<400> SEQUENCE: 14
```

| | |
|---|---|
| gattccggct tcatgcaggc gagttgcagc ctgcaatccg aactgagaat ggttttatgg | 60 |
| gatttgctta gcctcgcggc ttcgctgccc tttgtaccat ccattgtagc acgtgtgtag | 120 |
| cccaggtcat aagggggcatg atgatttgac gtcatcccca ccttcctccg gtttgtcacc | 180 |
| ggcagtcact ctagagtgcc caactgaatg ctggcaacta gaatcaaggg ttgcgctcgt | 240 |
| tgcgggactt aacccaacat ctcacgacac gagctgacga caaccatgca ccacctgtca | 300 |
| cgctgtcccc gaagggaacg ccttgtctcc aaggttgtca gcggatgtca agacctggta | 360 |

-continued

```
aggttcttcg cgttgcttcg aattaaacca catgctccac cgcttgtgcg ggccccgtc      420 aattcttttg agtttcagcc ttgcggccgt actcccagg cggagtgctt aatgcgttaa      480
cttcagcact aaggggcgga aaccccctaa cacctagcac tcatcgttta cggcgtggac    540
taccagggta tctaatcctg tttgctcccc cacgctttcg cgcctcagcg tcagttacag    600
accagagagt cgccttcgcc actggtgttc ctccacatat ctacgcattt caccgctaca    660
cgtggaattc cactctcctc ttctgcactc aagttcccca gtttccaatg accctccaca    720
gttaagctgt gggctttcac atca                                            744
```

<210> SEQ ID NO 15
<211> LENGTH: 560
<212> TYPE: DNA
<213> ORGANISM: Bacillus sp.

<400> SEQUENCE: 15

```
cggatagttc cttgaaccgc atggttcaag gatgaaagac ggtttcggct gtcacttaca     60
gatggacccg cggcgcatta gctagttggt ggggtaatgg ctcaccaagg cgacgatgcg    120
tagccgacct gagagggtga tcggccacac tgggactgag acacggccca gactcctacg    180
ggaggcagca gtagggaatc ttccgcaatg gacgaaagtc tgacggagca acgccgcgtg    240
agtgatgaag gttttcggat cgtaaagctc tgttgttagg gaagaacaag tgcgagagta    300
actgctcgca ccttgacggt acctaaccag aaagccacgg ctaactacgt gccagcagcc    360
gcggtaatac gtaggtggca agcgttgtcc ggaattattg ggcgtaaagg ctcgcaggc    420 ggtttcttaa gtctgatgtg aaagccccg gctcaaccgg ggacggtcat tggaaactgg    480
gaaacttgag tgcagaagag gagagtggaa gtacacgtgt agcggtgaaa tgcgtagaga    540
tgtggagaaa cagcggtgga                                                 560
```

<210> SEQ ID NO 16
<211> LENGTH: 788
<212> TYPE: DNA
<213> ORGANISM: Pseudomonas sp.

<400> SEQUENCE: 16

```
ctagcgattc cgacttcacg cagtcgagtt gcagactgcg atccggacta cgatcggttt     60
tatgggatta gctccacctc gcggcttggc aaccctctgt accgaccatt gtagcacgtg    120
tgtagcccag gccgtaaggg ccatgatgac ttgacgtcat ccccaccttc ctccggtttg    180
tcaccggcag tctccttaga gtgcccacca taacgtgctg gtaactaagg acaagggttg    240
cgctcgttac gggacttaac ccaacatctc acgacacgag ctgacgacag ccatgcagca    300
cctgtctcaa tgttcccgaa ggcaccaatc tatctctaga aagttcattg gatgtcaagg    360
cctggtaagg ttcttcgcgt tgcttcgaat aaaccacat gctccaccgc ttgtgcgggc    420
ccccgtcaat tcatttgagt tttaaccttg cggccgtact cccaggcgg tcaacttaat    480 gcgttagctg cgccactaaa agctcaaggc ttccaacggc tagttgacat cgtttacggc    540
gtggactacc agggtatcta atcctgtttg ctccccacgc tttcgcacct cagtgtcagt    600
attagtccag gtggtcgcct tcgccactgg tgttccttcc tatatctacg catttcaccg    660
ctacacagga aattccacca ccctctacca tactctagtc agtcagtttt gaatgcagtt    720
cccaggttga gcccggggat ttcacatcca acttaacaaa ccacctacgc gcgctttacg    780
cccagtaa                                                              788
```

<210> SEQ ID NO 17
<211> LENGTH: 797
<212> TYPE: DNA
<213> ORGANISM: Exiguobacterium sp.

<400> SEQUENCE: 17

| | | | | | |
|---|---|---|---|---|---|
| accgaatagt | tcttcagacc | gcatggtctg | atgatgaaag | gcgctccggc | gtcaccttgg | 60 |
| gatggccttg | cggtgcatta | gctagttggt | ggggtaatgg | cccaccaagg | cgacgatgca | 120 |
| tagccgacct | gagagggtga | tcggccacac | tgggactgag | acacgccca | gactcctacg | 180 |
| ggaggcagca | gtagggaatc | ttccacaatg | gacgaaagtc | tgatggagca | acgccgcgtg | 240 |
| agtgatgaag | gttttcggat | cgtaaaactc | tgttgtaagg | gaagaacaag | tacgagaggt | 300 |
| aatgctcgta | ccttgacggt | accttgcgag | aaagccacgg | ctaactacgt | gccagcagcc | 360 |
| gcggtaatac | gtaggtggca | agcgttgtcc | ggaattattg | ggcgtaaagc | gcgcgcaggc | 420 |
| ggccttttaa | gtctgatgtg | aaagcccccg | gctcaaccgg | ggagggtcat | tggaaactgg | 480 |
| aaggcttgag | tacagaagag | aagagtggaa | ttccatgtgt | agcggtgaaa | tgcgtagaga | 540 |
| tgtggaggaa | caccagtggc | gaaggcgact | ctttggtctg | taactgacgc | tgaggcgcga | 600 |
| aagcgtgggg | agcaaacagg | attagatacc | ctggtagtcc | acgccgtaaa | cgatgagtgc | 660 |
| tagtgttggg | gggtttccgc | ccctcagtgc | tgaagctaac | gcattaagca | ctccgcctgg | 720 |
| ggagtacggc | cgcaaggctg | aaactcaagg | aattgacggg | acccgcaca | agcggtggag | 780 |
| catgtggttt | aattcga | | | | | 797 |

<210> SEQ ID NO 18
<211> LENGTH: 1358
<212> TYPE: DNA
<213> ORGANISM: Pseudomonas sp.

<400> SEQUENCE: 18

| | | | | | |
|---|---|---|---|---|---|
| tagctacttc | tggtgcaacc | cactcccatg | gtgtgacggg | cggtgtgtac | aaggcccggg | 60 |
| aacgtattca | ccgcgacatt | ctgattcgcg | attactagcg | attccgactt | cacgcagtcg | 120 |
| agttgcagac | tgcgatccgg | actacgatcg | gttttgtgag | attagctcca | cctcgcggct | 180 |
| tggcgaccct | ctgtaccgac | cattgtagca | cgtgtgtagc | ccaggccgta | agggccatga | 240 |
| tgacttgacg | tcatcccac | cttcctccgg | tttgtcaccg | gcagtctcct | tagagtgccc | 300 |
| accataacgt | gctggtaact | aaggacaagg | gttgcgctcg | ttacgggact | taacccaaca | 360 |
| tctcacgaca | cgagctgacg | acagccatgc | agcacctgtg | tcagagttcc | cgaaggcacc | 420 |
| aatccatctc | tggaaagttc | tctgcatgtc | aaggcctggt | aaggttcttc | gcgttgcttc | 480 |
| gaattaaacc | acatgctcca | ccgcttgtgc | gggcccccgt | caattcattt | gagttttaac | 540 |
| cttgcggccg | tactccccag | gcggtcaact | taatgcgtta | gctgcgccac | taaaatctca | 600 |
| aggattccaa | cggctagttg | acatcgttta | cggcgtggac | taccagggta | tctaatcctg | 660 |
| tttgctcccc | acgctttcgc | acctcagtgt | cagtatcagt | ccaggtggtc | gccttcgcca | 720 |
| ctggtgttcc | ttcctatatc | tacgcatttc | accgctacac | aggaaattcc | accaccctct | 780 |
| actgtactct | agcttgccag | ttttggatgc | agttcccagg | ttgagcccgg | gctttcaca | 840 |
| tccaacttaa | caaaccacct | acgcgcgctt | tacgcccagt | aattccgatt | aacgcttgca | 900 |
| ccctctgtat | accgcggct | gctggcacag | agttagccgg | tgcttattct | gtcggtaacg | 960 |
| tcaaaacagc | aaggtattcg | cttactgccc | ttcctcccaa | cttaaagtgc | tttacaatcc | 1020 |
| gaagaccttc | ttcacacacg | cggcatggct | ggatcaggct | ttcgcccatt | gtccaatatt | 1080 |

| | |
|---|---:|
| ccccactgct gcctcccgta ggagtctgga ccgtgtctca gttccagtgt gactgatcat | 1140 |
| cctctcagac cagttacgga tcgtcgcctt ggtgagccat taccccacca actagctaat | 1200 |
| ccgacctagg ctcatctgat agcgcaaggc ccgaaggtcc cctgctttct cccgtaggac | 1260 |
| gtatgcggta ttagcgttcc tttcgaaacg ttgtccccca ctaccaggca gattcctagg | 1320 |
| cattactcac ccgtccgccg ctgaatcgaa gagcaagc | 1358 |

<210> SEQ ID NO 19
<211> LENGTH: 921
<212> TYPE: DNA
<213> ORGANISM: Pantoea sp.

<400> SEQUENCE: 19

| | |
|---|---:|
| tgcaagtcgg acggtagcac agagagcttg ctctcgggtg acgagtggcg gacgggtgag | 60 |
| taatgtctgg ggatctgccc gatagagggg gataaccact ggaaacggtg ctaataccg | 120 |
| cataacgtcg caagaccaaa gagggggacc ttcgggcctc tcactatcgg atgaacccag | 180 |
| atgggattag ctagtaggcg gggtaatggc ccacctaggc gacgatccct agctggtctg | 240 |
| agaggatgac cagccacact ggaactgaga cacggtccag actcctacgg gaggcagcag | 300 |
| tggggaatat tgcacaatgg gcgcaagcct gatgcagcca tgccgcgtgt atgaagaagg | 360 |
| ccttcgggtt gtaaagtact ttcagcgggg aggaaggcga tggggttaat aaccctgtcg | 420 |
| attgacgtta cccgcagaag aagcaccggc taactccgtg ccagcagccg cggtaatacg | 480 |
| gagggtgcaa gcgttaatcg gaattactgg gcgtaaagcg cacgcaggcg gtctgttaag | 540 |
| tcagatgtga aatccccggg cttaacctgg gaactgcatt tgaaactggc aggcttgagt | 600 |
| cttgtagagg ggggtagaat tccaggtgta gcggtgaaat gcgtagagat ctggaggaat | 660 |
| accggtggcg aaggcggccc cctggacaaa gactgacgct caggtgcgaa agcgtgggga | 720 |
| gcaaacagga ttagataccc tggtagtcca cgccgtaaac gatgtcgact tggaggttgt | 780 |
| tcccttgagg agtggcttcc ggagctaacg cgttaagtcg accgcctggg gagtacggcc | 840 |
| gcaaggttaa aactcaaatg aattgacggg ggcccgcaca gcggtggag catgtggttt | 900 |
| aattcgatgc aacgcgaaga a | 921 |

<210> SEQ ID NO 20
<211> LENGTH: 1009
<212> TYPE: DNA
<213> ORGANISM: Pantoea sp.

<400> SEQUENCE: 20

| | |
|---|---:|
| ggtagcgccc tcccgaaggt tacgttccct acttttttct acccctctc ctttggtccc | 60 |
| actcccgtgg tgtacaaggc ccggggaagt aggcaccgtg gcatactgat cgacgatttc | 120 |
| tggcgattcc gacttcacgg tttcgagttg caggctccga tccggagaac gccgcacttt | 180 |
| atgagatccg cttgctctcg cgaggtcgct tctctttgta tgcgccattg tagcacgtgt | 240 |
| gtagccctac tcgtaagggc catgttgtct ggcgtcatc cccaccttcc tccggtttat | 300 |
| caccggcagt ctcctttgag ttcccgaccg aatcgctggc aacaagggc aagggttgcg | 360 |
| ctcgttgcgg ggcttaaccc aacatttcac aacacgagct gacgaacacg agctgacgac | 420 |
| agccatgcag cacctgtctg cacgcacccg aaggtgctaa agcatctcta tgtcaagagt | 480 |
| aggatgtcaa gagtaggtaa gattcttcgc gttgcatcga attaaaccac atgctccacc | 540 |
| gcttgtgcgg gcccccgtca attcatttga gttttaacct tgcggccgta ctccccaggc | 600 |

| | |
|---|---|
| ggtcgactta acgcgttagc tccggaagcc actcctcaag ggaacaacct ctaagtcgac | 660 |
| atcgtttacg gcgtggacta ccagggtatc taatcctgtt tgctccccac gctttcgcac | 720 |
| ctgagcgtca gtcttcgtcc aggggggccgc cttcgccacc ggtattcctc cagatctcta | 780 |
| cgcatttcac cgctacacca gaaattctac cccctctac gagattcaag cctgccggtt | 840 |
| ttaaatgcag ttcccagggt cagcccgggg atttcacatc tgattcaaca gaacgcctgc | 900 |
| gtgcgcttta cgcccaggaa ttccgattaa cgcttgcacc ctccgtatta ccggggctgc | 960 |
| tggtacggag atagccggag cttctcctgc ggggaatggc gatcgaata | 1009 |

<210> SEQ ID NO 21
<211> LENGTH: 854
<212> TYPE: DNA
<213> ORGANISM: Pantoea sp.

<400> SEQUENCE: 21

| | |
|---|---|
| agcgccctcc cgaaggttaa gctacctact tcttttgcaa cccactccca tggtgtgacg | 60 |
| gcggtgtgt acaaggcccg ggaacgtatt caccgtggca ttctgatcca cgattactag | 120 |
| cgattccgac ttcacggagt cgagttgcag actccgatcc ggactacgac gcactttatg | 180 |
| aggtccgctt gctctcgcga ggtcgcttct ctttgtatgc gccattgtag cacgtgtgta | 240 |
| gccctactcg taagggccat gatgacttga cgtcatcccc accttcctcc ggtttatcac | 300 |
| cggcagtctc ctttgagttc ccgaccgaat cgctggcaac aaaggataag ggttgcgctc | 360 |
| gttgcgggac ttaacccaac atttcacaac acgagctgac gacagccatg cagcacctgt | 420 |
| ctcagagttc ccgaaggcac caaagcatct ctgctaagtt ctctggatgt caagagtagg | 480 |
| taaggttctt cgcgttgcat cgaattaaac cacatgctcc accgcttgtg cgggccccg | 540 |
| tcaattcatt tgagttttaa ccttgcggcc gtactcccca ggcggtcgac ttaacgcgtt | 600 |
| agctccggaa gccactcctc aagggaacaa cctccaagtc gacatcgttt acggcgtgga | 660 |
| ctaccagggt atctaatcct gtttgctccc cacgctttcg cacctgagcg tcagtcttcg | 720 |
| tccaggggggc cgccttcgcc accggtattc ctccagatct ctacgcattt caccgctaca | 780 |
| cctggaattc tacccccctc tacgagactc aagcctgcca gtttcaaatg cagttcccag | 840 |
| gttaagcccg ggga | 854 |

<210> SEQ ID NO 22
<211> LENGTH: 897
<212> TYPE: DNA
<213> ORGANISM: Pantoea sp.
<220> FEATURE:
<221> NAME/KEY: misc_feature
<222> LOCATION: (28)..(28)
<223> OTHER INFORMATION: n is a, c, g, or t
<400> SEQUENCE: 22

| | |
|---|---|
| tacttctttt gcaacccact cccatggntg tgacgggcgg tgtgtacaag gcccgggaac | 60 |
| gtattcaccg tggcattctg atccacgatt actagcgatt ccgacttcac ggagtcgagt | 120 |
| tgcagactcc gatccggact acgacgcact ttatgaggtc cgcttgctct cgcgaggtcg | 180 |
| cttctctttg tatgcgccat tgtagcacgt gtgtagccct actcgtaagg gccatgatga | 240 |
| cttgacgtca tccccacctt cctccggttt atcaccggca gtctcctttg agttcccgac | 300 |
| cgaatcgctg caacaaagg ataagggttg cgctcgttgc gggacttaac ccaacatttc | 360 |
| acaacacgag ctgacgacag ccatgcagca cctgtctcag agttcccgaa ggcaccaaag | 420 |
| catctctgct aagttctctg gatgtcaaga gtaggtaagg ttcttcgcgt tgcatcgaat | 480 |

```
taaaccacat gctccaccgc ttgtgcgggc ccccgtcaat tcatttgagt tttaaccttg      540
cggccgtact ccccaggcgg tcgacttaac gcgttagctc cggaagccac tcctcaaggg      600
aacaacctcc aagtcgacat cgtttacggc gtggactacc agggtatcta atcctgtttg      660
ctccccacgc tttcgcacct gagcgtcagt cttcgtccag ggggccgcct tcgccaccgg      720
tattcctcca gatctctacg catttcaccg ctacacctgg aattctaccc ccctctacga      780
gactcaagcc tgccagtttc aaatgcagtt cccaggttaa gcccggggat ttcacatctg      840
acttaacaga ccgcctgcgt gcgctttacg cccagtaatt ccgattaac gcttgca          897
```

<210> SEQ ID NO 23
<211> LENGTH: 931
<212> TYPE: DNA
<213> ORGANISM: Staphylococcus sp.

<400> SEQUENCE: 23

```
tgcaagtcga gcgaacagat aaggagcttg ctcctttgac gttagcggcg gacgggtgag       60
taacacgtgg gtaacctacc tataagactg ggataacttc gggaaaccgg agctaatacc      120
ggataacatt tggaaccgca tggttctaaa gtgaaagatg gttttgctat cacttataga      180
tggacccgcg ccgtattagc tagttggtaa ggtaacggct taccaaggcg acgatacgta      240
gccgacctga gagggtgatc ggccacactg gaactgagac acggtccaga ctcctacggg      300
aggcagcagt agggaatctt ccgcaatggg cgaaagcctg acggagcaac gccgcgtgag      360
tgatgaaggt tttcggctcg taaaactctg ttattaggga agaacaaatg tgtaagtaac      420
tgtgcacatc ttgacggtac ctaatcagaa agccacggct aactacgtgc cagcagccgc      480
ggtaatacgt aggtggcaag cgttatccgg aattattggg cgtaaagcgc gcgtaggcgg      540
tttcttaagt ctgatgtgaa agcccacggc tcaaccgtgg agggtcattg gaaactggga      600
aacttgagtg cagaagagga aagtggaatt ccatgtgtag cggtgaaatg cgcagagata      660
tggaggaaca ccagtggcga aggcgacttt ctggtctgta actgacgctg atgtgcgaaa      720
gcgtggggat caaacaggat tagataccct ggtagtccac gccgtaaacg atgagtgcta      780
agtgttaggg ggtttccgcc ccttagtgct gcagctaacg cattaagcac tccgcctggg      840
gagtacgacc gcaaggttga aactcaaagg aattgacggg gacccgcaca agcggtggag      900
catgtggttt aattcgaagc aacgcgaaga a                                     931
```

<210> SEQ ID NO 24
<211> LENGTH: 993
<212> TYPE: DNA
<213> ORGANISM: Pantoea sp.

<400> SEQUENCE: 24

```
ggtaagcgcc ctcccgaagg ttaagctacc tacttctttt gcaacccact cccatggtgt       60
gacgggcggt gtgtacaagg cccgggaacg tattcaccgt ggcattctga tccacgatta      120
ctagcgattc cgacttcacg gagtcgagtt gcagactccg atccggacta cgacgcactt      180
tatgaggtcc gcttgctctc gcgaggtcgc ttctctttgt atgcgccatt gtagcacgtg      240
tgtagcccta ctcgtaaggg ccatgatgac ttgacgtcat ccccaccttc ctccggttta      300
tcaccggcag tctcctttga gttcccgacc gaatcgctgg caacaaagga taagggttgc      360
gctcgttgcg ggacttaacc caacatttca caacacgagc tgacgacagc catgcagcac      420
ctgtctcaga gttcccgaag gcaccaaagc atctctgcta agttctctgg atgtcaagag      480
```

| | |
|---|---|
| taggtaaggt tcttcgcgtt gcatcgaatt aaaccacatg ctccaccgct tgtgcgggcc | 540 |
| cccgtcaatt catttgagtt ttaaccttgc ggccgtactc cccaggcggt cgacttaacg | 600 |
| cgttagctcc ggaagccact cctcaaggga acaacctcca agtcgacatc gtttacggcg | 660 |
| tggactacca gggtatctaa tcctgtttgc tccccacgct ttcgcacctg agcgtcagtc | 720 |
| ttcgtccagg gggccgcctt cgccaccggt attcctccag atctctacgc atttcaccgc | 780 |
| tacacctgga attctacccc cctctacgag actcaagcct gccagtttca aatgcagttc | 840 |
| ccaggttaag cccggggatt tcacatctga cttaacagac cgcctgcgtg cgctttacgc | 900 |
| ccagtaattc cgattaacgc ttgcaccctc cgtattaccg cggctgctgg cacggagtta | 960 |
| gccggtgctt cttctgcggg taacgtcaat cga | 993 |

<210> SEQ ID NO 25
<211> LENGTH: 880
<212> TYPE: DNA
<213> ORGANISM: Paenibacillus sp.

<400> SEQUENCE: 25

| | |
|---|---|
| agaagcttgc ttctttgata gcgttagcgg cggacgggtg agtaacacgt aggcaacctg | 60 |
| ccctcaagtt tgggacaact accggaaacg gtagctaata ccgaatagtt gttttcttcg | 120 |
| cctgaaggaa actggaaaga cggagcaatc tgtcacttgg ggatgggcct gcggcgcatt | 180 |
| agctagttgg tggggtaacg gctcaccaag gcgacgatgc gtagccgacc tgagagggtg | 240 |
| atcggccaca ctgggactga gacacggccc agactcctac gggaggcagc agtagggaat | 300 |
| cttccgcaat gggcgaaagc ctgacggagc aatgccgcgt gagtgatgaa ggttttcgga | 360 |
| tcgtaaagct ctgttgccag ggaagaacgc ttgggagagt aactgctctc aaggtgacgg | 420 |
| tacctgagaa gaaagccccg gctaactacg tgccagcagc cgcggtaata cgtaggggc | 480 |
| aagcgttgtc cggaattatt gggcgtaaag cgcgcgcagg cggtcattta gtctggtgt | 540 |
| ttaatcccgg ggctcaaccc cggatcgcac tggaaactgg gtgacttgag tgcagaagag | 600 |
| gagagtggaa ttccacgtgt agcggtgaaa tgcgtagata tgtggaggaa caccagtggc | 660 |
| gaaggcgact ctctgggctg taactgacgc tgaggcgcga aagcgtgggg agcaaacagg | 720 |
| attagatacc ctggtagtcc acgccgtaaa cgatgagtgc taggtgttag gggtttcgat | 780 |
| acccttggtg ccgaagttaa cacattaagc actccgcctg gggagtacgg tcgcaagact | 840 |
| gaaactcaaa ggaattgacg gggacccgca caagcagtgg | 880 |

<210> SEQ ID NO 26
<211> LENGTH: 839
<212> TYPE: DNA
<213> ORGANISM: Pantoea sp.

<400> SEQUENCE: 26

| | |
|---|---|
| aagcgccctc ccgaaggtta agctacctac ttcttttgca acccactccc atggtgtgac | 60 |
| gggcggtgtg tacaaggccc gggaacgtat tcaccgtggc attctgatcc acgattacta | 120 |
| gcgattccga cttcacggag tcgagttgca gactccgatc cggactacga cgcactttat | 180 |
| gaggtccgct tgctctcgcg aggtcgcttc tctttgtatg cgccattgta gcacgtgtgt | 240 |
| agccctactc gtaagggcca tgatgacttg acgtcatccc caccttcctc cggtttatca | 300 |
| ccggcagtct cctttgagtt cccgaccgaa tcgctggcaa caaaggataa gggttgcgct | 360 |
| cgttgcggga cttaacccaa catttcacaa cacgagctga cgacagccat gcagcacctg | 420 |
| tctcagagtt cccgaaggca ccaaagcatc tctgctaagt tctctggatg tcaagagtag | 480 |

| | |
|---|---|
| gtaaggttct tcgcgttgca tcgaattaaa ccacatgctc caccgcttgt gcgggccccc | 540 |
| gtcaattcat ttgagtttta accttgcggc cgtactcccc aggcggtcga cttaacgcgt | 600 |
| tagctccgga agccactcct caagggaaca acctccaagt cgacatcgtt tacggcgtgg | 660 |
| actaccaggg tatctaatcc tgtttgctcc ccacgctttc gcacctgagc gtcagtcttc | 720 |
| gtccaggggg ccgccttcgc caccggtatt cctccagatc tctacgcatt tcaccgctac | 780 |
| acctggaatt ctaccccct ctacgagact caagcctgcc agtttcaaat gcagttccc | 839 |

<210> SEQ ID NO 27
<211> LENGTH: 993
<212> TYPE: DNA
<213> ORGANISM: Pantoea sp.

<400> SEQUENCE: 27

| | |
|---|---|
| gggtagcgcc ctcccgaagg ttaagctacc tacttctttt gcaacccact cccatggtgt | 60 |
| gacgggcggt gtgtacaagg cccgggaacg tattcaccgt ggcattctga tccacgatta | 120 |
| ctagcgattc cgacttcacg gagtcgagtt gcagactccg atccggacta cgacgcactt | 180 |
| tatgaggtcc gcttgctctc gcgaggtcgc ttctctttgt atgcgccatt gtagcacgtg | 240 |
| tgtagcccta ctcgtaaggg ccatgatgac ttgacgtcat ccccaccttc ctccggttta | 300 |
| tcaccggcag tctcctttga gttcccgacc gaatcgctgg caacaaagga taagggttgc | 360 |
| gctcgttgcg ggacttaacc caacatttca caacacgagc tgacgacagc catgcagcac | 420 |
| ctgtctcaga gttcccgaag gcaccaaagc atctctgcta agttctctgg atgtcaagag | 480 |
| taggtaaggt tcttcgcgtt gcatcgaatt aaaccacatg ctccaccgct tgtgcgggcc | 540 |
| cccgtcaatt catttgagtt ttaaccttgc ggccgtactc cccaggcggt cgacttaacg | 600 |
| cgttagctcc ggaagccact cctcaaggga acaacctcca gtcgacatc gtttacggcg | 660 |
| tggactacca gggtatctaa tcctgtttgc tccccacgct ttcgcacctg agcgtcagtc | 720 |
| ttcgtccagg gggccgcctt cgccaccggt attcctccag atctctacgc atttcaccgc | 780 |
| tacacctgga attctacccc cctctacgag actcaagcct gccagtttca aatgcagttc | 840 |
| ccaggttaag cccggggatt tcacatctga cttaacagac cgcctgcgtg cgctttacgc | 900 |
| ccagtaattc cgattaacgc ttgcaccctc cgtattaccg cggctgctgg cacggagtta | 960 |
| gccggtgctt cttctgcggg taacgtcaat cga | 993 |

<210> SEQ ID NO 28
<211> LENGTH: 928
<212> TYPE: DNA
<213> ORGANISM: Xanthomonas sp.

<400> SEQUENCE: 28

| | |
|---|---|
| catgcagtcg aacggcagca caggagagcc ttgctctctg ggtggcgagt ggcggacggg | 60 |
| tgaggaatac atcggaatct accttttcgt ggggataac gtaggaaac ttacgctaat | 120 |
| accgcatacg accttagggt gaaagcggag gaccttcggg cttcgcgcgg atagatgagc | 180 |
| cgatgtcgga ttagctagtt ggcgggtaa aggcccacca aggcgacgat ccgtagctgg | 240 |
| tctgagagga tgatcagcca cactggaact gagacacggt ccagactcct acggaggca | 300 |
| gcagtgggga atattggaca atgggcgcaa gcctgatcca gccatgccgc gtgggtgaag | 360 |
| aaggccttcg ggttgtaaag ccctttttgtt gggaaagaaa agcagtcggt taatacccga | 420 |
| ttgttctgac ggtacccaaa gaataagcac cggctaactt cgtgccagca gccgcggtaa | 480 |

-continued

| | |
|---|---|
| tacgaagggt gcaagcgtta ctcggaatta ctgggcgtaa agcgtgcgta ggtggttgtt | 540 |
| taagtccgtt gtgaaagccc tgggctcaac ctgggaattg cagtggatac tgggcaacta | 600 |
| gagtgtggta gaggatggcg gaattcccgg tgtagcagtg aaatgcgtag agatcgggag | 660 |
| gaacatctgt ggcgaaggcg gccatctgga ccaacactga cactgaggca cgaaagcgtg | 720 |
| gggagcaaac aggattagat accctggtag tccacgccct aaacgatgcg aactggatgt | 780 |
| tgggtgcaac ttggcacgca gtatcgaagc taacgcgtta agttcgccgc ctggggagta | 840 |
| cggtcgcaag actgaaactc aaaggaattg acggggcccc gcacaagcgg tggagtatgt | 900 |
| ggtttaattc gatgcaacgc gaagaacc | 928 |

<210> SEQ ID NO 29
<211> LENGTH: 935
<212> TYPE: DNA
<213> ORGANISM: Staphylococcus sp.

<400> SEQUENCE: 29

| | |
|---|---|
| tgcaagtcga gcgaacagga taaggagctt gctcctttga agttagcggc ggacgggtga | 60 |
| gtaacacgtg gtaacctacc tataagact ggaataactt cgggaaaccg agctaatgc | 120 |
| cggataacat atagaaccgc atggttctat agtgaaagat ggttttgcta tcacttatag | 180 |
| atggacccgc gccgtattag ctagttggta aggtaaaggc ttaccaaggc gacgatacgt | 240 |
| agccgacctg agagggtgat cggccacact ggaactgaga cacggtccag actcctacgg | 300 |
| gaggcagcag tagggaatct tccgcaatgg gcgaaagcct gacggagcaa cgccgcgtga | 360 |
| gtgatgaagg ttttcggatc gtaaaactct gttattaggg aagaacaaat gcgtaagtaa | 420 |
| ctgtgcgcat cttgacggta cctaatcaga aagccacggc taactacgtg ccagcagccg | 480 |
| cggtaatacg taggtggcaa gcgttatccg gaattattgg gcgtaaagcg cgcgtaggcg | 540 |
| gtttcttaag tctgatgtga aagcccacgg ctcaaccgtg gagggtcatt ggaaactggg | 600 |
| aaacttgagt gcagaagagg aaagtggaat tccatgtgta gcggtgaaat gcgcagagat | 660 |
| atggaggaac accagtggcg aaggcgactt tctggtctgt aactgacgct gatgtgcgaa | 720 |
| agcgtgggga tcaaacagga ttagataccc tggtagtcca cgccgtaaac gatgagtgct | 780 |
| aagtgttagg gggtttccgc cccttagtgc tgcagctaac gcattaagca ctccgcctgg | 840 |
| ggagtacgac cgcaaggttg aaactcaaag gaattgacgg ggacccgcac aagcggtgga | 900 |
| gcatgtgggt ttaattcgaa gcaacgcgaa gaacc | 935 |

<210> SEQ ID NO 30
<211> LENGTH: 949
<212> TYPE: DNA
<213> ORGANISM: Methylobacterium sp.

<400> SEQUENCE: 30

| | |
|---|---|
| cggggtcagc ggcggacggg tgagtaacgc gtgggaacgt gccttctggt tcggaataac | 60 |
| cctgggaaac tagggctaat accggatacg cccttatggg gaaaggttta ctgccggaag | 120 |
| atcggcccgc gtctgattag ctagttggtg gggtaacggc ctaccaaggc gacgatcagt | 180 |
| agctggtctg agaggatgat cagccacact gggactgaga cacggcccag actcctacgg | 240 |
| gaggcagcag tggggaatat tggacaatgg gcgcaagcct gatccagcca tgccgcgtga | 300 |
| gtgatgaagg ccttagggtt gtaaagctct tttatccggg acgataatga cggtaccgga | 360 |
| ggaataagcc ccggctaact tcgtgccagc agccgcggta atacgaaggg gctagcgtt | 420 |
| gctcggaatc actgggcgta aagggcgcgt aggcggcgtt ttaagtcggg ggtgaaagcc | 480 |

```
tgtggctcaa ccacagaatg gccttcgata ctgggacgct tgagtatggt agaggttggt    540
ggaactgcga gtgtagaggt gaaattcgta gatattcgca agaacaccgg tggcgaaggc    600
ggccaactgg accattactg acgctgaggc gcgaaagcgt ggggagcaaa caggattaga    660
taccctggta gtccacgccg taaacgatga atgccagctg ttggggtgct tgcaccgcag    720
tagcgcagct aacgctttga gcattccgcc tggggagtac ggtcgcaaga ttaaaactca    780
aaggaattga cggggcccg cacaagcggt ggagcatgtg gtttaattcg aagcaacgcg    840
cagaacctta ccatcctttg acatggcgtg ttacccagag agatttgggg tccacttcgg    900
tggcgcgcac acaggtgctg catggctgtc gtcagctcgt gtcgtgaga               949
```

<210> SEQ ID NO 31
<211> LENGTH: 988
<212> TYPE: DNA
<213> ORGANISM: Pantoea sp.

<400> SEQUENCE: 31

```
gccttccggc gggtgaaact acctacttct tttgcaaccc actcccatgg ggtggagggc     60
ggtgtgtaca aggcccggga acgtattcac cgtggcattc tgatccacga ttactagcga    120
ttccgacttc acggagtcga gttgcagact ccgatccgga ctacgacgca ctttatgagg    180
tccgcttgct ctcgcgaggt cgcttctctt tgtatgcgcc attgtagcac gtgtgtagcc    240
ctactcgtaa gggccatgat gacttgacgt catccccacc ttcctccggt ttatcaccgg    300
cagtctcctt tgagttcccg accgaatcgc tggcaacaaa ggataagggt tgcgctcgtt    360
gcgggactta acccaacatt tcacaacacg agctgacgac agccatgcag cacctgtctc    420
atcgatcccg aaggcccgca aaatctctc ggatatctc cggatgtcaa gagtaggtaa     480
ggttcttcgc gttgcatcga attaaaccac atgctccacc gcttgtgcgg gccccgtca    540 attcatttga gttttaacct tgcggtcgta ctccccaggc ggtcgactta acgcgttagc    600
tccggaagcc actcctcaag ggaacaacct cgtagtcgac atcgtttacg gcgtggacta    660
ccagggtatc taatcctgtt tgctccccac gctttcgcac ctgaccgtca gtcttcgtcc    720 aggggccgc cttcgccacc ggtattcctc cccacctcta cgcatttgtc cgctacacct    780
gtaattctac cccgctctac tacactcaag cccgcgtgtt ccaatgcag ttcccaggtt    840 aagcccgggg atttcctctc tgaatttaca gaccgcctgc gtgcgcttta cgcccagtag    900
tttccaatta acgcttgccc cctacgtatt accgccgacg cttggcacgc agttagccgt    960
cgcttcttct gcggttaacg tcattcga                                       988
```

<210> SEQ ID NO 32
<211> LENGTH: 1085
<212> TYPE: DNA
<213> ORGANISM: Pantoea sp.

<400> SEQUENCE: 32

```
gtaggcgccg tcctcgcggg ggataaccct acttcttttt tttcccactc ccttggtgtg     60
aggggcggtg tgtacatggc ccgggcaggt atttaccgag gcattctgtt cgacgattac    120
tagcgattcc gacttcacgg acgcgagttg catgctccga ccgatactac gacgcacttt    180
atgaggtccg tttgctctcg cgaggtcgct tctctttgta tgcgccattg tagcacgtgt    240
gtagccctac tcgtaagggc catgctggct tgacgtcatc cataccttcc tccggtttat    300
caccggcagt ctcctttgag ttcccgaccg aatcgctggc aacaaaggaa aagggttgcg    360
```

```
ctcgttgcgg gcgttaaccc aacatttcac aacacgagct ggcgacagcc atgcagcacc      420
tgtctgtcta ttcccgaagg aaggacaaaa tctctctctg ctttccggga tgtcaagagt      480
aggtaagtat cttcgcgttg catcgaatta aaccacatgc tccaccgccc gtgcgggccc      540
ccgtcaatca attcaagttt gaaccttgcg gcgtactcc ccacgcggtc gatttaacgc       600
gctagctccg gaagcaactc ctccagggaa ggacctccca ctcgatctcc ttcgttgcgt      660
gcgtggccta ggtagctaac cctgcttgtt tcctccgctt gcttacctga ccgaccgtct      720
tcctccgtgg gggcggcctc cctcccggcc ggcctcccta cctctctcca cttcttttgcc    780 cgctccgcct gtctatcccc ctccctcaaa cacaatccag ccagtttctt tcgaatgtcc     840
cttcttagtt cagggcggtg actatccgtc tgtattaagc gaccgcgcgc gcgttactcc    900
cagcaagtat tacctattcg cgcttccacc ctccttccta ccttggttgc tgggactgag     960
ttagagagtg cttcgtcggc tgcgtcagtc aatcgaggaa gttgcttctt cacatcctct   1020
ccccccctaa tgaagttaat taccagccga agcccacatc cgaatcgcgc aattggtcgt   1080
cccat                                                                1085

<210> SEQ ID NO 33
<211> LENGTH: 342
<212> TYPE: DNA
<213> ORGANISM: Pantoea sp.

<400> SEQUENCE: 33
atccagacac ggaggcagag atgctttggt gccttcggga actctgagac aggtgctgca       60
tggctgtcgt cagctcgtgt tgtgaaatgt tgggttaagt cccgcaacga gcgcaaccct     120
tatcctttgt tgccagcgat tcggtcggga actcaaagga gactgccggt gataaaccgg     180
aggaaggtgg ggatgacgtc aagtcatcat ggcccttacg agtagggcta cacacgtgct     240
acaatggcgc atacaaagag aagcgacctc gcgagagcaa gcggacctca taaagtgcgt     300
cgtagtccgg atcggagtct gcaactcgac tccgtgaagt cg                        342

<210> SEQ ID NO 34
<211> LENGTH: 429
<212> TYPE: DNA
<213> ORGANISM: Pantoea sp.

<400> SEQUENCE: 34
actgagacag gtgctgcatg gctgtcgtca gctcgtgttg tgaaatgttg ggttaagtcc       60
cgcaacgagc gcaacccctta tcctttgttg ccagcgattc ggtcgggaac tcaaaggaga    120
ctgccggtga taaaccggag gaaggtgggg atgacgtcaa gtcatcatgg cccttacgag     180
tagggctaca cacgtgctac aatggcgcat acaaagagaa gcgacctcgc gagagcaagc    240
ggacctcata aagtgcgtcg tagtccggat cggagtctgc aactcgactc cgtgaagtcg    300
gaatcgctag taatcgtgga tcagaatgcc acgtgaata cgttcccggg ccttgtacac     360
accgcccgtc acaccatggg agtgggttgc aaaagaagta ggtagcttaa ccttcgggag    420
ggcgctacc                                                            429

<210> SEQ ID NO 35
<211> LENGTH: 303
<212> TYPE: DNA
<213> ORGANISM: Pantoea sp.

<400> SEQUENCE: 35
gaatcaagag acaggtgctg catggctgtc gtcagctcgt gttgtgaaat gttgggttaa       60
```

```
gtcccgcaac gagcgcaacc cttatccttt gttgccagcg attcggtcgg gaactcaaag    120
gagactgccg gtgataaacc ggaggaaggt ggggatgacg tcaagtcatc atggccctta    180
cgagtagggc tacacacgtg ctacaatggc gcatacaaag agaagcgacc tcgcgagagc    240
aagcggacct cataaagtgc gtcgtagtcc ggatcggagt ctgcaactcg actccgtgaa    300
gtc                                                                  303
```

<210> SEQ ID NO 36
<211> LENGTH: 1050
<212> TYPE: DNA
<213> ORGANISM: Micrococcus luteus

<400> SEQUENCE: 36

```
ggtctaatac cggataggag cgtccaccgc atggtgggtg ttggaaagat ttatcggttt     60
tggatggact cgcggcctat cagcttgttg gtgaggtaat ggctcaccaa ggcgacgacg    120
ggtagccggc ctgagagggt gaccggccac actgggactg agacacgcc cagactccta     180 cgggaggcag cagtggggaa tattgcacaa tgggcgaaag cctgatgcag cgacgccgcg    240
tgagggatga cggccttcgg gttgtaaacc tctttcagta gggaagaagc gaaagtgacg    300
gtacctgcag aagaagcacc ggctaactac gtgccagcag ccgcggtaat acgtagggtg    360
cgagcgttat ccggaattat tgggcgtaaa gagctcgtag gcggtttgtc gcgtctgtcg    420
tgaaagtccg ggcttaacc ccggatctgc ggtgggtacg ggcagactag agtgcagtag    480
gggagactgg aattcctggt gtagcggtgg aatgcgcaga tatcaggagg aacaccgatg    540
gcgaaggcag gtctctgggc tgtaactgac gctgaggagc gaaagcatgg ggagcgaaca    600
ggattagata ccctggtagt ccatgccgta aacgttgggc actaggtgtg ggaccattc     660 cacggtttcc gcgccgcagc taacgcatta agtgccccgc ctgggagta cggccgcaag    720 gctaaaactc aaaggaattg acgggggccc gcacaagcgg cggagcatgc ggattaattc    780
gatgcaacgc gaagaacctt accaaggctt gacatgttcc cgatcgccgt agagatacga    840
tttccccttt ggggcgggtt cacaggtggt gcatggttgt cgtcagctcg tgtcgtgaga    900
tgttgggtta agtcccgcaa cgagcgcaac cctcgttcca tgttgccagc acgtaatggt    960
ggggactcat gggagactgc cggggtcaac tcggaggaag gtgaggacga cgtcaaatca   1020 tcatgccct tatgtcttgg gcttcacgca                                    1050
```

<210> SEQ ID NO 37
<211> LENGTH: 20
<212> TYPE: DNA
<213> ORGANISM: Artificial Sequence
<220> FEATURE:
<223> OTHER INFORMATION: Primer 16SF

<400> SEQUENCE: 37

```
agagtttgat cctggctcag                                                 20
```

<210> SEQ ID NO 38
<211> LENGTH: 20
<212> TYPE: DNA
<213> ORGANISM: Artificial Sequence
<220> FEATURE:
<223> OTHER INFORMATION: primer 16SR

<400> SEQUENCE: 38

```
ctacggctac cttgttacga                                                 20
```